(12) United States Patent
Kurose et al.

(10) Patent No.: US 9,972,207 B2
(45) Date of Patent: May 15, 2018

(54) INFORMATION COLLECTION SYSTEM, COMMUNICATION DEVICE, AND INFORMATION GENERATION METHOD

(71) Applicants: FUJITSU LIMITED, Kawasaki-shi, Kanagawa (JP); FUJITSU ADVANCED ENGINEERING LIMITED, Tokyo (JP)

(72) Inventors: Yoshitoshi Kurose, Kawasaki (JP); Kazuki Ota, Shinjuku (JP); Ryutaro Motora, Nakano (JP); Shota Irie, Narashino (JP); Tomomi Nishida, Kawasaki (JP)

(73) Assignee: FUJITSU ADVANCED ENGINEERING LIMITED, Tokyo (JP)

( * ) Notice: Subject to any disclaimer, the term of this patent is extended or adjusted under 35 U.S.C. 154(b) by 0 days. days.

(21) Appl. No.: 15/081,207

(22) Filed: Mar. 25, 2016

(65) Prior Publication Data
US 2016/0284216 A1 Sep. 29, 2016

(30) Foreign Application Priority Data
Mar. 27, 2015 (JP) .................................. 2015-067446

(51) Int. Cl.
*G08G 1/00* (2006.01)
*G08G 1/0967* (2006.01)
(Continued)

(52) U.S. Cl.
CPC ..... *G08G 1/096791* (2013.01); *G08G 1/0112* (2013.01); *G08G 1/0137* (2013.01); *G08G 1/162* (2013.01)

(58) Field of Classification Search
CPC ............................. G08G 1/0108; G08G 1/161
(Continued)

(56) References Cited

U.S. PATENT DOCUMENTS

2007/0054685 A1* 3/2007 Kellum ................. G01S 13/931
455/517
2009/0015684 A1 1/2009 Ooga et al.
(Continued)

FOREIGN PATENT DOCUMENTS

JP    2008-2967 A     1/2008
WO    2007/080921 A1  7/2007

*Primary Examiner* — Phung Nguyen
(74) *Attorney, Agent, or Firm* — Westerman, Hattori, Daniels & Adrian, LLP

(57) ABSTRACT

An information collection system includes a first communication device provided at a first vehicle including a processor configured to execute a process. The process includes receiving operations by a first input section, and wirelessly transmitting, by a first transmission section, specific information according to the operation received by the first input section. The information collection system further includes a second communication device provided at a second vehicle including a processor configured to execute a process. The process includes receiving, by a first reception section, the specific information transmitted by the first transmission section, and wirelessly transmitting, to a device that is different from the first communication device by a second transmission section, position information enabling identification of a position at which the specific information was received by the first reception section.

18 Claims, 47 Drawing Sheets

(51) Int. Cl.
*G08G 1/01* (2006.01)
*G08G 1/16* (2006.01)

(58) Field of Classification Search
USPC ............... 340/902, 426.16, 432, 436; 701/70
See application file for complete search history.

(56) References Cited

U.S. PATENT DOCUMENTS

| | | | |
|---|---|---|---|
| 2012/0065858 A1* | 3/2012 | Nickolaou | B60Q 9/008 |
| | | | 701/70 |
| 2012/0323474 A1* | 12/2012 | Breed | B60W 30/04 |
| | | | 701/117 |
| 2014/0139354 A1* | 5/2014 | Miyazaki | B60L 11/1816 |
| | | | 340/902 |
| 2015/0254977 A1* | 9/2015 | Grabow | G08G 1/0141 |
| | | | 340/903 |

* cited by examiner

FIG.4

COMMUNICATION INFORMATION DATABASE

| ID | CATEGORY INFORMATION | TIMING INFORMATION | POSITION INFORMATION | | DEVICE INFORMATION | |
|---|---|---|---|---|---|---|
| | | | LATITUDE | LONGITUDE | FIRST TERMINAL | SECOND TERMINAL |
| 1001 | (LEFT TURN) | 2015/1/19 19:00 30 | (LATITUDE 1) | (LONGITUDE 1) | AB001 | BB002 |
| 1002 | (APPRECIATION) | 2015/1/19 19:00 31 | (LATITUDE 2) | (LONGITUDE 2) | AB001 | BB002 |
| ... | ... | ... | ... | ... | ... | ... |

FIG.16

COMMUNICATION INFORMATION DATABASE

| ID | CATEGORY INFORMATION | TIMING INFORMATION | POSITION INFORMATION | | DEVICE INFORMATION | | DEGREE OF CERTAINTY INFORMATION |
|---|---|---|---|---|---|---|---|
| | | | LATITUDE | LONGITUDE | FIRST TERMINAL | SECOND TERMINAL | |
| 1001 | (RIGHT TURN) | 2015/1/19 19:00 30 | (LATITUDE 1) | (LONGITUDE 1) | AB001 | — | 0 |
| | (RIGHT TURN) | 2015/1/19 19:00 31 | (LATITUDE 1+x1) | (LONGITUDE 1+y1) | AB001 | BB002 | 0 |
| | (APPRECIATION) | 2015/1/19 19:00 34 | (LATITUDE 2) | (LONGITUDE 2) | AB001 | — | 0 |
| | (APPRECIATION) | 2015/1/19 19:00 35 | (LATITUDE 2+x2) | (LONGITUDE 2+y2) | AB001 | BB002 | 0 |
| 1002 | ... | ... | ... | ... | ... | ... | ... |
| ... | ... | ... | ... | ... | ... | ... | ... |

FIG.40

COMMUNICATION INFORMATION DATABASE

| ID | CATEGORY INFORMATION | TIMING INFORMATION | POSITION INFORMATION | | DEVICE INFORMATION | | BYSTANDER COUNT INFORMATION |
|---|---|---|---|---|---|---|---|
| | | | LATITUDE | LONGITUDE | FIRST TERMINAL | SECOND TERMINAL | |
| 1001 | (LEFT TURN) | 2015/1/19 19:00 30 | (LATITUDE 1) | (LONGITUDE 1) | AB001 | BB002 | 0 |
| | (APPRECIATION) | 2015/1/19 19:00 33 | (LATITUDE 1+x3) | (LONGITUDE 1+y3) | AB001 | BB002 | 0 |
| | (I SAW) | 2015/1/19 19:00 34 | (LATITUDE 1+x4) | (LONGITUDE 1+y4) | — | — | 0 |
| 1002 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

INFORMATION COLLECTION SYSTEM, COMMUNICATION DEVICE, AND INFORMATION GENERATION METHOD

CROSS-REFERENCE TO RELATED APPLICATION

This application is based upon and claims the benefit of priority of the prior Japanese Patent Application No. 2015-067446, filed on Mar. 27, 2015, the entire contents of which are incorporated herein by reference.

FIELD

The embodiments discussed herein are related to an information collection system, a communication device, and an information generation method.

BACKGROUND

As conventional technology related to collection of information enabling identification of a vehicle position by a server, technology has been proposed in which an automobile detects a parked vehicle in front, calculates longitude and latitude of the parked vehicle, and transmits the longitude and latitude to a driving assistance server. In such technology, the driving assistance server collects received longitudes and latitudes, uses these to compute a passable area that takes the parked vehicle into consideration, and transmits information regarding the passable area to the automobile mentioned above. The automobile accordingly updates a guided travel route.

RELATED PATENT DOCUMENTS

Japanese Laid-Open Patent Publication No. 2008-2967

SUMMARY

According to an aspect of the embodiments, an information collection system includes a first communication device provided at a first vehicle including a processor configured to execute a process. The process includes receiving operations by a first input section, and wirelessly transmitting, by a first transmission section, specific information according to the operation received by the first input section. The information collection system further includes a second communication device provided at a second vehicle including a processor configured to execute a process. The process includes receiving, by a first reception section, the specific information transmitted by the first transmission section, and wirelessly transmitting, to a device that is different from the first communication device by a second transmission section, position information enabling identification of a position at which the specific information was received by the first reception section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a table illustrating an example of a communication information database according to the first exemplary embodiment;

FIG. 16 is a table illustrating an example of a communication information database according to the second exemplary embodiment;

FIG. 40 is a table illustrating an example of a communication information database according to the sixth exemplary embodiment;

DESCRIPTION OF EMBODIMENTS

Detailed explanation follows regarding exemplary embodiments of technology disclosed herein, with reference to the drawings.

First Exemplary Embodiment

Figure 1:
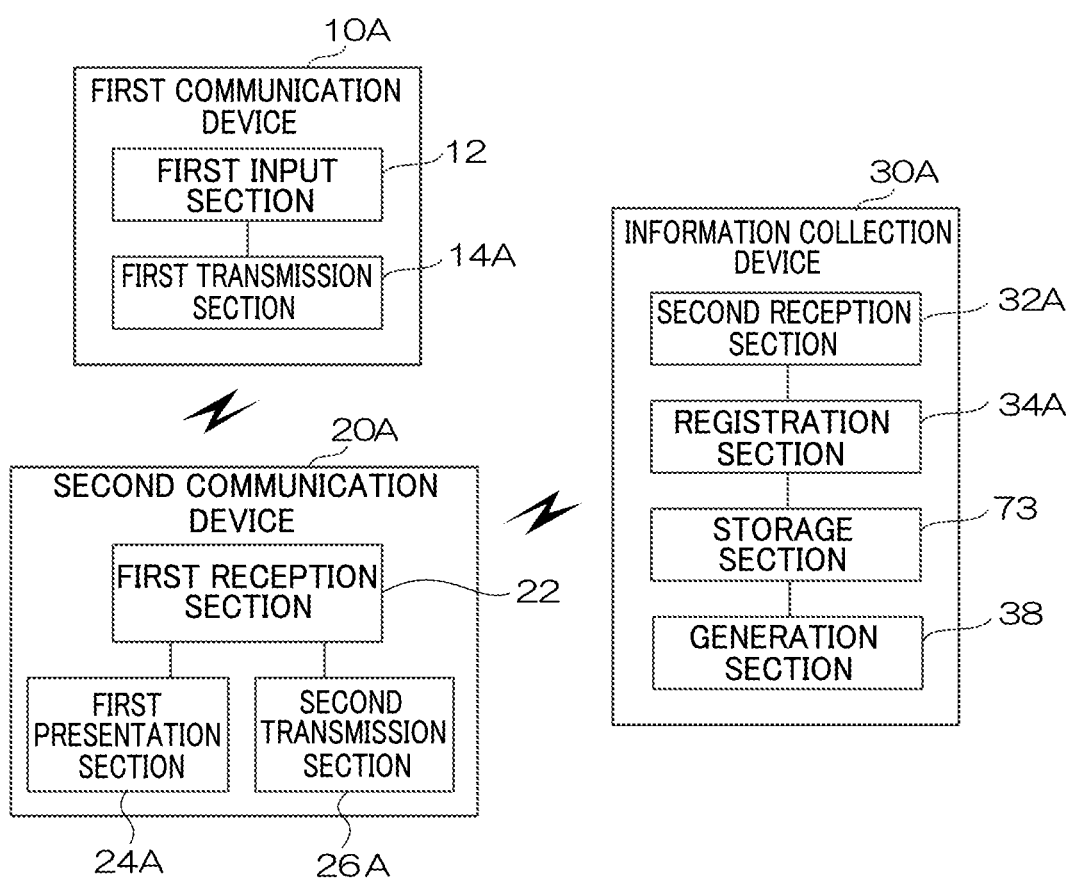
FIG. 1 is a functional block diagram of a first communication device, a second communication device, and an information collection device according to a first exemplary embodiment.

FIG. 1 illustrates a first communication device 10A, a second communication device 20A, and an information collection device 30A according to an exemplary embodiment. Note that a configuration that includes the first communication device 10A, the second communication device 20A, and the information collection device 30A corresponds to an information collection system of technology disclosed herein.

The first communication device 10A according to the present exemplary embodiment is provided to a first vehicle, and includes a first input section 12 and a first transmission section 14A, as illustrated in FIG. 1. The first input section 12 receives operations from a user of the first communication device 10A. The first transmission section 14A wirelessly transmits specific information (referred to as "message information" hereafter) to the second communication device 20A, according to the operation received by the first input section 12.

In the first communication device 10A according to the present exemplary embodiment, "right turn information", "left turn information", and "appreciation information" are three types of information employed as message information. The "right turn information" is information announcing that the first vehicle will turn right. The "left turn information" is information announcing that the first vehicle will turn left. The "appreciation information" is information expressing gratitude of the user of the first communication device 10A. In the present exemplary embodiment, it is envisaged that a bicycle (referred as a "target bicycle" hereafter) serves as the first vehicle to which the first communication device 10A is provided; however, there is no limitation thereto. For example, the first communication device 10A may be provided to another two-wheeled vehicle such as a motorcycle, or may be provided to a four-wheeled vehicle such as an automobile.

The second communication device 20A according to the present exemplary embodiment is provided to a second vehicle, which is different from the first vehicle, and the second communication device 20A includes a first reception section 22, a first presentation section 24A, and a second transmission section 26A, as illustrated in FIG. 1. The first reception section 22 receives the message information transmitted by the first transmission section 14A of the first communication device 10A. The first presentation section 24A presents, to the user of the second communication device 20A, the message information received by the first reception section 22. The second transmission section 26A wirelessly transmits, to a device other than the first communication device 10A (the information collection device 30A in the present exemplary embodiment), position information that enables a position at which the first reception section 22 received the message information to be identified.

Note that although information indicating a latitude and longitude representing the position at which the message information was received is employed as the position information in the second communication device 20A according to the present exemplary embodiment, there is no limitation thereto. For example, in addition to the latitude and longitude representing the position, altitude information may be employed as the position information. Moreover, a region targeted for information collection by the information collection device 30A may be divided into a matrix of rectangular regions having a specific size, and the position of each divided region may be represented as two items of information of a row and a column corresponding to that matrix, and these two items of information may be employed as the position information. It is envisaged that an automobile (referred to as a "target automobile" hereafter) serves as the second vehicle to which the second communication device 20A is provided in the present exemplary embodiment; however, there is no limitation thereto. For example, the second communication device 20A may be provided to a two-wheeled vehicle such as a bicycle or a motorcycle.

In the present exemplary embodiment, a smartphone is employed as the first communication device 10A and the second communication device 20A; however, there is no limitation thereto. For example, other than a smartphone, a cellular telephone, and other than a cellular telephone, a portable information terminal (personal digital assistant (PDA)) such as a tablet personal computer (PC), may be employed as the first communication device 10A and the second communication device 20A.

The information collection device 30A according to the present exemplary embodiment is provided to an information collection center installed in a predetermined location, and includes a second reception section 32A, a registration section 34A, a storage section 73, and a generation section 38, as illustrated in FIG. 1. The second reception section 32A receives the position information transmitted by the second transmission section 26A of the second communication device 20A. The registration section 34A stores (registers) the position information received by the second reception section 32A in the storage section 73. The generation section 38 generates screen data representing an image (referred to as a "site display map" hereafter) that displays the position identified by the position information registered in the storage section 73 on a map. In the information collection device 30A according to the present exemplary embodiment, the site display map represented by the screen data generated by the generation section 38 is displayed on a display section, described later, according to an instruction by the user of the information collection device 30A.

In the present exemplary embodiment, wireless communication between the first transmission section 14A of the first communication device 10A and the first reception section 22 of the second communication device 20A is performed by short range wireless communication via BLUETOOTH (registered trademark) low energy (BLE); however, there is no limitation thereto. For example, the wireless communication may be performed by short range wireless communication other than BLE, or may be performed by intermediate range wireless communication or long range wireless communication. Wireless communication between the second transmission section 26A of the second communication device 20A and the second reception section 32A of the information collection device 30A is performed using a public mobile communication line provided by a cellular phone company in the present exemplary embodiment; however, there is no limitation thereto. For example, this wireless communication may employ a dedicated wireless communication line.

In the present exemplary embodiment, it is envisaged that the target bicycle to which the first communication device 10A is provided is travelling along the same road as the target automobile to which the second communication device 20A is provided, in front of the target automobile.

When the travelling target bicycle approaches a junction at which a right turn, a left turn, or both are possible, and a right turn or left turn is desired, the user of the first communication device 10A (referred to as the "first user" hereafter) performs an operation on the first input section 12 of the first communication device 10A to indicate the desired right turn or left turn. In such cases, the first transmission section 14A of the first communication device 10A wirelessly transmits the above-described right turn information or the left turn information, according to the operation received by the first input section 12.

In the target automobile following behind the target bicycle that is the transmission source of the right turn information or the left turn information, the right turn information or the left turn information transmitted from the target bicycle is received by the first reception section 22 of the second communication device 20A. Then, in the second communication device 20A, the right turn information or the left turn information received by the first reception section 22 is presented by the first presentation section 24A. The user of the second communication device 20A who is onboard the target automobile (referred to as the "second user" hereafter) can thereby ascertain that the target bicycle travelling in front will turn right or turn left. Then, in such cases, the second user can reduce the travelling speed of the target automobile, and make a gesture to the first user to indicate acknowledgement. Due to such behavior by the target automobile and the second user, the first user who is onboard the target bicycle can accordingly ascertain that the second user has ascertained that the target bicycle, which the first user is onboard, will turn right or turn left, and that the second user has expressed behavior in response to this.

The first user then performs an operation on the first input section 12 of the first communication device 10A to express gratitude to the second user. In such cases, the first transmission section 14A of the first communication device 10A wirelessly transmits the appreciation information described above, according to the operation received by the first input section 12.

Accordingly, in the second communication device 20A of the target automobile, the appreciation information transmitted from the target bicycle is received by the first reception section 22. Then, in the second communication device 20A, the appreciation information received by the first reception section 22 is presented by the first presentation section 24A. The second user can thereby ascertain that the first user is grateful for the action of the second user.

Moreover, when the information transmitted from the target bicycle (in the present exemplary embodiment, any information out of right turn information, left turn information, or appreciation information) is received by the first reception section 22, the second transmission section 26A of the second communication device 20A transmits, to the information collection device 30A, position information that enables the position at which the information was received to be identified.

Accordingly, in the information collection device 30A, the position information transmitted from the target automobile is received by the second reception section 32A, and the position information received by the second reception section 32A is stored (registered) in the storage section 73 by the registration section 34A. Then, in the information collection device 30A, screen data representing a site display map is generated by the generation section 38 based on the position information registered in the storage section 73, and the information collection device 30A displays the site display map represented by the screen data on the display section.

The first input section 12 of the first communication device 10A is an example of an input section according to technology disclosed herein, and the first transmission section 14A of the first communication device 10A is an example of a first transmission section and a transmission section of technology disclosed herein. The first reception section 22 of the second communication device 20A is an example of a first reception section according to technology disclosed herein, the first presentation section 24A of the second communication device 20A is an example of a first presentation section of technology disclosed herein, and the second transmission section 26A of the second communication device 20A is an example of a second transmission section of technology disclosed herein. The second reception section 32A of the information collection device 30A is an example of a second reception section of technology disclosed herein, the registration section 34A of the information collection device 30A is an example of a registration section according to technology disclosed herein, and the generation section 38 of the information collection device 30A is an example of a generation section according to technology disclosed herein.

Figure 2:
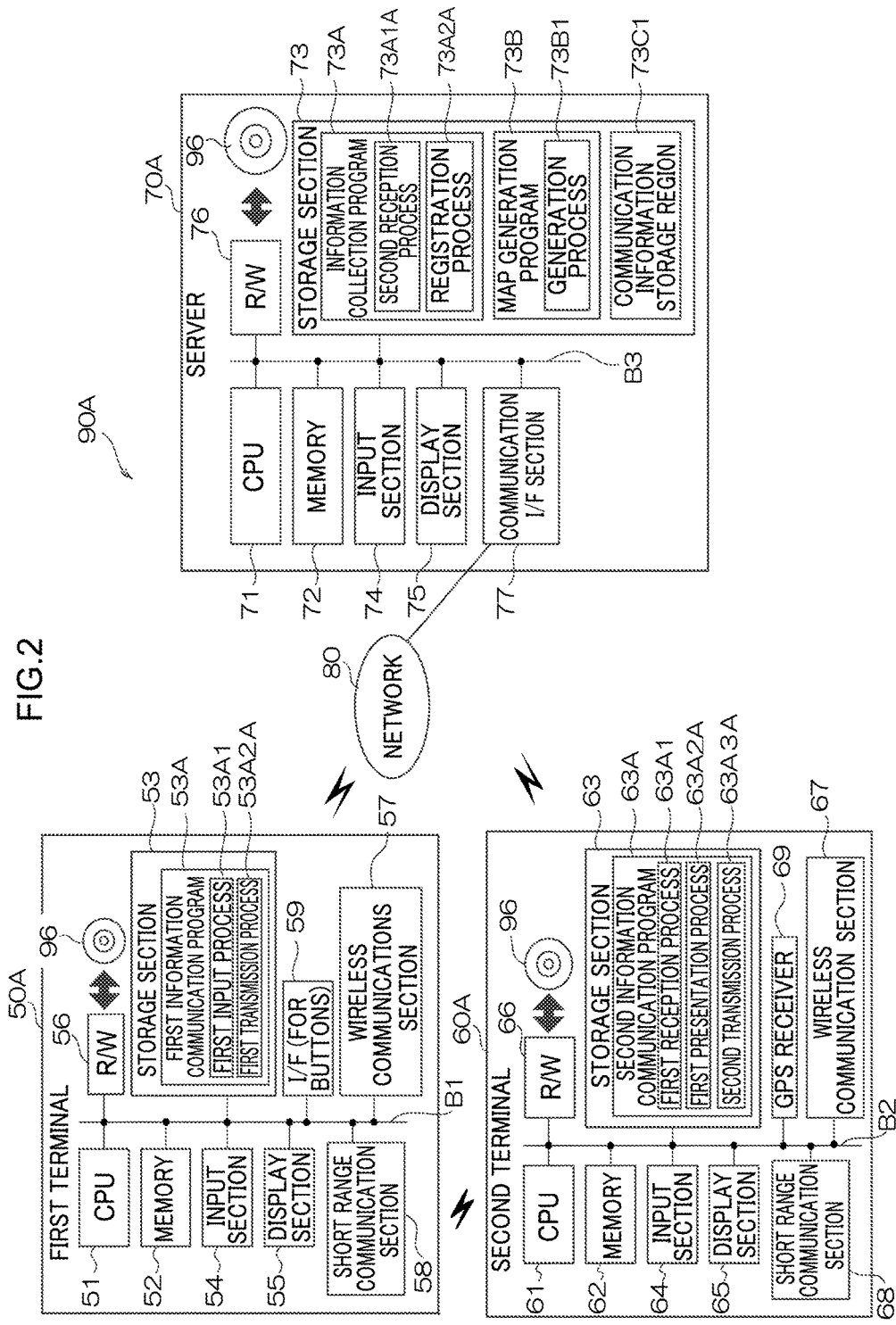
FIG. 2 is a block diagram illustrating a schematic configuration of a computer system according to the first exemplary embodiment.

The first communication device 10A, the second communication device 20A, and the information collection device 30A described above may be respectively implemented by a first terminal 50A, a second terminal 60A, and a server 70A included in a computer system 90A as illustrated in FIG. 2. The computer system 90A according to the present exemplary embodiment includes the first terminal 50A, the second terminal 60A, and the server 70A, which each have access to a network 80.

The first terminal 50A is a terminal provided to the target bicycle described above, and corresponds to the first communication device 10A. The first terminal 50A includes a central processing unit (CPU) 51, a memory 52, a storage section 53, an input section 54, a display section 55, a medium reading/writing device (R/W) 56, a wireless communication section 57, a short range communication section 58, and an interface (I/F) 59 for various buttons, described later. The CPU 51, the memory 52, the storage section 53, the input section 54, the display section 55, the medium reading/writing device 56, the wireless communication section 57, the short range communication section 58, and the I/F 59 are connected to one another through a bus B1. The medium reading/writing device 56 reads information written to a recording medium 96, and writes information to the recording medium 96. The short range communication section 58 is employed when communication is performed by the first transmission section 14A, and the short range communication section 58 performs short range wireless communication via BLE in the present exemplary embodiment, as described above. As described above, since a smartphone is employed as the first terminal 50A in the present exemplary embodiment, a touch panel, provided in a state in which a touch screen is superimposed on a display region of the display section 55, is employed as the input section 54.

Figure 3:
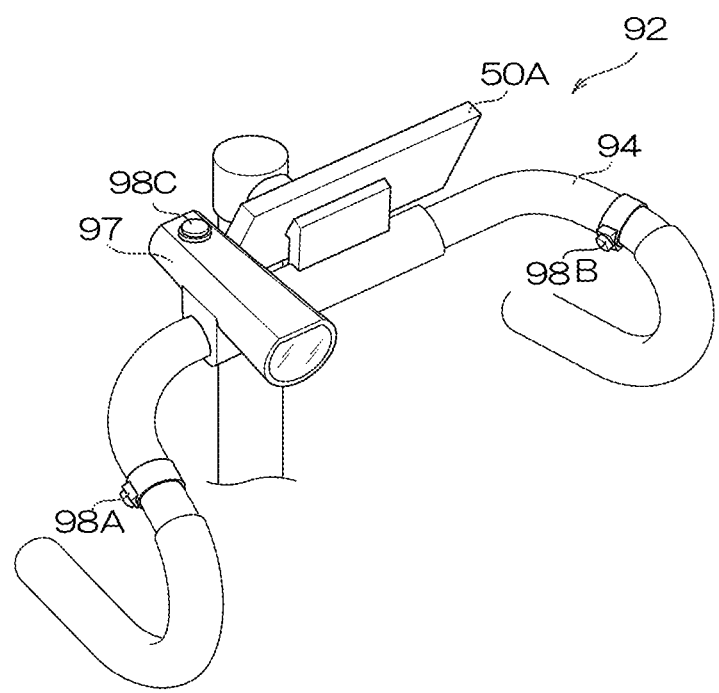
FIG. 3 is a perspective view illustrating an example of a configuration of a bicycle according to an exemplary embodiment.

FIG. 3 illustrates an example of a configuration of a target bicycle 92 according to the present exemplary embodiment. As illustrated in FIG. 3, the first terminal 50A is provided in a central portion of a handlebar 94 of the target bicycle 92 according to the present exemplary embodiment, in a state in which the display section 55 is visible to the first user. Moreover, a button 98A, which is press operated by a thumb, is provided in a position close to the thumb on the right hand at the side of the handlebar 94 gripped by the right hand of the first user. A button 98B, which is press operated by a thumb, is provided in a position close to the thumb on the left hand at the side of the handlebar 94 gripped by the left hand of the first user. The button 98A is press operated by the first user when turning right, and the button 98B is press operated by the first user when turning left.

Moreover, an illuminating lamp unit 97 for illuminating ahead of the target bicycle 92 is provided in a central portion of the handlebar 94 close to the first terminal 50A, and a button 98C is provided to an upper portion of the illuminating lamp unit 97. The button 98C is press operated by the first user when expressing gratitude.

Each button out of the buttons 98A to 98C is connected to the I/F 59, and the CPU 51 can detect the state of press operation by the first user for each of the buttons 98A to 98C independently.

Moreover, the storage section 53 may be implemented by a hard disk drive (HDD), flash memory, or the like. A first information communication program 53A that causes the first terminal 50A to function as the first communication device 10A is stored in the storage section 53. The recording medium 96 written with the first information communication program 53A is set in the medium reading/writing device 56, and the medium reading/writing device 56 reads the first information communication program 53A from the recording medium 96, thereby storing the first information communication program 53A in the storage section 53. The CPU 51 reads the first information communication program 53A from the storage section 53, expands the first information communication program 53A into the memory 52, and sequentially executes the processes included in the first information communication program 53A.

The first information communication program 53A includes a first input process 53A1 and a first transmission process 53A2A. The CPU 51 operates as the first input section 12 illustrated in FIG. 1 by executing the first input process 53A1. Moreover, the CPU 51 operates as the first transmission section 14A illustrated in FIG. 1 by executing the first transmission process 53A2A. The first terminal 50A, which executes the first information communication program 53A, thereby functions as the first communication device 10A.

The second terminal 60A is a terminal provided to the target automobile described above, and corresponds to the second communication device 20A. The second terminal 60A includes a CPU 61, a memory 62, a storage section 63, an input section 64, a display section 65, a medium reading/writing device (R/W) 66, a wireless communication section 67, a short range communication section 68, and a global positioning system (GPS) receiver 69. The CPU 61, the memory 62, the storage section 63, the input section 64, the display section 65, the medium reading/writing device 66, the wireless communication section 67, the short range communication device 68, and the GPS receiver 69 are connected to one another through a bus B2. The medium reading/writing device 66 reads information written to a recording medium 96, and writes information to the recording medium 96. Moreover, the short range communication section 68 is employed when communicating with the first transmission section 14A by the first reception section 22, and performs short range wireless communication via a communication specification similar to that of the first transmission section 14A (BLE in the present exemplary embodiment). Since, as described above, a smartphone is employed as the second terminal 60A in the present exemplary embodiment similarly to in the first terminal 50A, a touch panel, provided in a state in which a touch screen is superimposed on a display region of the display section 65, is employed as the input section 64.

The GPS receiver 69 outputs position information indicating the position of the receiver itself. Although GPS is thus used to identify the position of the receiver itself in the second terminal 60A according to the present exemplary embodiment, there is no limitation thereto. For example, another positioning system such as a positioning system employing a beacon may be employed to identify the position of the device itself.

The storage section 63 may be implemented by a HDD, flash memory, or the like. A second information communication program 63A that causes the second terminal 60A to function as the second communication device 20A is stored in the storage section 63. The recording medium 96 written with the second information communication program 63A is set in the medium reading/writing device 66, and the medium reading/writing device 66 reads the second information communication program 63A from the recording medium 96, thereby storing the second information communication program 63A in the storage section 63. The CPU 61 reads the second information communication program 63A from the storage section 63, expands the second information communication program 63A into the memory 62, and sequentially executes the processes included in the second information communication program 63A.

The second information communication program 63A includes a first reception process 63A1, a first presentation process 63A2A, and a second transmission process 63A3A. The CPU 61 operates as the first reception section 22 illustrated in FIG. 1 by executing the first reception process 63A1. The CPU 61 also operates as the first presentation section 24A illustrated in FIG. 1 by executing the first presentation process 63A2A. The CPU 61 also operates as the second transmission section 26A illustrated in FIG. 1 by executing the second transmission process 63A3A. The second terminal 60A, which executes the second information communication program 63A, thereby functions as the second communication device 20A.

The server 70A is provided to the information collection center described above, is a device that performs comprehensive storage and management of the various information handled by the computer system 90A, and corresponds to the information collection device 30A. The server 70A includes a CPU 71, a memory 72, a storage section 73, an input section 74, a display section 75, a medium reading/writing device (R/W) 76, and an communication interface (I/F) section 77. The CPU 71, the memory 72, the storage section 73, the input section 74, the display section 75, the medium reading/writing device 76, and the communication I/F section 77 are connected to one another through a bus B3. The medium reading/writing device 76 reads information written to a recording medium 96, and writes information to the recording medium 96.

The storage section 73 may be implemented by a HDD, flash memory, or the like. An information collection program 73A and a map generation program 73B that cause the server 70A to function as the information collection device 30A are stored in the storage section 73. The recording medium 96 written with the first information collection program 73A is set in the medium reading/writing device 76, and the medium reading/writing device 76 reads the first information collection program 73A from the recording medium 96, thereby storing the first information collection program 73A in the storage section 73. The CPU 71 reads the storage section 73 from the information collection program 73A, expands the information collection program 73A into the memory 72, and sequentially executes the processes included in the information collection program 73A.

The information collection program 73A includes a second reception process 73A 1A and a registration process 73A2A. The CPU 71 operates as the second reception section 32A illustrated in FIG. 1 by executing the second reception process 73A1A. The CPU 71 also operates as the registration section 34A illustrated in FIG. 1 by executing the registration process 73A2A.

The recording medium 96 written with the map generation program 73B is set in the medium reading/writing device 76, and the medium reading/writing device 76 reads the map generation program 73B from the recording medium 96, thereby storing the map generation program 73B in the storage section 73. The CPU 71 reads the map generation program 73B from the storage section 73, expands the map generation program 73B into the memory 72, and sequentially executes the processes included in the map generation program 73B.

The map generation program 73B includes a generation process 73B1. The CPU 71 operates as the generation section 38 illustrated in FIG. 1 by executing the generation process 73B1. The server 70A, which executes the information collection program 73A and the map generation program 73B, thereby functions as the information collection device 30A.

Moreover, a communication information storage region 73C1 is also provided to the storage section 73. The CPU 71 generates a communication information database (DB) by expanding data stored in the communication information storage region 73C1 into the memory 72.

As illustrated in FIG. 4, the communication information DB according to the present exemplary embodiment includes identification (IDs), category information, timing information, position information, and device information.

The IDs are identification information for classifying message information that has been exchanged between the target bicycle 92 and the target automobile following behind into predetermined segments.

The category information is information representing the category of the corresponding message information. The timing information is information representing the timing at which the corresponding message information was transmitted/received between the target bicycle 92 and the target automobile. The position information is information indicating the position at which the corresponding message information was transmitted/received between the target bicycle 92 and the target automobile. The device information is identification information pre-allocated to each device for identifying each device out of the first terminal 50A and the second terminal 60A that transmitted/received the corresponding message information.

The communication information DB illustrated in FIG. 4, as an example, indicates that "right turn information" and "appreciation information" were message information transmitted/received between the target bicycle 92 and the target automobile in a duration over which the ID "1001" was allocated. In the communication information DB illustrated in FIG. 4, also as an example, the timing at which the "right turn information" was transmitted/received is Jan. 19, 2015, 19:30, and the position at the time of transmit/reception indicates "(latitude 1), (longitude 1)". Moreover, in the communication DB illustrated in FIG. 4, it is indicated that the device information of the first terminal 50A that transmitted the "right turn information" is "AB001", and the device information of the second terminal 60A that received the "right turn information" is "BB002".

In the computer system 90A according to the present exemplary embodiment, the various information is transmitted/received over the network 80, which includes the mobile communication line described above, between the respective devices out of the second terminal 60A and the server 70A; however, there is no limitation thereto. For example, exchange of information may be performed between the respective devices via the recording medium 96 or the like, with the second terminal 60A and the server 70A configured to be offline. In the computer system 90A, the server 70A transmits/receives the various information by wired communication with respective devices connected to the network 80 using the communication I/F section 77; however, there is no limitation thereto. For example, the server 70A may transmit/receive the various information with respective devices connected to the network 80 by wireless communication.

Figure 5:
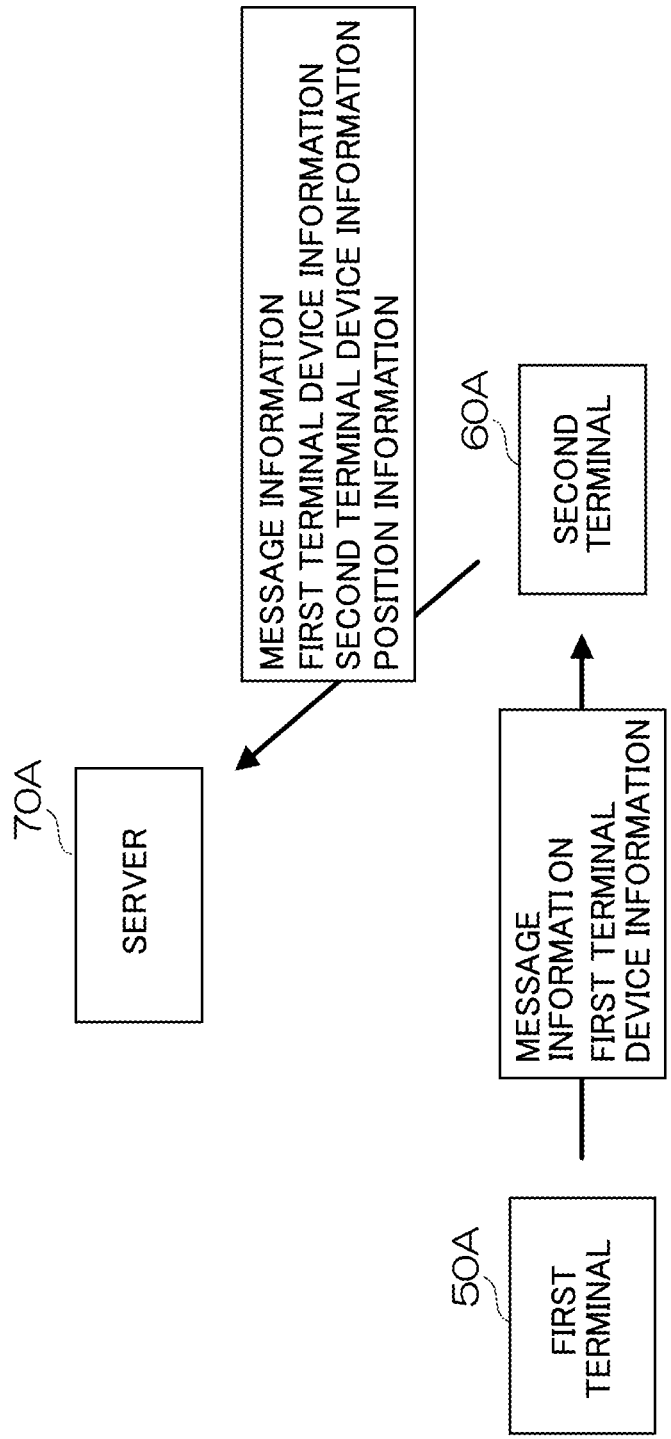
FIG. 5 is a schematic diagram provided to explain a chronological flow of information transmitted/received between respective devices of a computer system according to the first exemplary embodiment.

Next, explanation follows regarding operation of the present exemplary embodiment. First, explanation follows regarding a chronological flow of information transmitted/received between the respective devices out of the first terminal 50A, the second terminal 60A, and the server 70A according to the present exemplary embodiment, with reference to FIG. 5.

When the first user is onboard the target bicycle 92 and, while travelling, approaches a junction at which a right turn is possible, and a right turn is desired, the first user press operates the button 98A provided to the handlebar 94 of the target bicycle 92. In response, the first terminal 50A wirelessly transmits right turn information to the second terminal 60A using the short range communication section 58, as the message information. Similarly, when the first user is onboard the target bicycle 92 and, while travelling, approaches a junction at which a left turn is possible, and a left turn is desired, the first user press operates the button 98B. In response, the first terminal 50A wirelessly transmits left turn information to the second terminal 60A as message information using the short range communication section 58.

In response, the second terminal 60A provided to the target automobile following behind presents the received message information. As described above, the second user onboard the target automobile then reduces the speed of the target automobile, and makes a gesture to indicate acknowledgement. In response, the first user press operates the button 98C provided to the illuminating lamp unit 97. In response, the first terminal 50A wirelessly transmits appreciation information to the second terminal 60A as message information using the short range communication section 58.

When the first terminal 50A according to the present exemplary embodiment transmits the message information ("right turn information", "left turn information", "appreciation information") to the second terminal 60A, the first terminal 50A also transmits, to the second terminal 60A, device information (referred to as "first terminal device information") that was pre-allocated to the device itself.

When message information is received, the second terminal 60A wirelessly transmits the received message information, the first terminal device information, and the device information pre-allocated to the device itself (referred to as the "second terminal device information" hereafter) to the server 70A using the wireless communication section 67. When this is performed, the second terminal 60A also transmits, to the server 70A, position information obtained by the GPS receiver 69 at that point in time. In the following, the message information, the first terminal device information, the second terminal device information, and the position information transmitted to the server 70A by the second terminal 60A is also referred to as "first second-terminal transmission information".

As a result, when the server 70A receives the first second-terminal transmission information from the second terminal 60A, the server 70A stores (registers) the received first terminal device information, second terminal device information, and position information in the storage region corresponding to the communication information DB (see also FIG. 4). When this is performed, the server 70A registers information representing the category of the received message information as category information of the communication information DB. When this is performed, the server 70A also registers, in the communication information DB, the timing of that point in time, measured using inbuilt clock functionality, as the timing information. When this is performed, the server 70A also registers, in the communication information DB, an ID that differs for each of the segments described above.

Figure 6:
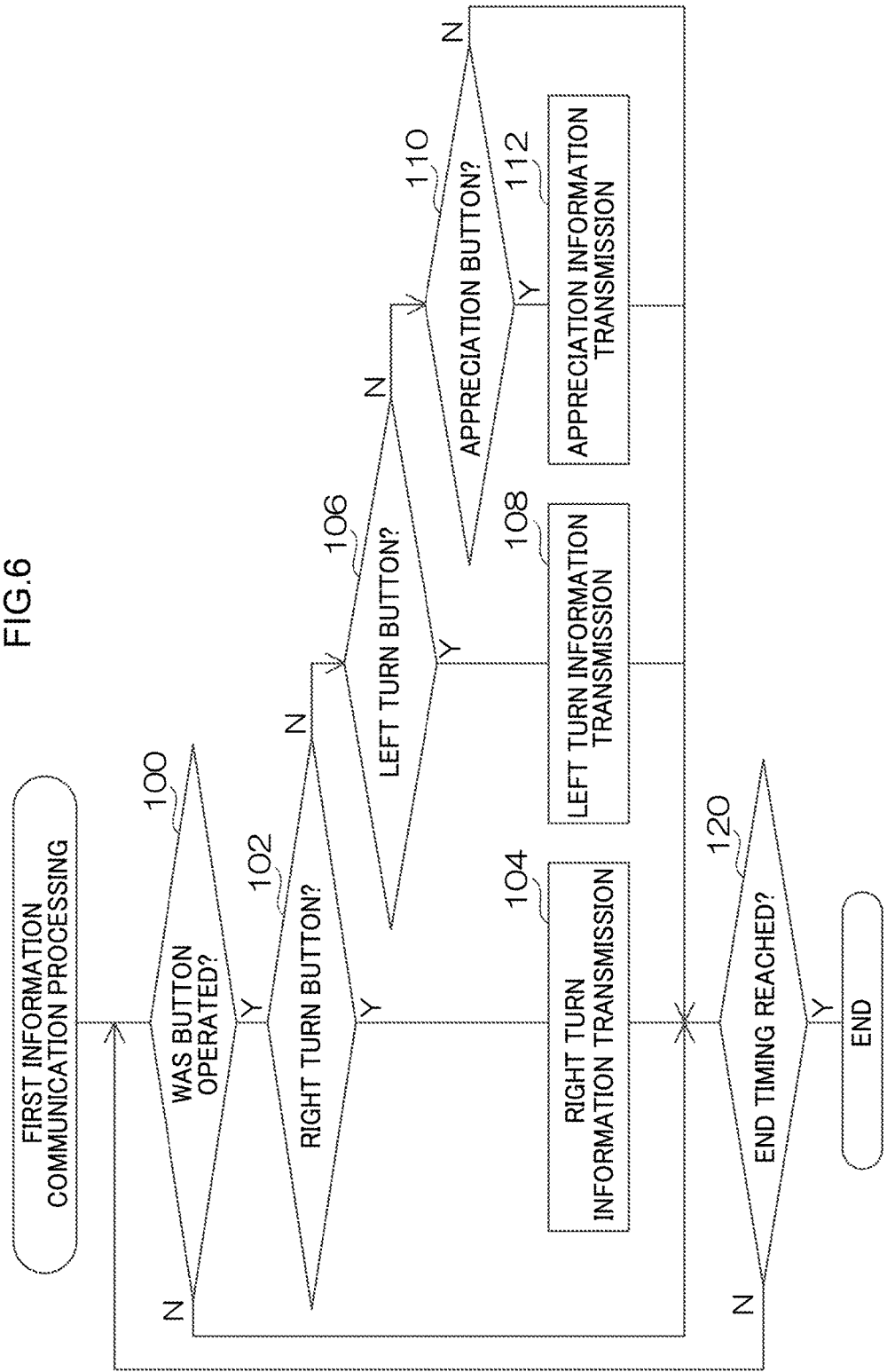
FIG. 6 is a flowchart illustrating an example of first information communication processing according to the first exemplary embodiment.

Next, more specific explanation follows regarding processing executed by the respective devices out of the first terminal 50A, the second terminal 60A, and the server 70A. The first user is onboard the target bicycle 92, and first information communication processing illustrated in FIG. 6 is performed by the first terminal 50A executing the first information communication program 53A.

At step 100 of the first information communication processing, the first input section 12 determines whether or not any of the buttons 98A, 98B, and 98C have been press operated, and processing transitions to step 120, described below, in cases in which negative determination has been made, and processing otherwise transitions to step 102 in cases in which affirmative determination has been made.

At step 102, the first input section 12 determines whether or not the press operated button was the button 98A, and processing transitions to step 104 in cases in which affirmative determination has been made. At step 104, the first transmission section 14A transmits the right turn information and the first terminal device information using the short range communication section 58, and processing then transitions to step 120.

Otherwise, in cases in which negative determination has been made at step 102, processing transitions to step 106, the first input section 12 determines whether or not the press operated button was the button 98B, and processing transitions to step 108 in cases in which affirmative determination has been made. At step 108, the first transmission section 14A transmits the left turn information and the first terminal device information using the short range communication section 58, and processing then transitions to step 120.

Otherwise, when negative determination has been made at step 106, processing transitions to step 110, the first input section 12 determines whether or not the press operated button was the button 98C, and processing transitions to step 112 in cases in which affirmative determination has been made. At step 112, the first transmission section 14A transmits the appreciation information and the first terminal device information using the short range communication section 58, and processing then transitions to step 120. When negative determination has been made at step 110, the button operation detected by the processing of step 100 is considered to have been erroneously detected, and processing transitions to step 120 without any other processing being performed.

At step 120, the first input section 12 determines whether or not a timing predetermined as a timing at which to end the first information communication processing has been reached, and processing returns to step 100 in cases in which a negative determination has been made, or otherwise the first information communication processing ends at that point in time in cases in which affirmative determination has been made. In the first terminal 50A according to the present exemplary embodiment, a timing at which the user input instructions instructing the first information communication processing to end is employed as the predetermined timing; however, there is no limitation thereto.

Figure 7:
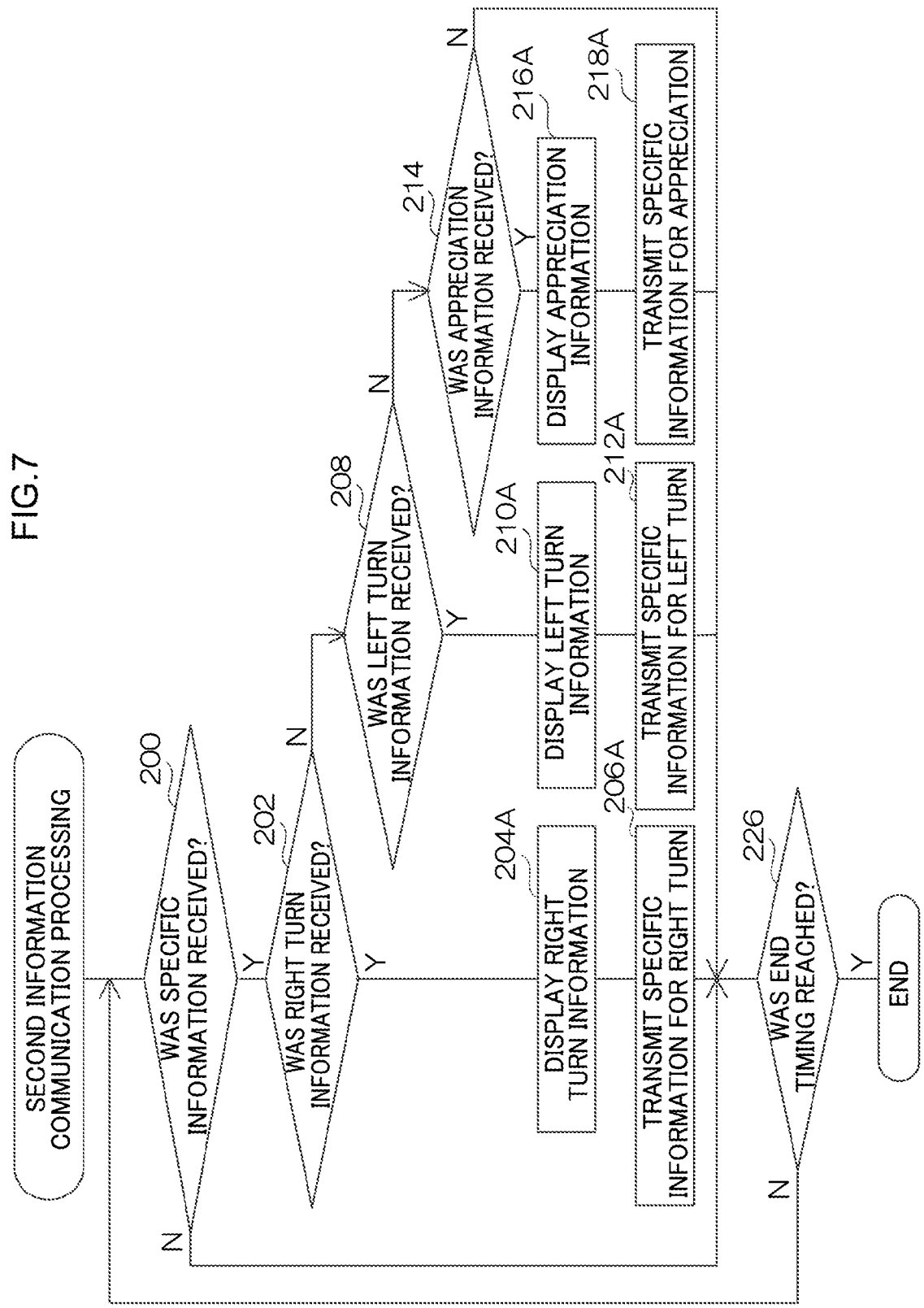
FIG. 7 is a flowchart illustrating an example of second information communication processing according to the first exemplary embodiment.

The second user is onboard the target automobile, and second information communication processing illustrated in FIG. 7 is performed by the second terminal 60A executing the second information communication program 63A.

At step 200 of the second information communication processing, the first reception section 22 determines whether or not any message information has been received, and processing transitions to step 226, described later, in cases in which negative determination has been made, or otherwise processing transitions to step 202 in cases in which affirmative determination has been made.

At step 202, the first reception section 22 determines whether or not the received message information is right turn information, and processing transitions to step 204A in cases in which affirmative determination has been made. At step 204A, the first presentation section 24A controls the display section 65 such that a right turn display screen, predetermined as a screen for displaying right turn information, is displayed.

Figure 8:
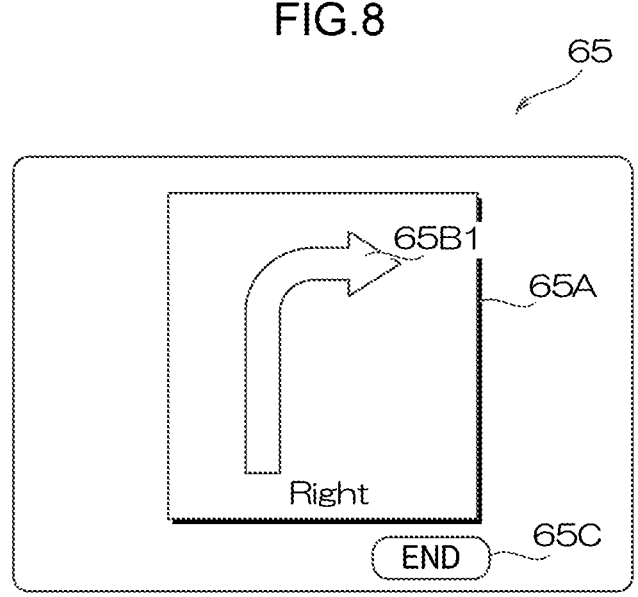
FIG. 8 is a schematic diagram illustrating an example of a right turn display screen according to the first exemplary embodiment.

FIG. 8 illustrates an example of a right turn display screen according to the present exemplary embodiment. As illustrated in FIG. 8, an arrow image 65B1 indicating a right turn, and a message ("Right" in the example illustrated in FIG. 8), are displayed on the right turn display screen according to the present exemplary embodiment. Accordingly, the second user can easily ascertain that the bicycle travelling ahead is attempting to turn right by referring to the right turn display screen, and will decrease the speed of the target automobile, and make a gesture to indicate acknowledgement. In cases in which the second user wishes to remove the right turn display screen from the display section 65, this is specified with a fingertip using a "End" button 65C displayed at the lower side of the right turn display screen. The right turn display screen is thereby removed from the display section 65.

At the next step 206A, the second transmission section 26A transmits the received right turn information and first terminal device information, the second terminal device information allocated to the device itself, and the position information obtained by the GPS receiver 69 at that point in time, to the server 70A using the wireless communication section 67. Processing transitions to step 226 when step 206A ends.

Otherwise, when negative determination has been made at step 202, processing transitions to step 208, the first reception section 22 determines whether or not the received message information is left turn information, and processing transitions to step 210A in cases in which affirmative determination has been made. At step 210A, the first presentation section 24A controls the display section 65 such that a left turn display screen, predetermined as a screen for displaying left turn information, is displayed.

Figure 9:
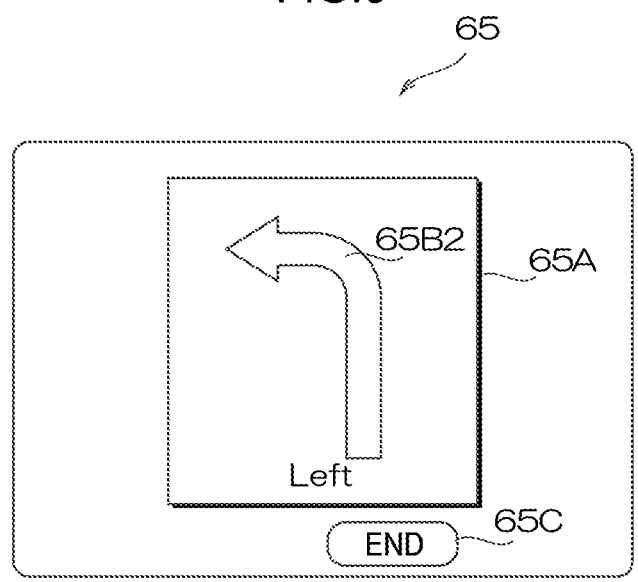
FIG. 9 is a schematic diagram illustrating an example of a left turn display screen according to the first exemplary embodiment.

FIG. 9 illustrates an example of the left turn display screen according to the present exemplary embodiment. As illustrated in FIG. 9, an arrow image 65B2 indicating a left turn, and a message ("Left" in the example illustrated in FIG. 9), are displayed on the left turn display screen according to the present exemplary embodiment. Accordingly, the second user can easily ascertain that the bicycle travelling ahead is attempting to turn left by referring to the left turn display screen, and will decrease the speed of the target automobile, and make a gesture to indicate acknowledgement. In cases in which the second user wishes to remove the left turn display screen from the display section 65, this is specified with a fingertip using a "End" button 65C displayed at the lower side of the left turn display screen. The left turn display screen is thereby removed from the display section 65.

At the next step 212A, the second transmission section 26A transmits the received left turn information and first terminal device information, the second terminal device information allocated to the device itself, and the position information obtained by the GPS receiver 69 at that point in time, to the server 70A using the wireless communication section 67. Processing transitions to step 226 when step 212A ends.

Otherwise, in cases in which negative determination has been made at step 208, processing transitions to step 214, the first reception section 22 determines whether or not the received message information is appreciation information, and processing transitions to step 216A in cases in which affirmative determination has been made. At step 216A, the first presentation section 24A controls the display section 65 such that an appreciation display screen predetermined as a screen for displaying appreciation information is displayed.

Figure 10:
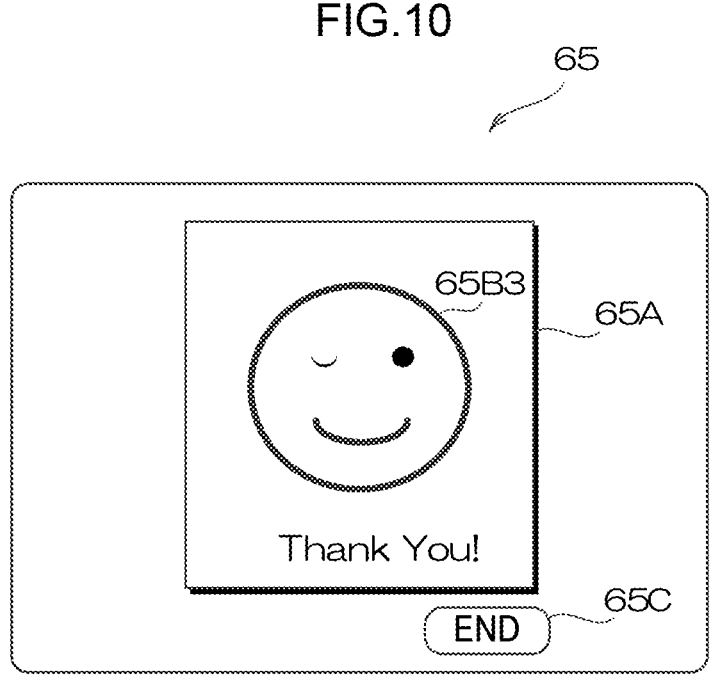
FIG. 10 is a schematic diagram illustrating an example of an appreciation display screen according to the first exemplary embodiment.

FIG. 10 illustrates an example of an appreciation display screen according to the present exemplary embodiment. As illustrated in FIG. 10, an appreciation image (an image of a smiling face in the present exemplary embodiment) 65B3 expressing appreciation, and a message ("Thank You!" in the example illustrated in FIG. 10), are displayed on the appreciation display screen according to the present exemplary embodiment. Accordingly, the second user can easily ascertain that the occupant of the bicycle travelling ahead is expressing gratitude by referring to the appreciation display screen, and will make a gesture to indicate acknowledgement. In cases in which the second user wishes to remove the appreciation display screen from the display section 65, this is specified with a fingertip using a "End" button 65C displayed at the lower side of the appreciation display screen. The appreciation display screen is thereby removed from the display section 65.

At the next step 218A, the second transmission section 26A transmits the received appreciation information and first terminal device information, the second terminal device information allocated to the device itself, and the position information obtained by the GPS receiver 69 at that point in time, to the server 70A using the wireless communication section 67. Processing transitions to step 226 when step 218A ends. In cases in which negative determination has been made at step 214, the message information received in the processing of step 200 is considered to have been received erroneously, and processing transitions to step 226 without any other processing being performed.

At step 226, the first reception section 22 determines whether or not the timing predetermined as the timing at which to end the second information communication program has been reached, and processing returns to step 200 in cases in which a negative determination has been made, or otherwise the second information communication processing ends at that point in time in cases in which affirmative determination has been made. In the second terminal 60A according to the present exemplary embodiment, a timing at which the user input instructions instructing the second information communication processing to end is employed as the predetermined timing; however, there is no limitation thereto.

Figure 11:
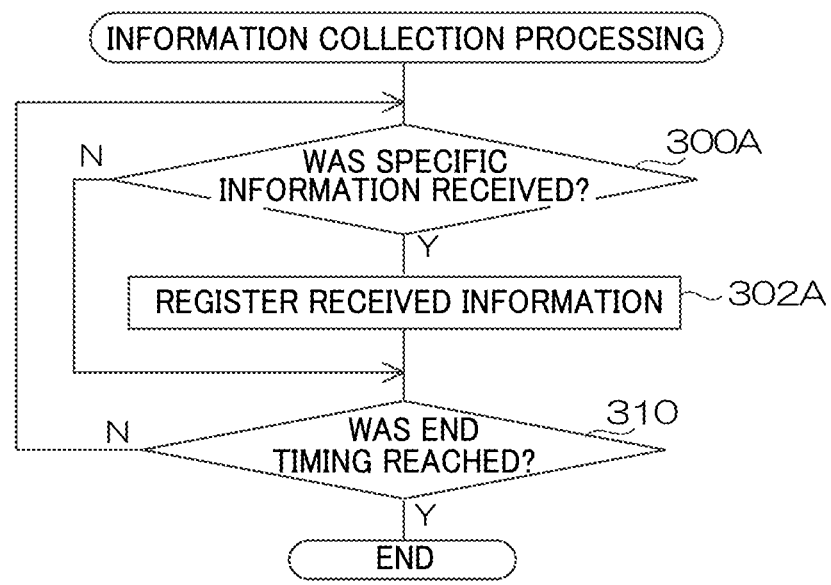
FIG. 11 is a flowchart illustrating an example of information collection processing according to the first exemplary embodiment.

An administrator of the server 70A performs information collection processing illustrated in FIG. 11 by executing the information collection program 73A using the server 70A at a specific timing. In the present exemplary embodiment, a predetermined timing (3 a.m. in the present exemplary embodiment) is employed as the specific timing; however, there is no limitation thereto.

At step 300A of the information collection processing, the second reception section 32A determines whether or not the first second-terminal transmission information has been received from the second terminal 60A, and processing transitions to step 310, described below, in cases in which negative determination has been made, or otherwise processing transitions to step 302A in cases in which affirmative determination has been made.

At step 302A, the registration section 34A stores (registers) information, excluding the message information, from the received first second-terminal transmission information, information indicating the category of the message information, and timing information indicating the timing of that point in time, in the communication information DB.

When this is performed, the registration section 34A registers this information in the communication information DB as described below. Namely, in cases in which existing position information indicating a position that is within a specific distance from the position indicated by the position information to be registered the current time has already been registered, and the elapsed duration since the timing at which the existing position information was registered is within a specific duration, the information to be registered the current time is registered associated with an ID corresponding to the existing position information. In other cases, a new ID is generated and the current registration is performed in association with that ID. In the present exemplary embodiment, the distance employed as the specific distance is a distance (5 m in the present exemplary embodiment) predetermined such that exchange of message information within that distance can be considered to have occurred at the same junction on the road; however, there is no limitation thereto. Moreover, in the present exemplary embodiment, the duration employed as the specific duration is a duration (10 seconds in the present exemplary embodiment) predetermined such that exchange of message information within that duration can be considered to have occurred at the same junction on the road; however, there is no limitation thereto.

At the next step 310, the second reception section 32A determines whether or not the timing predetermined as the timing at which to end the present information collection processing has been reached, and processing returns to step 300A in cases in which a negative determination has been made, or otherwise the present information collection processing ends at that point in time in cases in which affirmative determination has been made. In the server 70A according to the present exemplary embodiment, a predetermined timing (1 a.m. in the present exemplary embodiment) is employed as the predetermined timing; however, there is no limitation thereto.

Figure 12:
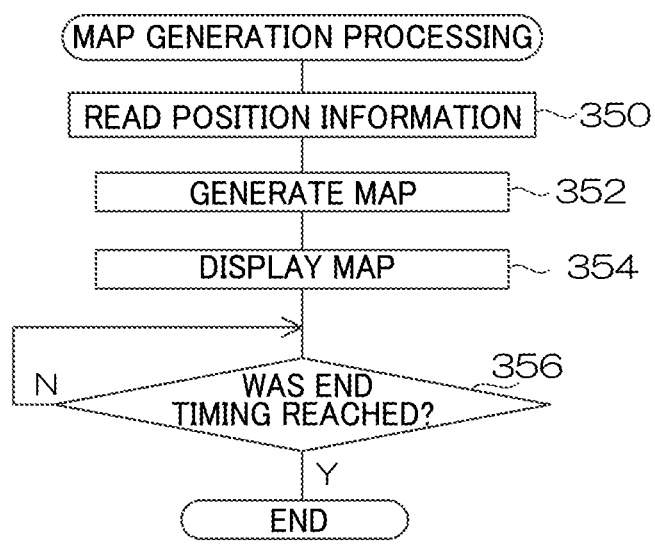
FIG. 12 is a flowchart illustrating an example of map generation processing according to the first exemplary embodiment.

The administrator of the server 70A performs map generation processing illustrated in FIG. 12 by executing the map generation program 73B using the server 70A at the specific timing. The present exemplary embodiment employs a predetermined date and time (5 a.m. on the last day of each month in the present exemplary embodiment) as the specific timing; however, there is no limitation thereto. Herein, to avoid confusion, explanation is given regarding a case in which map information representing a map of a place set as a map generation target are pre-stored in the storage section 73 of the server 70A.

At step 350 of the map generation processing, the generation section 38 reads, from the communication information DB, all of the position information with "appreciation" registered as the category information of the message information. At the next step 352, the generation section 38 reads the map information from the storage section 73. Next, the generation section 38 performs processing on the map information that causes a specific mark 75A (see also FIG. 13) to be superimposed on the map represented by the map information, at positions corresponding to the read position information. The generation section 38 uses this processing to generate screen data (referred to as "map screen data" hereafter) representing a site display map that enables the first user to identify positions at which appreciation was expressed.

At the next step 354, the generation section 38 controls the display section 75 such that a site display map represented by the map screen data generated by the above processing is displayed, and processing then transitions to step 356.

Figure 13:
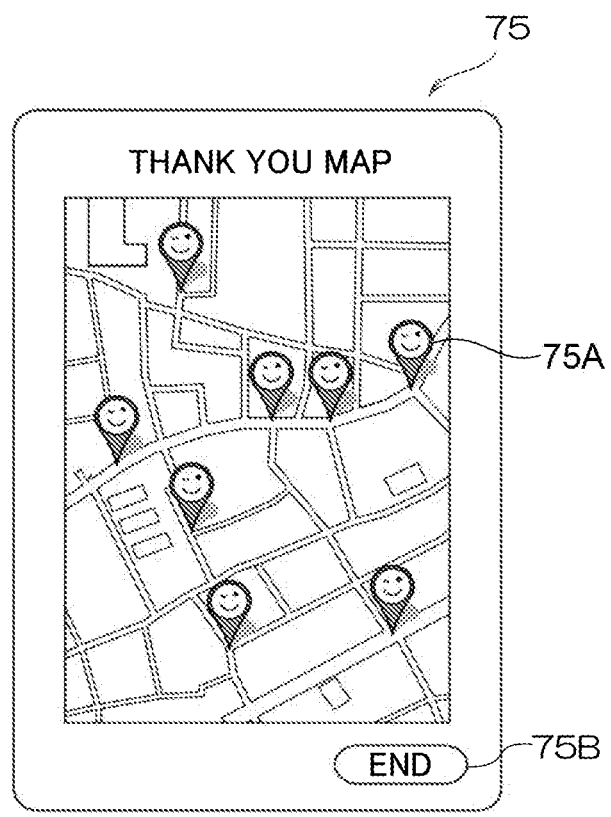
FIG. 13 is a schematic diagram illustrating an example of a site display map according to the first exemplary embodiment.

FIG. 13 illustrates an example of the site display map according to the present exemplary embodiment. As illustrated in FIG. 13, in the site display map according to the present exemplary embodiment, the map represented by the map information is displayed in a state in which the mark 75A is superimposed at positions at which the appreciation information was exchanged. Accordingly, the administrator of the server 70A can easily ascertain positions at which the appreciation information was exchanged by referring to the site display map. When the administrator of the server 70A wishes to remove the site display map from the display section 75, the administrator of the server 70A stipulates an "End" button 75B displayed at the lower side of the site display map, through the input section 74. The site display map is thereby removed from the display section 75.

At step 356, the generation section 38 stands by until a timing predetermined as the timing at which to end the current map generation processing has been reached, and the present map generation processing ends at a point in time at which affirmative determination has been made at step 356. In the server 70A according to the present exemplary embodiment, the timing at which the processing up to step 354 has ended is employed as the predetermined timing; however, there is no limitation thereto.

As explained in detail above, in the present exemplary embodiment, the specific information is wirelessly transmitted using the first transmission section of the first communication device provided to the first vehicle, according to an operation received by the first input section, which receives operations. Moreover, in the present exemplary embodiment, the second transmission section of the second communication device provided to the second vehicle wirelessly transmits, to a device different from the first communication device, position information enabling identification of the position at which the specific information was received by the first reception section, which receives the specific information transmitted by the first transmission section. Thus, according to the present exemplary embodiment, the second vehicle transmits position information conveying that the specific information has been received from the first vehicle. Thus, position information enabling identification of the position at which inter-vehicle communication was performed can be collected without the first vehicle or the second vehicle receiving any information, in contrast to cases in which unaccompanied position information is transmitted. Moreover, the collected position information can be considered highly reliable position information.

In the present exemplary embodiment, information expressing gratitude is included in the specific information. Thus, according to the present exemplary embodiment, stress can be reduced for the occupant of the second vehicle as a result of the information expressing gratitude being transmitted to the second vehicle. Moreover, positions where communication was performed related to giving way to each other can be collected using the information expressing gratitude.

Moreover, in the present exemplary embodiment, in the information collection device, position information transmitted by the second transmission section is received by the second reception section, and the received position information is registered in the storage section by the registration section. Thus, according to the present exemplary embodiment, highly reliable position information can be collected by the information collection device.

Moreover, according to the present exemplary embodiment, in the information collection device, screen data representing the position identified by the position information registered by the registration section on the map is generated by the generation section. Thus, according to the present exemplary embodiment, the position at which inter-vehicle communication was performed can be easily ascertained by performing screen display using the screen data.

Moreover, in the present exemplary embodiment, in the second communication device, the specific information received by the first reception section is presented by the first presentation section. Thus, according to the present exemplary embodiment, the occupant of the second vehicle can easily ascertain the content of the specific information received from the first vehicle by referring to the presented information.

Second Exemplary Embodiment

Figure 14:
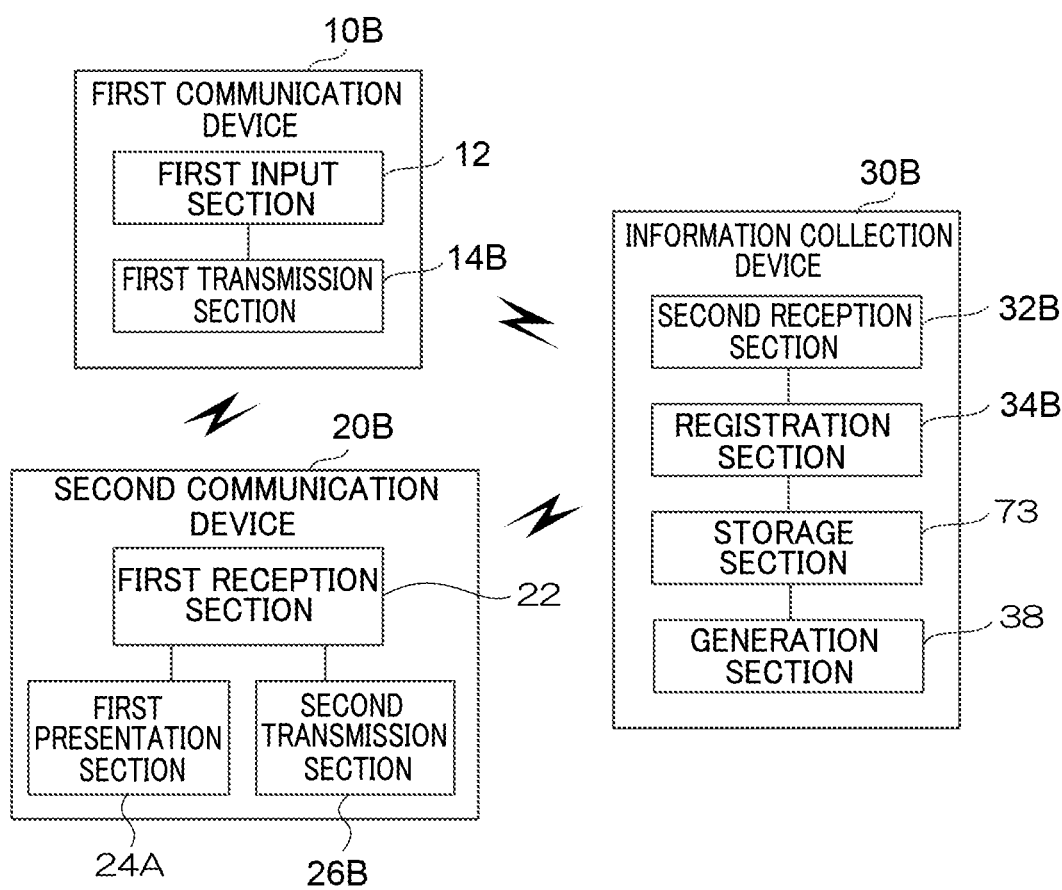
FIG. 14 is a functional block diagram of a first communication device, a second communication device, and an information collection device according to a second exemplary embodiment.

Next, explanation follows regarding a second exemplary embodiment of technology disclosed herein. FIG. 14 illustrates a first communication device 10B, a second communication device 20B, and an information collection device 30B according to the present exemplary embodiment. Configuration elements in FIG. 14 similar those of the respective devices illustrated in FIG. 1 are allocated the same reference numerals as in FIG. 1, and explanation thereof is omitted.

As illustrated in FIG. 14, the first communication device 10B according to the second exemplary embodiment differs from the first communication device 10A in that a first transmission section 14B for performing transmission processing different from that of the first transmission section 14A, is employed instead of the first transmission section 14A. Moreover, the second communication device 20B according to the second exemplary embodiment differs from the second communication device 20A in that a second transmission section 26B for performing transmission processing different from that of the second transmission section 26A is employed instead of the second transmission section 26A. Moreover, the information collection device 30B according to the second exemplary embodiment differs from the information collection device 30A in that a second reception section 32B for performing reception processing different from that of the second reception section 32A is employed instead of the second reception section 32A. Moreover, the information collection device 30B according to the second exemplary embodiment differs from the information collection device 30A in that a registration section 34B for performing registration processing different from that of the registration section 34A is employed instead of the registration section 34A.

Figure 15:
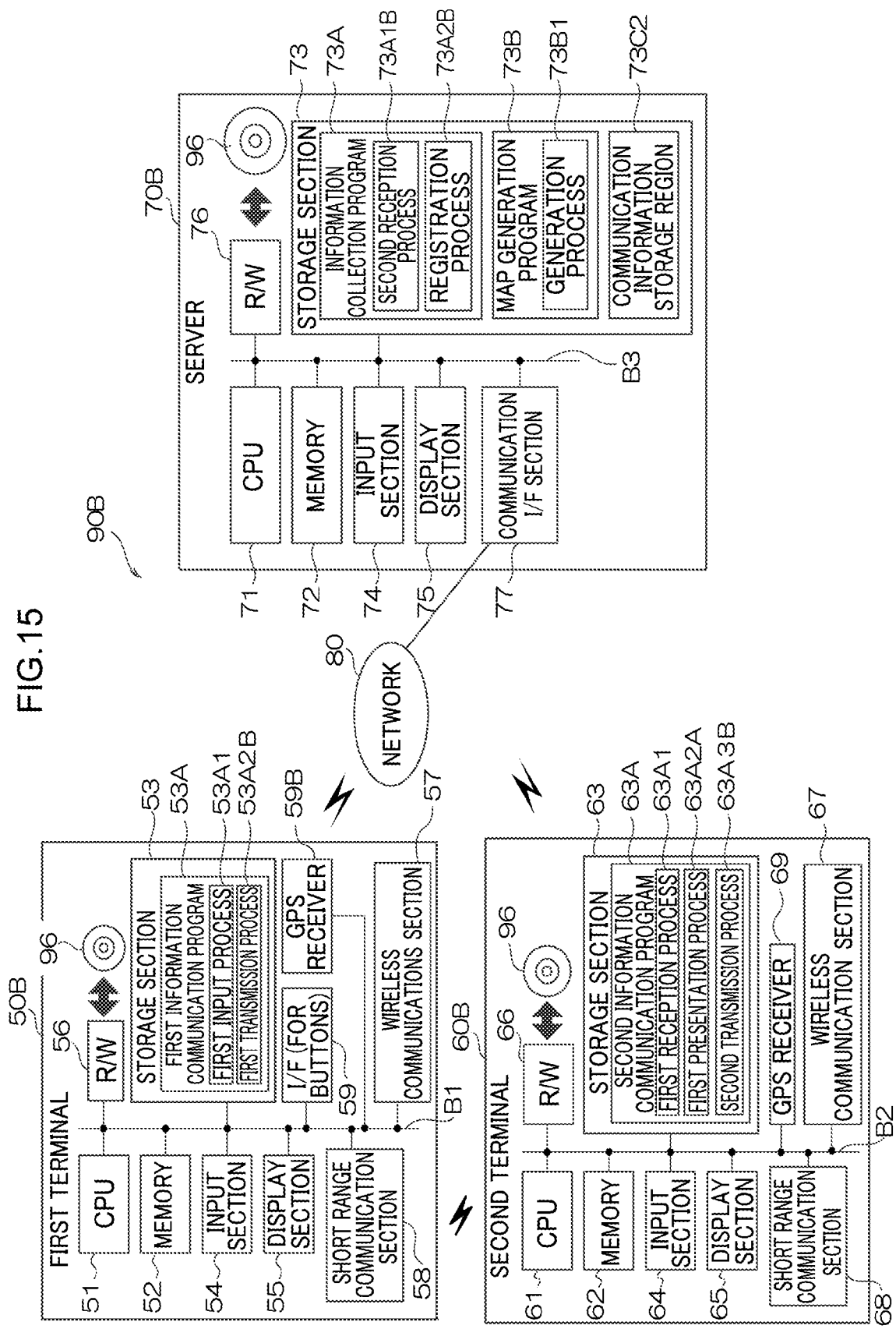
FIG. 15 is a block diagram illustrating a schematic configuration of a computer system according to the second exemplary embodiment.

The first communication device 10B, the second communication device 20B, and the information collection device 30B may be respectively implemented by a first terminal 50B, a second terminal 60B, and a server 70B included in a computer system 90B illustrated in FIG. 15. Explanation follows regarding configuration of the first terminal 50B, the second terminal 60B, and the server 70B according to the second exemplary embodiment, with reference to FIG. 15. Configuration elements in FIG. 15 that are similar to those of the computer system 90A of FIG. 2 are allocated the same reference numerals as in FIG. 2, and explanation thereof is omitted.

As illustrated in FIG. 15, the first terminal 50B according to the present exemplary embodiment differs from the first terminal 50A in that a OPS receiver 59B, similar to the GPS receiver 69 provided to the second terminal 60B, is additionally provided. The GPS receiver 59B is connected to the bus B1.

Moreover, the first terminal 50B differs from the first terminal 50A in that the first transmission process 53A2A of the first information communication program 53A is configured as a first transmission process 53A2B for performing transmission processing different from that of the first transmission process 53A2A. The CPU 51 operates as the first transmission section 14B illustrated in FIG. 14 by executing the first transmission process 53A2B. The first terminal 50B, which executes the first information communication program 53A, thereby functions as the first communication device 10B.

The second terminal 60B according to the present exemplary embodiment differs from the second terminal 60A in that the second transmission process 63A3A of the second information communication program 63A is configured as a second transmission process 63A3B for performing transmission processing different from that of the second transmission process 63A3A. The CPU 61 operates as the second transmission section 26B illustrated in FIG. 14 by executing the second transmission process 63A3B. The second terminal 60B, which executes the second information communication program 63A, thereby functions as the second communication device 20B.

The server 70B according to the present exemplary embodiment differs from the server 70A in that the second reception process 73A1A of the information collection program 73A is configured as a second reception process 73A1B for performing reception processing different from that of the second reception process 73A1A. The server 70B according to the present exemplary embodiment differs from the server 70A in that the registration process 73A2A of the information collection program 73A is configured as a registration process 73A2B for performing registration processing different from that of the registration process 73A2A. The CPU 71 operates as the second reception section 32B illustrated in FIG. 14 by executing the second reception process 73A1B. The CPU 71 operates as the registration section 34B illustrated in FIG. 14 by executing the registration process 73A2B. The server 70B, which executes the information collection program 73A, thereby functions as the information collection device 30B.

A communication information storage region 73C2 is provided to the storage section 73 of the server 70B instead of the communication information storage region 73C 1. The CPU 71 generates a communication information DB according to the present exemplary embodiment by expanding data stored in the communication information storage region 73C2 into the memory 72.

FIG. 16 illustrates a communication information DB according to the present exemplary embodiment. As illustrated in FIG. 16, the communication information DB according to the present exemplary embodiment differs from the communication information DB according to the first exemplary embodiment in that degree of certainty information, described below, is added (see also FIG. 4). The default value of the degree of certainty information is set to 0 (zero) in the communication information DB according to the present exemplary embodiment.

Figure 17:
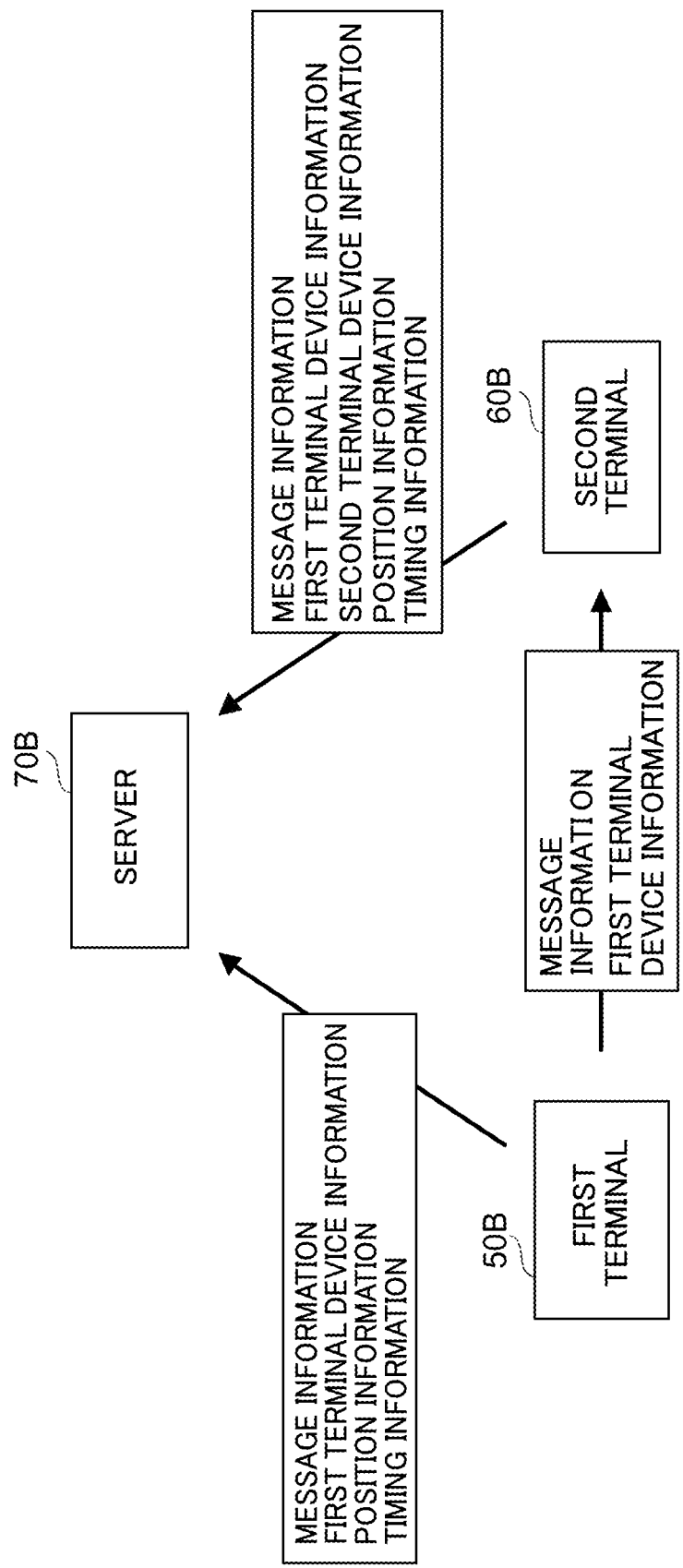
FIG. 17 is a schematic diagram explaining a chronological flow of information transmitted/received between respective devices of a computer system according to the second exemplary embodiment.

Next, explanation follows regarding operation of the present exemplary embodiment. First, explanation follows regarding a chronological flow of information transmitted/received between the respective devices out of the first terminal 50B, the second terminal 60B, and the server 70B according to the present exemplary embodiment, with reference to FIG. 17.

The first terminal 50B provided to the target bicycle 92 is similar to the first terminal 50A in that any message information out of right turn information, left turn information, and appreciation information is transmitted together with the first terminal device information to the second terminal 60B provided to a target automobile travelling behind, according to operation by the first user.

The second terminal 60B provided to the target automobile is also similar to the second terminal 60A in that the message information, the first terminal device information, the second terminal device information, and the position information are transmitted to the server 70B when the message information and the first terminal device information have been received from the first terminal 50B. However, the second terminal 60B according to the present exemplary embodiment differs from the second terminal 60A in that timing information of that point in time is transmitted to the server 70B in addition to this information. When this is performed, the second terminal 60B acquires the timing indicating that point in time, measured using inbuilt clock functionality, as the timing information. Hereafter, the message information, the first terminal device information, the second terminal device information, the position information, and the timing information that the second terminal 60B transmits to the server 70B are also referred to as "second second-terminal transmission information".

The first terminal 50B according to the present exemplary embodiment differs from the first terminal 50A in that the message information, the first terminal device information, the position information indicating the position at that point in time, and the timing information indicating the timing of that point in time are transmitted to the server 70B when the message information has been transmitted to the second terminal 60B. When this is performed, the first terminal 50B acquires a position obtained by the GPS receiver 59B at that point in time as the position information. When this is performed, the first terminal 50B also acquires the timing of that point in time, measured using inbuilt clock functionality, as the timing information. Hereafter, the message information, the first terminal device information, the position information, and the timing information that the first terminal 50B transmits to the server 70B are referred to as "first first-terminal transmission information".

Accordingly, the server 70B stores (registers) the information out of the second second-terminal transmission information, excluding the message information, received from the second terminal 60B, and category information indicating the category of the message information, in the storage region corresponding to the communication information DB (see also FIG. 16). Moreover, the server 70B stores (registers) the information out of the first first-terminal transmission information, excluding the message information, received from the first terminal 50B, and category information indicating the category of the message information, in the storage region corresponding to the communication information DB. When this is performed, the server 70B registers, in the communication information DB, an ID that differs for each of the segments described above.

Here, the server 70B according to the present exemplary embodiment derives degree of certainty information indicating the certainty of the second second-terminal transmission information received from the second terminal 60B, and this is explained in detailed later. Then, the server 70B stores (registers) the derived degree of certainty information in the communication information DB in association with the position information of the corresponding second second-terminal transmission information.

Next, specific explanation follows regarding processing executed by the respective devices out of the first terminal 50B, the second terminal 60B, and the server 70B. The first user is onboard the target bicycle 92, and performs the first information communication processing illustrated in FIG. 18 by executing the first information communication program 53A using the first terminal 50B. Explanation follows regarding the first information communication processing according to the present exemplary embodiment. Steps in FIG. 18 that perform similar processing to those of FIG. 6 are allocated the same step numbers as in FIG. 6, and explanation thereof is omitted.

Figure 18:
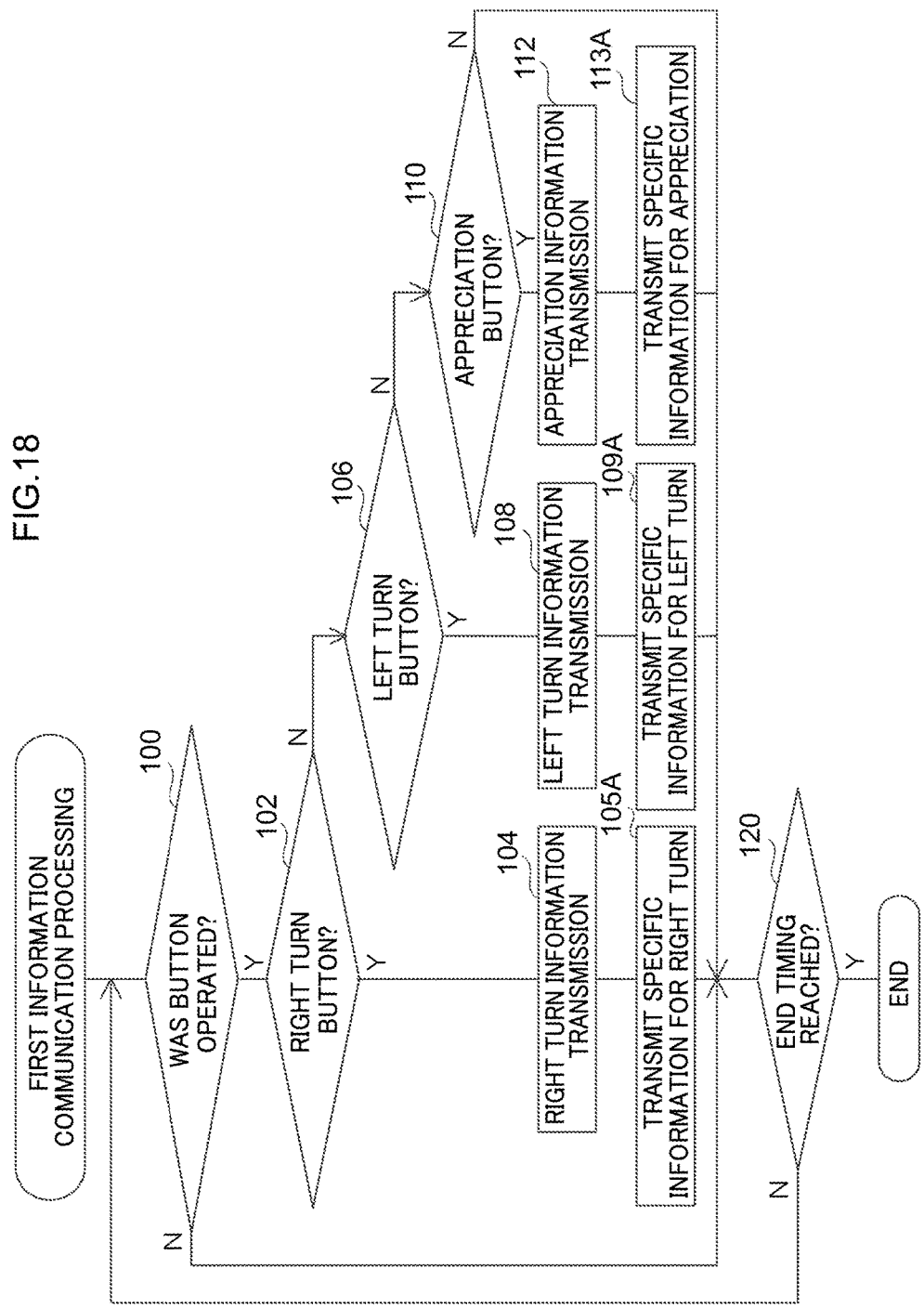
FIG. 18 is a flowchart illustrating an example of first information communication processing according to the second exemplary embodiment.

As illustrated in FIG. 18, the first information communication processing according to the present exemplary embodiment differs from the first information communication processing according to the first exemplary embodiment in that processing of a step 105A is added immediately following the processing of step 104. Similarly, the first information communication processing according to the present exemplary embodiment differs from the first information communication processing according to the first exemplary embodiment in that processing of a step 109A is added immediately following the processing of step 108, and processing of a step 113A is added immediately following the processing of step 112.

Namely, at step 105A of the first information communication processing according to the present exemplary embodiment, the first transmission section 14B transmits the first first-terminal transmission information, in which the message information has been set to right turn information, to the server 70B using the wireless communications section 57, and processing then transitions to step 120. At step 109A of the first information communication processing according to the present exemplary embodiment, the first transmission section 14B transmits the first first-terminal transmission information, in which the message information has been set to left turn information, to the server 70B using the wireless communications section 57, and processing then transitions to step 120. At step 113A of the first information communication processing according to the present exemplary embodiment, the first transmission section 14B transmits the first first-terminal transmission information, in which the message information has been set to appreciation information, to the server 70B using the wireless communications section 57, and processing then transitions to step 120.

Figure 19:
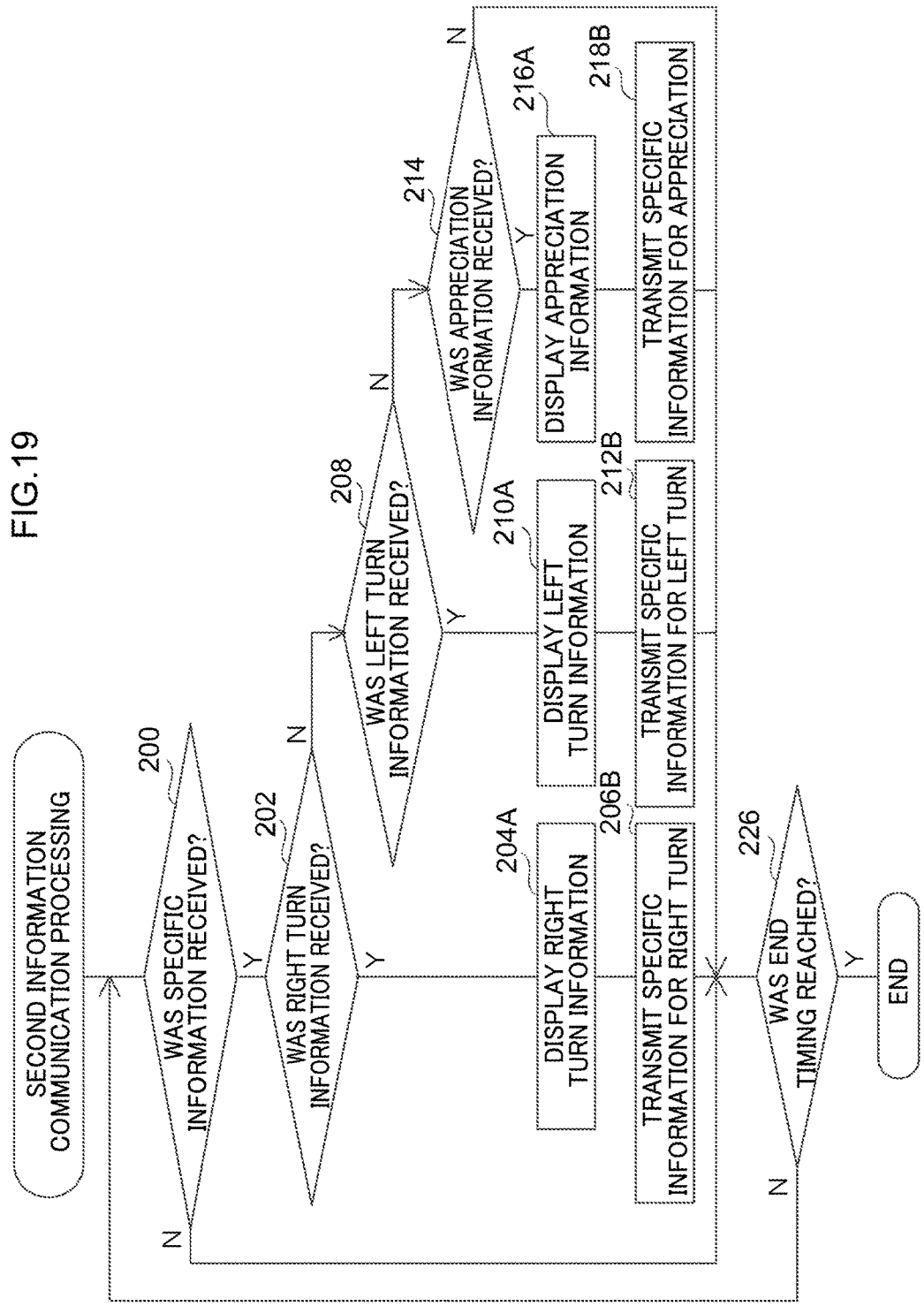
FIG. 19 is a flowchart illustrating an example of second information communication processing according to the second exemplary embodiment.

The second user is onboard the target automobile, and performs the second information communication processing illustrated in FIG. 19 by executing the second information communication program 63A using the second terminal 60B. Explanation follows regarding the second information communication processing according to the present exemplary embodiment. Steps in FIG. 19 that perform processing similar to those of FIG. 7 are allocated the same step numbers as in FIG. 7, and explanation thereof is omitted.

As illustrated in FIG. 19, the second information communication processing according to the present exemplary embodiment differs from the second information communication processing according to the first exemplary embodiment in that the processing of step 206B is employed instead of the processing of step 206A. Similarly, the second information communication processing according to the present exemplary embodiment differs from the second information communication processing according to the first exemplary embodiment in that processing of step 212B is employed instead of processing of step 212A, and processing of step 218B is employed instead of processing of step 218A.

Namely, at step 206B of the second information communication processing according to the present exemplary embodiment, the second transmission section 26B transmits the second second-terminal transmission information, in which the message information has been set to right turn information, to the server 70B using the wireless communication section 67. Processing transitions to step 226 when step 206B has ended. At step 212B of the second information communication processing according to the present exemplary embodiment, the second transmission section 26B transmits the second second-terminal transmission information, in which the message information has been set to left turn information, to the server 70B using the wireless communication section 67. Processing transitions to step 226 when step 212B has ended. At step 218B of the second information communication processing according to the present exemplary embodiment, the second transmission section 26B transmits the second second-terminal transmission information, in which the message information has been set to appreciation information, to the server 70B using the wireless communication section 67. Processing transitions to step 226 when step 218B has ended.

Figure 20:
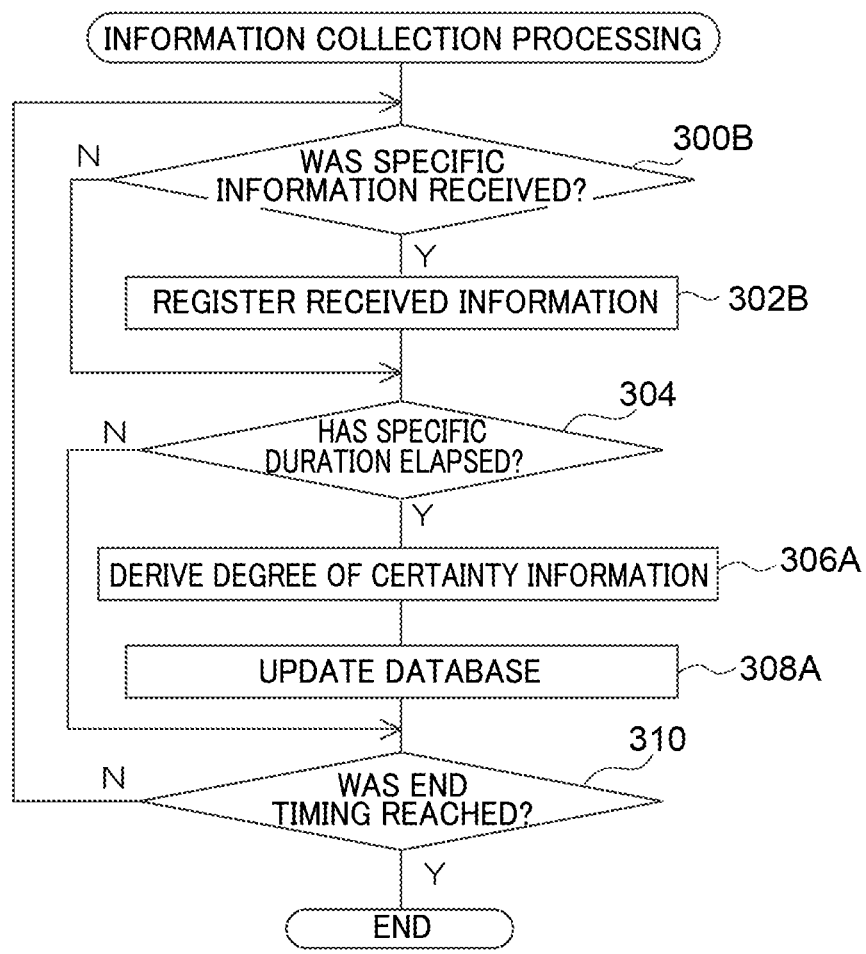
FIG. 20 is a flowchart illustrating an example of information collection processing according to the second exemplary embodiment.

The administrator of the server 70B performs the information collection processing illustrated in FIG. 20 by executing the information collection program 73A using the server 70B at a specific timing. Steps in FIG. 20 that perform processing similar to those of FIG. 11 are allocated the same step numbers as in FIG. 11, and explanation thereof is omitted.

As illustrated in FIG. 20, the information collection processing according to the present exemplary embodiment differs from the information collection processing according to the first exemplary embodiment in that step 300B is employed instead of the processing of step 300A. The information collection processing according to the present exemplary embodiment also differs from the information collection processing according to the first exemplary embodiment in that step 302B is employed instead of the processing of step 302A. The information collection processing according to the present exemplary embodiment also differs from the information collection processing according to the first exemplary embodiment in that the processing of step 304, step 306A, and step 308A is added between the processing of step 302B and the processing of step 310.

At step 300B of the information collection processing according to the present exemplary embodiment, the second reception section 32B determines whether or not the first first-terminal transmission information has been received from the first terminal 50B, or the second second-terminal transmission information has been received from the second terminal 60B. Here, processing transitions to step 304, described below, in cases in which negative determination has been made, or otherwise processing transitions to step 302B in cases in which affirmative determination has been made.

At step 302B, the registration section 34B stores (registers) information, excluding message information, from the received first first-terminal transmission information or from the second second-terminal transmission information, and the information indicating the category of the message information, in the communication information DB.

In the information collection processing according to the present exemplary embodiment, the information registered in the communication information DB by the processing of step 302B is classified into two types of information: information based on information received from the first terminal 50B, or information based on information received from the second terminal 60B. Hereafter, the information based on the information received from the first terminal 50B is referred to as "first terminal information", and the information based on the information received from the second terminal 60B is referred to as "second terminal information". In the example illustrated in FIG. 16, the information for which the second terminal device information is not registered as the device information (the information that is chronologically first and third out of the information having the ID '1001') is the first terminal information. Moreover, the information registered by the second terminal device information as the device information (the information that is chronologically second and fourth out of the information having the ID '1001') is the second terminal information.

At step 304, the registration section 34B determines whether or not a specific duration (3 hours in the present exemplary embodiment) has elapsed since execution of the present information collection processing started, and processing transitions to step 306A in cases in which affirmative determination has been made.

At step 306A, the registration section 34B derives the degree of certainty information as described below.

The registration section 34B first extracts the second terminal information from out of the information registered in the communication information DB, and identifies first terminal information that fulfills a first condition of including position information indicating a position at a distance within a specific distance from the position indicated by the position information included in the second terminal information. In the present exemplary embodiment, a distance envisaged to be the maximum inter-vehicle distance between the target bicycle 92 and the target automobile (5 m in the present exemplary embodiment) is employed as the specific distance; however, there is no limitation thereto.

Next, from out of the identified first terminal information, the registration section 34B identifies first terminal information fulfilling a second condition of including category information that indicates the same category as the category indicated by the category information included in the corresponding second terminal information. Next, from out of the identified first terminal information, the registration section 34B identifies first terminal information fulfilling a third condition that the duration between the timing indicated by the timing information and the timing indicated by the timing information included in the corresponding second terminal information is within a specific duration. Then, the registration section 34B sets the number of identified items of first terminal information as the degree of certainty information of the corresponding second terminal information. In the present exemplary embodiment, a duration envisaged to be the maximum duration between a point in time at which the server 70B received the message information from the first terminal 50B and a point in time at which the corresponding message information is received from the second terminal 60B (3 seconds in the present exemplary embodiment) is employed as the specific duration. However, there is no limitation thereto.

In the example illustrated in FIG. 16, for the second terminal information that is chronologically second out of the information having the ID '1001', for example, the degree of certainty information of the second terminal information is derived as '1' when the first condition to the third condition described above are satisfied only with the first terminal information that is chronologically first.

At the next step 308A, the registration section 34B stores (registers) the derived degree of certainty information in the communication information DB in association with the corresponding second terminal information, and erases the corresponding first terminal information from the communication information DB.

Otherwise, in cases in which negative determination has been made at step 304, processing transitions to step 310 without executing the processing of step 306A or step 308A above.

Note that the degree of certainty information registered in the communication information DB by the present information collection processing can be employed in the map generation processing (see FIG. 12) for, for example, generation of a site display map using only the second terminal information having degree of certainty information of 1 or more.

As described in detail above, in the present exemplary embodiment, the first transmission section of the first communication device also wirelessly transmits the second position information enabling identification of the position at which the specific information was transmitted, and the second reception section of the information collection device also receives the second position information transmitted by the first transmission section. Then, in the present exemplary embodiment, in cases in which the first condition to the third condition have been satisfied, the registration section of the information collection device increases the value of the degree of certainty information indicating the certainty of the position information, and then stores the increased value in the storage section in association with that position information. The position information can therefore be effectively utilized as a result enabling the reliability of the corresponding position information to be ascertained by referring to the degree of certainty information.

Although explanation has been given of a case in which the degree of certainty information is registered (updated) in the communication information DB without modifying the second terminal information in the present exemplary embodiment, there is no limitation thereto. For example, when the degree of certainty information is registered (updated), an average value may be computed for the timing information, the position information, or both, of the second terminal information, and the information corresponding to the first terminal information to be erased at this time, and the information corresponding to the second terminal information may be updated to this average value.

Although explanation has been given regarding a case in which the degree of certainty information is derived using the three conditions of the first condition to the third condition in the present exemplary embodiment, there is no limitation thereto. For example, one of these conditions alone, or a combination of two of these conditions may be used to derive the degree of certainty information.

Third Exemplary Embodiment

Figure 21:
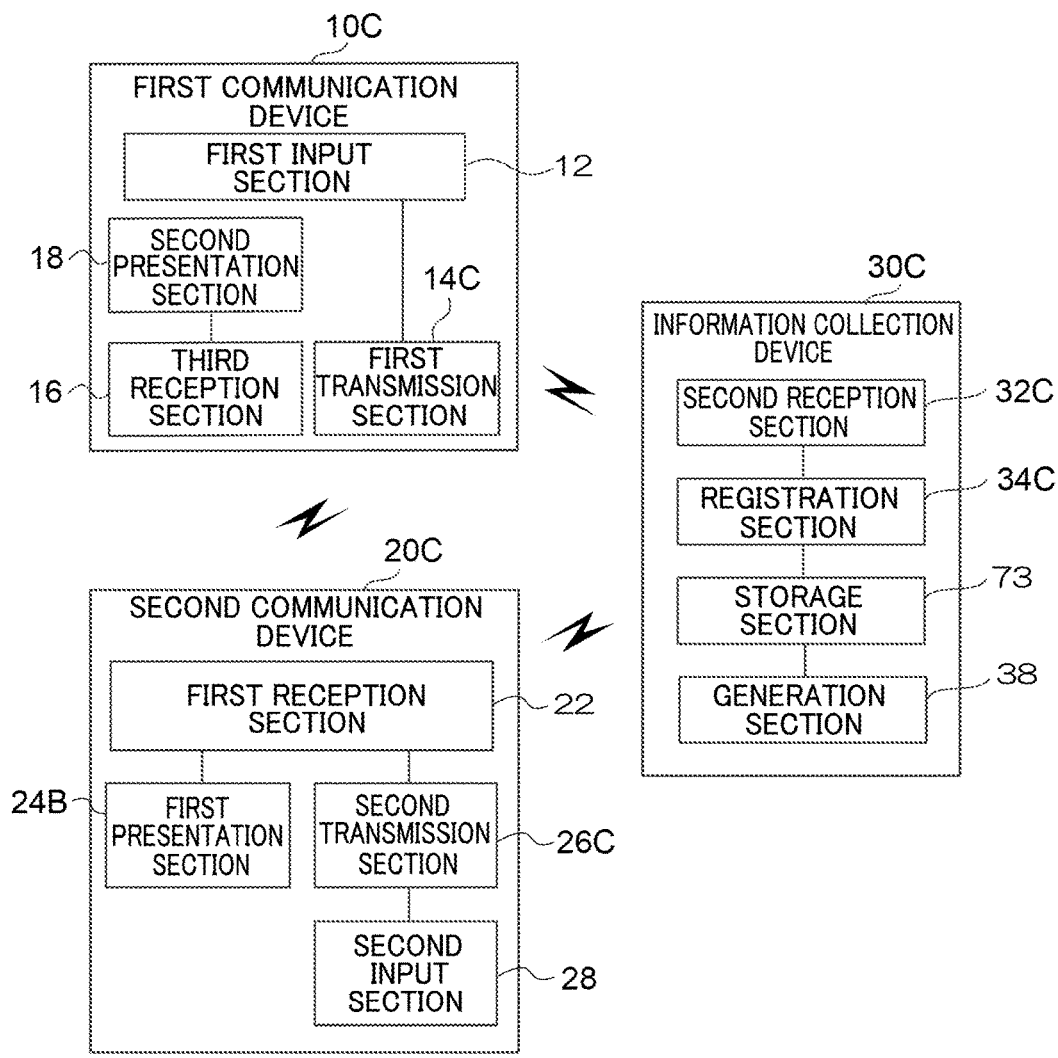
FIG. 21 functional block diagram of a first communication device, a second communication device, and an information collection device according to a third exemplary embodiment.

Next, explanation follows regarding a third exemplary embodiment of technology disclosed herein. FIG. 21 illustrates a first communication device 10C, a second communication device 20C, and an information collection device 30C according to the present exemplary embodiment. Configuration elements in FIG. 21 similar those of the respective devices illustrated in FIG. 1 are allocated the same reference numerals as in FIG. 1, and explanation thereof is omitted.

As illustrated in FIG. 21, the first communication device 10C according to the third exemplary embodiment differs from the first communication device 10A in that a first transmission section 14C for performing transmission processing different from that of the first transmission section 14A is employed instead of the first transmission section 14A. Moreover, the first communication device 10C according to the third exemplary embodiment differs from the first communication device 10A in that a third reception section 16 and a second presentation section 18 are additionally provided.

Moreover, the second communication device 20C according to the third exemplary embodiment differs from the second communication device 20A in that a first presentation section 24B for performing presentation processing different from that of the first presentation section 24A is employed instead of the first presentation section 24A. Moreover, the second communication device 20C according to the third exemplary embodiment differs from the second communication device 20A in that a second transmission section 26C for performing transmission processing different from that of the second transmission section 26A is employed instead of the second transmission section 26A. Moreover, the second communication device 20C according to the third exemplary embodiment differs from the second communication device 20A in that a second input section 28 is additionally provided.

Moreover, the information collection device 30C according to the third exemplary embodiment differs from the information collection device 30A in that a second reception section 32C for performing reception processing different from that of the second reception section 32A is employed instead of the second reception section 32A. Moreover, the information collection device 30C according to the third exemplary embodiment differs from the information collection device 30A in that a registration section 34C for performing registration processing different from that of the registration section 34A is employed instead of the registration section 34A.

Figure 22:
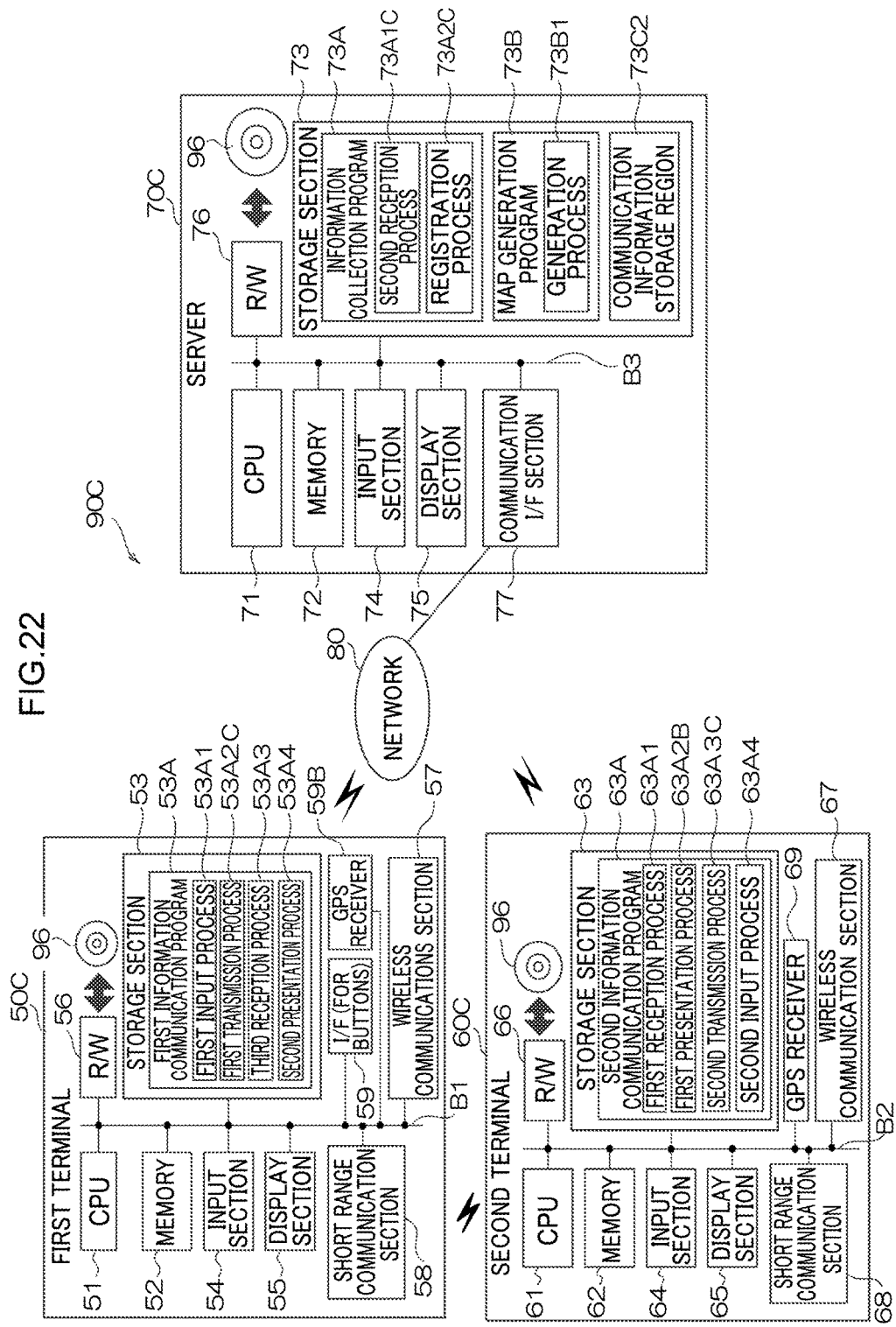
FIG. 22 is a block diagram illustrating a schematic configuration of a computer system according to the third exemplary embodiment.

The first communication device 10C, the second communication device 20C, and the information collection device 30C may be respectively implemented by a first terminal 50C, a second terminal 60C, and a server 70C included in a computer system 90C illustrated in FIG. 22. Explanation follows regarding configuration of the first terminal 50C, the second terminal 60C, and the server 70C according to the third exemplary embodiment, with reference to FIG. 22. Configuration elements in FIG. 22 that are similar to those of the computer system 90A of FIG. 2 are allocated the same reference numerals as in FIG. 2, and explanation thereof is omitted.

As illustrated in FIG. 22, the first terminal 50C according to the present exemplary embodiment differs from the first terminal 50A in that the GPS receiver 59B, similar to the GPS receiver 69 provided to the second terminal 60C, is additionally provided. The GPS receiver 59B is connected to the bus B1.

Moreover, the first terminal 50C differs from the first terminal 50A in that the first transmission process 53A2A of the first information communication program 53A configured as a first transmission process 53A2C for performing transmission processing different from that of the first transmission process 53A2A. Moreover, the first terminal 50C differs from the first terminal 50A in that a third reception process 53A3 and a second presentation process 53A4 are additionally provided to the first information communication program 53A. The CPU 51 operates as the first transmission section 14C illustrated in FIG. 21 by executing the first transmission process 53A2C. The CPU 51 also operates as the third reception section 16 illustrated in FIG. 21 by executing the third reception process 53A3. The CPU 51 also operates as the second presentation section 18 illustrated in FIG. 21 by executing the second presentation process 53A4. The first terminal 50C, which executes the first information communication program 53A, thereby functions as the first communication device 10C.

The second terminal 60C according to the present exemplary embodiment differs from the second terminal 60A in that the first presentation process 63A2A of the second information communication program 63A is configured as a first presentation process 63A2B for performing presentation processing different from that of the first presentation process 63A2A. Moreover, the second terminal 60C according to the present exemplary embodiment differs from the second terminal 60A in that the second transmission process 63A3A of the second information communication program 63A is configured as a second transmission process 63A3C for performing transmission processing different from that of the second transmission process 63A3A. Moreover, the second terminal 60C differs from the second terminal 60A in that a second input process 63A4 is additionally provided to the second information communication program 63A. The CPU 61 operates as the first presentation section 24B illustrated in FIG. 21 by executing the first presentation process 63A2B. The CPU 61 also operates as the second transmission section 26C illustrated in FIG. 21 by executing the second transmission process 63A3C. The CPU 61 also operates as the second input section 28 illustrated in FIG. 21 by executing the second input process 63A4. The second terminal 60C, which executes the second information communication program 63A, thereby functions as the second communication device 20C.

Moreover, the server 70C according to the present exemplary embodiment differs from the server 70A in that the second reception process 73A1A of the information collection program 73A is configured as a second reception process 73A1C for performing reception processing different from that of the second reception process 73A1A. Moreover, the server 70C according to the present exemplary embodiment differs from the server 70A in that the registration process 73A2A of the information collection program 73A is configured as a registration process 73A2C for performing registration processing different from that of the registration process 73A2A. The CPU 71 operates as the second reception section 32C illustrated in FIG. 21 by executing the second reception process 73A1C. The CPU 71 also operates as the registration section 34C illustrated in FIG. 21 by executing the registration process 73A2C. The server 70C, which executes the information collection program 73A, thereby functions as the information collection device 30C.

A communication information storage region 73C2 is provided to the storage section 73 of the server 70C instead of the communication information storage region 73C1. The CPU 71 generates a communication information DB according to the present exemplary embodiment by expanding data stored in the communication information storage region 73C2 into the memory 72. The communication information DB according to the third exemplary embodiment is similar to the communication information DB according to the second exemplary embodiment illustrated in FIG. 16, and explanation thereof is therefore omitted.

Figure 23:
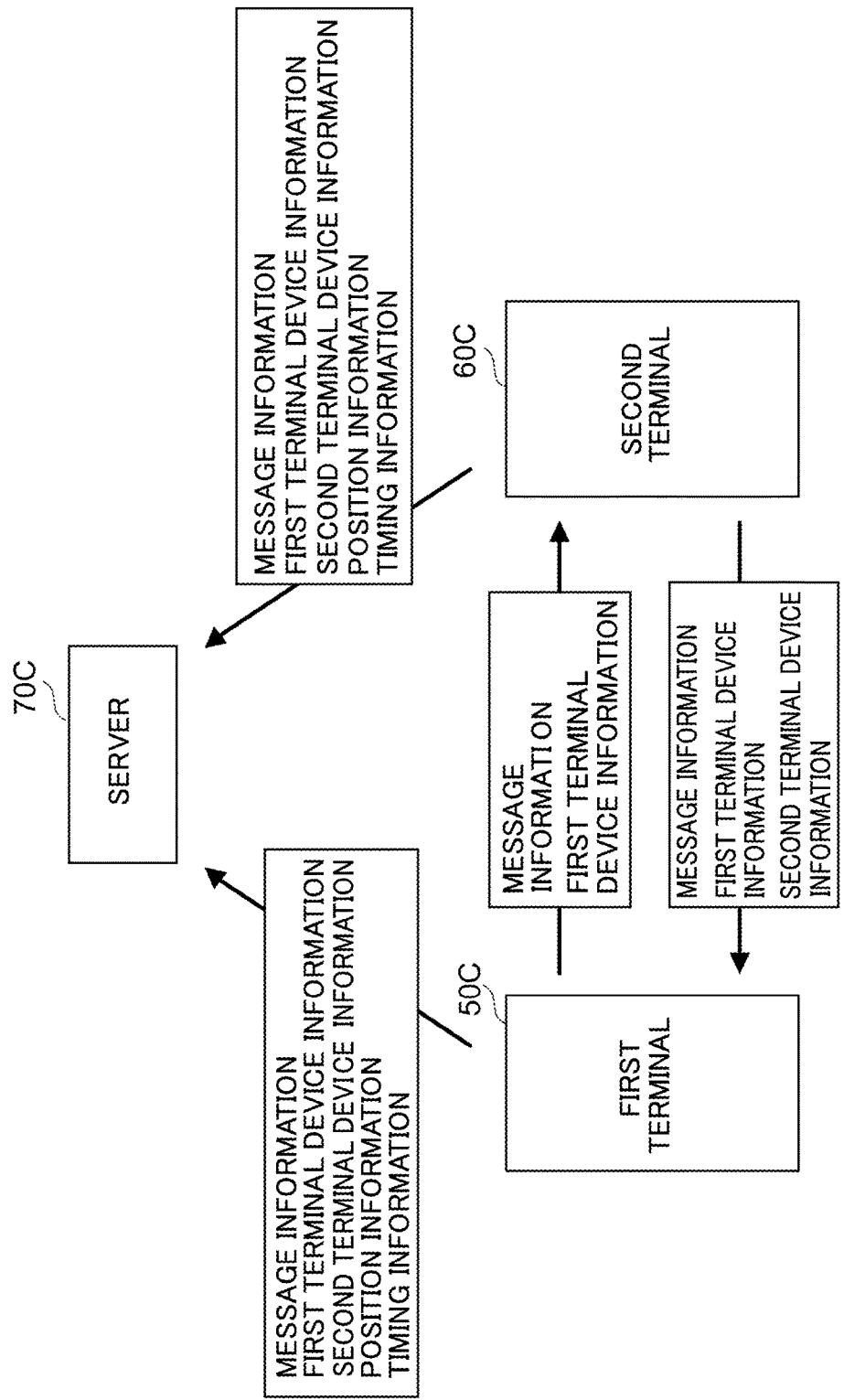
FIG. 23 is a schematic diagram explaining a chronological flow of information transmitted/received between respective devices of a computer system according to the third exemplary embodiment.

Next, explanation follows regarding operation of the present exemplary embodiment. First, explanation follows regarding a chronological flow of information transmitted/received between the respective devices out of the first terminal 50C, the second terminal 60C, and the server 70C according to the present exemplary embodiment, with reference to FIG. 23.

The first terminal 50C provided to the target bicycle 92 is similar to the first terminal 50A in that any message information out of right turn information, left turn information, and appreciation information is, according to operation by the first user, transmitted together with the first terminal device information to the second terminal 60C provided to a target automobile travelling behind.

The second terminal 60C provided to the target automobile is also similar to the second terminal 60A in that the message information, the first terminal device information, the second terminal device information, and the position information are transmitted to the server 70C when the message information and the first terminal device information have been received from the first terminal 50C. However, the second terminal 60C according to the present exemplary embodiment differs from the second terminal 60A in that timing information of that point in time is transmitted to the server 70C in addition to this information. Namely, the second terminal 60C according to the present exemplary embodiment also transmits the second second-terminal transmission information to the server 70C, similarly to the second terminal 60B according to the second exemplary embodiment. When this is performed, the second terminal 60C acquires the timing information indicating that point in time, measured using inbuilt clock functionality, as the timing information.

Moreover, when message information in reply to the message information received from the first terminal 50C has been input by the second user, the second terminal 60C transmits the message information, together with the first terminal device information received from the first terminal 50C and the second terminal device information of the terminal itself, to the first terminal 50C. When this is performed, the message information, the first terminal device information, and the second terminal device information transmitted from the second terminal 60C to the first terminal 50C are also referred to as "response information" hereafter.

In the present exemplary embodiment, "confirmation information" expressing that confirmation has been made, and "you're welcome information" expressing that there is no need for concern, are employed as the message information input by the second user using the second terminal 60C according to the message information from the first terminal 50C.

When the first terminal 50C has received the message information, the first terminal device information, and the second terminal device information from the second terminal 60C, the first terminal 50C transmits this information, the position information indicating the position of the device itself at that point in time, and the timing information indicating the timing of that point in time, to the server 70C. When this is performed, the first terminal 50C acquires a position obtained by the GPS receiver 59B at that point in time as the position information. Moreover, when this is performed, the first terminal 50C acquires the timing of that point in time, measured using inbuilt clock functionality, as the timing information. Hereafter, the message information, the first terminal device information, the second terminal device information, the position information, and the timing information transmitted to the server 70C by the first terminal 50C are referred to as "second first-terminal transmission information".

Accordingly, the server 70C stores (registers) the information out of the second second-terminal transmission information, excluding the message information, received from the second terminal 60C, and category information indicating the category of the message information, in the storage region corresponding to the communication information DB (see also FIG. 16). The server 70C also stores (registers) the information out of the second first-terminal transmission information, excluding the message information, received from the first terminal 50C, and category information indicating the category of the message information, in the storage region corresponding to the communication information DB. When this is performed, the server 70C registers, in the communication information DB, an ID that differs for each of the segments described above.

Here, the server 70C according to the present exemplary embodiment derives degree of certainty information indicating how certain it is that the second second-terminal transmission information was received from the second terminal 60C, and this is explained in detailed later. Then, the server 70C stores (registers) the derived degree of certainty information in the communication information DB in association with the position information of the corresponding second second-terminal transmission information.

Next, specific explanation follows regarding processing executed by the respective devices out of the first terminal 50C, the second terminal 60C, and the server 70C. The first user is onboard the target bicycle 92, and performs the first information communication processing illustrated in FIG. 24 by executing the first information communication program 53A using the first terminal 50C. Explanation follows regarding the first information communication processing according to the present exemplary embodiment. Steps in FIG. 24 that perform similar processing to those of FIG. 6 are allocated the same step numbers as in FIG. 6, and explanation thereof is omitted.

Figure 24:
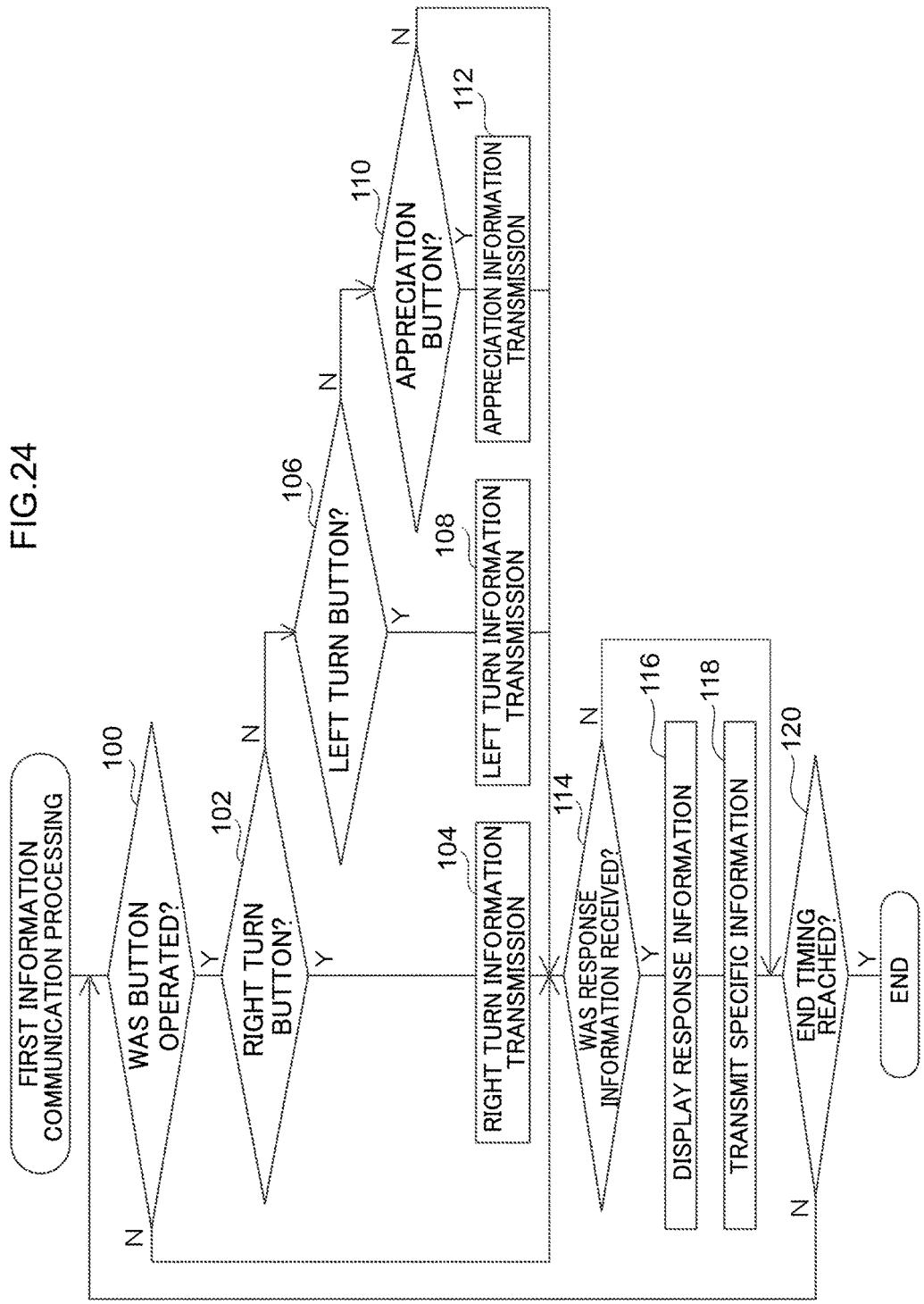
FIG. 24 is a flowchart illustrating an example of first information communication processing according to the third exemplary embodiment.

Moreover, as illustrated in FIG. 24, the first information communication processing according to the present exemplary embodiment differs from the first information communication processing according to the first exemplary embodiment in that processing of step 114 to step 118 is added immediately before the processing of step 120. Accordingly, in the first information communication processing according to the present exemplary embodiment, processing transitions to step 114 in cases in which a negative determination was made in the processing of step 100, and in cases in which the respective processing of step 104, step 108, and step 112 have ended.

As described above, the second terminal 60C according to the present exemplary embodiment transmits the response information to the first terminal 50C when the second user has input the message information according to the message information received from the first terminal 50C.

At step 114 of the first information communication processing according to the present exemplary embodiment, the third reception section 16 determines whether or not the response information has been received from the second terminal 60C, and processing transitions to step 120 in cases in which negative determination has been made, or otherwise, processing transitions to step 116 in cases in which affirmative determination has been made.

At step 116, the second presentation section 18 controls the display section 55 so as to display a response display screen predetermined as a screen for displaying the message information included in the received response information.

Figure 25:
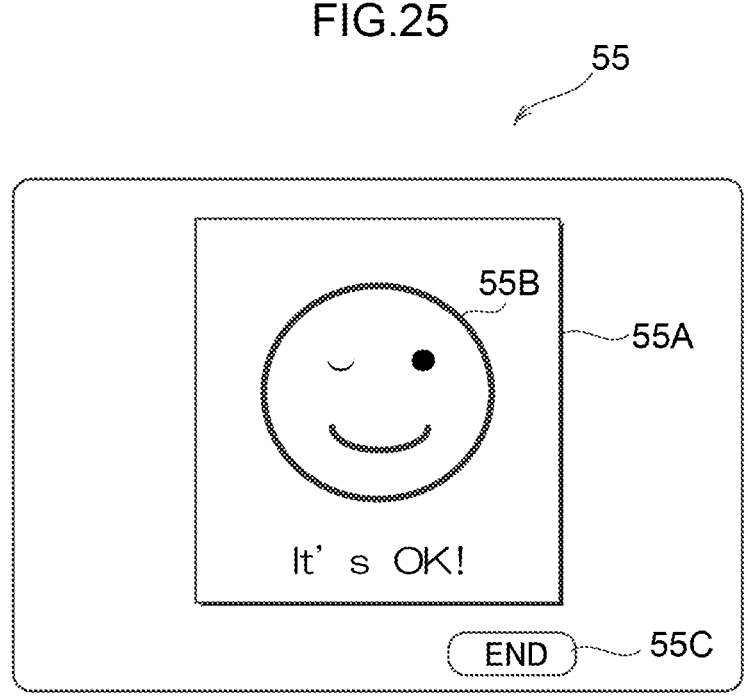
FIG. 25 is a schematic diagram illustrating an example of a response display screen according to the third exemplary embodiment.

FIG. 25 illustrates an example of a response display screen according to the present exemplary embodiment in a case in which the message information included in the received response information was "you're welcome information". As illustrated in FIG. 25, an image (in the present exemplary embodiment, an image showing a smiling face similar to the appreciation image) 55B indicating that there is no need for concern, and a message ("It's OK!" in the example illustrated in FIG. 25), are displayed on the response display screen according to the present exemplary embodiment. Accordingly, the first user can easily ascertain that the occupant of the automobile travelling behind is expressing that there is no need for concern, by referring to the response display screen. In cases in which the first user wishes to remove the response display screen from the display section 55, this is specified with a fingertip using an "End" button 55C displayed at the lower side of the response display screen. The response display screen is thereby removed from the display section 55.

At the next step 118, the first transmission section 14C transmits the response information received from the second terminal 60C, the position information, and the timing information described above to the server 70C using the wireless communications section 57, and processing then transitions to step 120.

Figure 26:
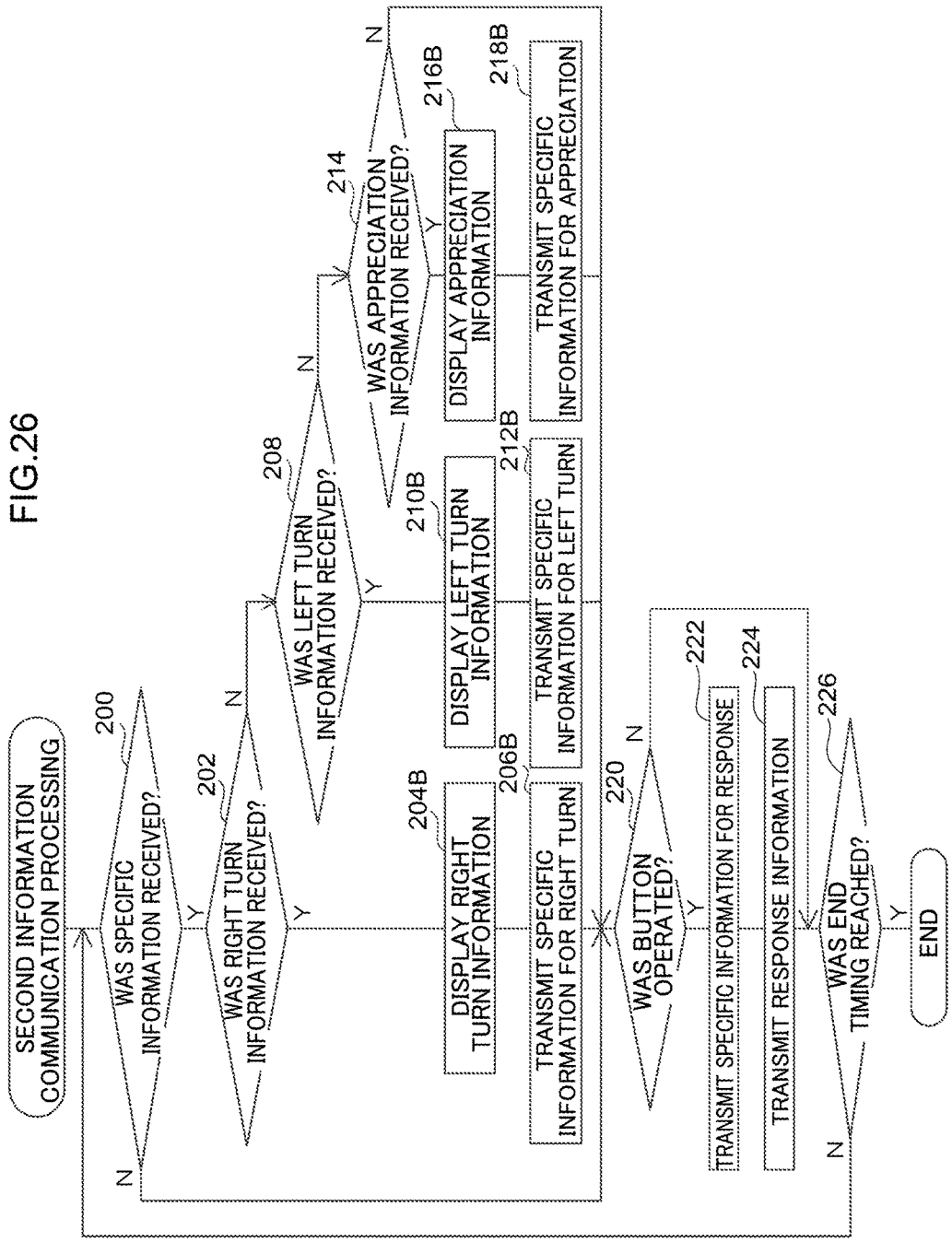
FIG. 26 is a flowchart illustrating an example of second information communication processing according to the third exemplary embodiment.

The second user is onboard the target automobile, and performs the second information communication processing illustrated in FIG. 26 by executing the second information communication program 63A using the second terminal 60C. Explanation follows regarding the second information communication processing according to the present exemplary embodiment. Steps in FIG. 26 that perform processing similar to those of FIG. 7 are allocated the same step numbers as in FIG. 7, and explanation thereof is omitted.

As illustrated in FIG. 26, the second information communication processing according to the present exemplary embodiment differs from the second information communication processing according to the first exemplary embodiment in that the processing of step 204B is employed instead of the processing of step 204A. Similarly, the second information communication processing according to the present exemplary embodiment differs from the second information communication processing according to the first exemplary embodiment in that processing of step 210B is employed instead of processing of step 210A, and processing of step 216B is employed instead of processing of step 216A.

As illustrated in FIG. 26, the second information communication processing according to the present exemplary embodiment differs from the second information communication processing according to the first exemplary embodiment in that the processing of step 206B is employed instead of the processing of step 206A. Similarly, the second information communication processing according to the present exemplary embodiment differs from the second information communication processing according to the first exemplary embodiment in that processing of step 212B is employed instead of processing of step 212A, and processing of step 218B is employed instead of processing of step 218A.

Moreover, as illustrated in FIG. 26, the second information communication processing according to the present exemplary embodiment differs from the second information communication processing according to the first exemplary embodiment in that processing of step 220 to step 224 is added immediately before the processing of step 226. Accordingly, in the second information communication processing according to the present exemplary embodiment, processing transitions to step 220 in cases in which a negative determination was made in the processing of step 200, and in cases in which the respective processing of step 206B, step 212B, and step 218B have ended.

Namely, at step 204B of the second information communication processing according to the present exemplary embodiment, the first presentation section 24B controls the display section 65 so as to display a right turn display screen predetermined as a screen for displaying the tight turn information, and processing then transitions to step 206B. Moreover, at step 210B, the first presentation section 24B controls the display section 65 so as to display a left turn display screen predetermined as a screen for displaying the left turn information, and processing then transitions to step 212B. Moreover, at step 216B, the first presentation section 24B controls the display section 65 so as to display an appreciation display screen predetermined as a screen for displaying the appreciation information, and processing then transitions to step 218B.

Figure 27:
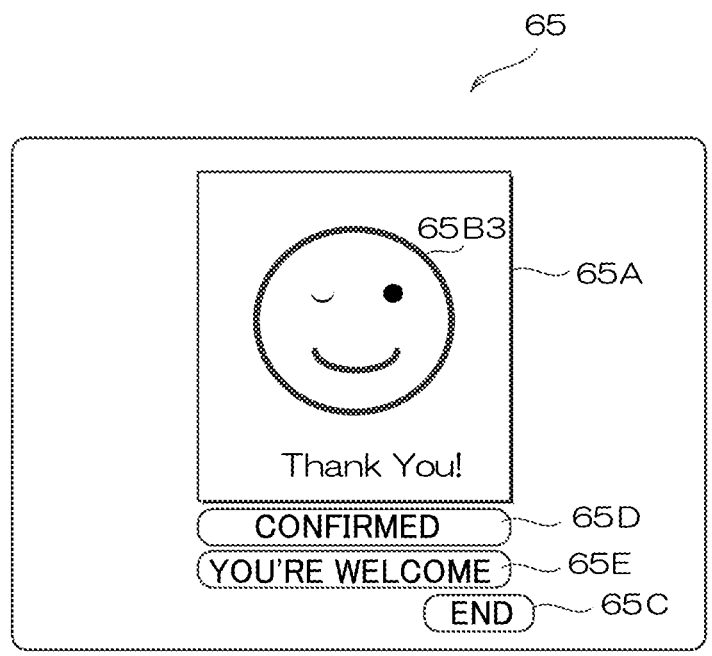
FIG. 27 is a schematic diagram illustrating an example of an appreciation display screen according to the third exemplary embodiment.

Note that, as illustrated as an example in FIG. 27, the right turn display screen, the left turn display screen, and the appreciation display screen according to the present exemplary embodiment differ from the respective display screens according to the first exemplary embodiment in that a "Confirmed" button 65D is additionally displayed on the respective display screens illustrated in FIG. 8 to FIG. 10. Similarly, the right turn display screen, the left turn display screen, and the appreciation display screen according to the present exemplary embodiment differ from the respective display screens according to the first exemplary embodiment in that a "You're Welcome" button 65E is additionally displayed on the respective display screens. Note that an example of an appreciation display screen is illustrated in FIG. 27.

When any of the display screens are displayed by the display section 65, the second user stipulates the "Confirmed" button 65D with a fingertip when indicating that the display content has been confirmed, and stipulates the "You're Welcome" button 65E with a fingertip when indicating that there is no need for concern.

The processing of the respective steps out of step 206B, step 212B, and step 218B is performed similarly to the processing of the steps in the second information communication processing according to the second exemplary embodiment that have the same step numbers, and explanation thereof is therefore omitted.

At step 220, the second input section 28 determines whether or not the "Confirmed" button 65D or the "You're Welcome" button 65E has been specified, and processing transitions to step 226 in cases in which negative determination has been made, or otherwise processing transitions to step 222 in cases in which affirmative determination has been made.

At step 222, the second transmission section 26C transmits the message information corresponding to the specified button, the first terminal device information received immediately prior from the first terminal 50C, the second terminal device information, and the above-described position information and timing information, to the server 70C using the wireless communication section 67.

At the next step 224, the second transmission section 26C generates response information that includes the message information corresponding to the specified button, and transmits the response information to the first terminal 50C using the short range communication section 68, and processing then transitions to step 226. When the response information is received, the first terminal 50C displays the response display screen illustrated in FIG. 25 as an example, and transmits the response information, and the position information and timing information described above, to the server 70C, as described above.

Figure 28:
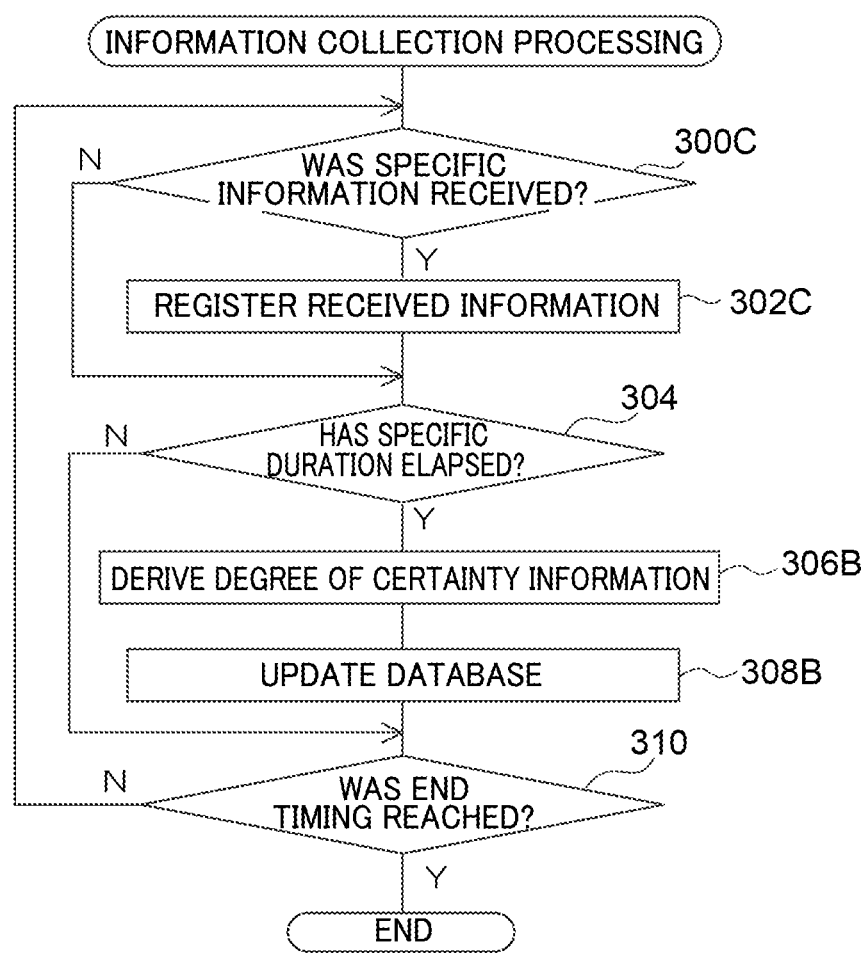
FIG. 28 is a flowchart illustrating an example of information collection processing according to the third exemplary embodiment.

The administrator of the server 70C performs information collection processing illustrated in FIG. 28 by executing the information collection program 73A using the server 70C at a specific timing. Steps in FIG. 28 that perform processing similar to that of steps in FIG. 11 are allocated the same step numbers as in FIG. 11, and explanation thereof is omitted.

As illustrated in FIG. 28, the information collection processing according to the present exemplary embodiment differs from the information collection processing according to the first exemplary embodiment in that step 300C is employed instead of the processing of step 300A. Moreover, the information collection processing according to the present exemplary embodiment differs from the information collection processing according to the first exemplary embodiment in that step 302C is employed instead of the processing of step 302A. Moreover, the information collection processing according to the present exemplary embodiment differs from the information collection processing according to the first exemplary embodiment in that the processing of step 304, step 306B, and step 308B is added between the processing of step 302C and the processing of step 310.

At step 300C of the information collection processing according to the present exemplary embodiment, the second reception section 32C determines whether or not the second first-terminal transmission information has been received from the first terminal 50C, or the second second-terminal transmission information has been received from the second terminal 60C. Here, processing transitions to step 304, described below, in cases in which negative determination has been made, or otherwise processing transitions to step 302C in cases in which affirmative determination has been made.

At step 302C, the registration section 34C stores (registers) the information, excluding the message information, from the received second first-terminal transmission information or the second second-terminal transmission information, and information representing the category of the message information, in the communication information DB.

In the information collection processing according to the present exemplary embodiment, information registered by the processing of step 302C is classified into two types of information: first terminal information based on information received from the first terminal 50C, or second terminal information based on information received from the second terminal 60C. In the information collection processing according to the present exemplary embodiment, the first terminal information registered by the processing of step 302C differs from that of the second exemplary embodiment in that the second terminal device information is added to the first terminal information registered in the information collection processing according to the second exemplary embodiment illustrated in FIG. 16. Accordingly, other than the category information, the timing information, and the position information, the first terminal information according to the present exemplary embodiment is information equivalent to the corresponding second terminal information.

At step 304, the registration section 34C determines whether or not a specific duration (3 hours in the present exemplary embodiment) has elapsed since execution of the current information collection processing started, and processing transitions to step 306B in cases in which affirmative determination has been made.

At step 306B, the registration section 34C derives the degree of certainty information as described below.

The registration section 34C first extracts, from out of the information registered in the communication information DB, combinations of first terminal information and second terminal information that share first terminal device information and second terminal device information. Next, the registration section 34C identifies, from out of the extracted combinations of first terminal information and second terminal information, combinations that fulfill a fourth condition of the distance between positions indicated by each item of included position information being within a specific distance. In the present exemplary embodiment, a maximum distance envisaged as the inter-vehicle distance between the target bicycle 92 and the target automobile (5 m in the present exemplary embodiment) is employed as the specific distance; however, there is no limitation thereto.

Moreover, the registration section 34C identifies combinations, from out of the identified combinations of first terminal information and second terminal information, that fulfill a fifth condition of being combinations in which the respective items of included category information indicate that the items of message information are confirmation information or you're welcome information, and appreciation information. Moreover, the registration section 34C identifies, from out of the identified combinations of first terminal information and second terminal information, combinations that fulfill a sixth condition that the duration between the timings indicated by each item of included timing information is within a specific duration. Then, the registration section 34C sets the number of items of first terminal information included in the identified respective combinations as the degree of certainty information for the second terminal information of those combinations. In the present exemplary embodiment, a duration envisaged to be the maximum duration between a point in time at which the server 70C received message information from the first terminal 50C and a point in time at which the corresponding message information is received from the second terminal 60C (3 seconds in the present exemplary embodiment) is employed as the specific duration. However, there is no limitation thereto.

At the next step 308B, the registration section 34C stores (registers) the identified degree of certainty information in the communication information DB in association with the corresponding second terminal information for the combinations that fulfill conditions of the fourth condition to the sixth condition. The registration section 34C also erases the first terminal information from the communication information DB. When this is performed, degree of certainty information is sometimes already registered for the second terminal information for which degree of certainty information is to be registered. In such cases, the value of the derived degree of certainty information added to the registered degree of certainty information is stored (updated) as new degree of certainty information in the communication information DB.

Otherwise, in cases in which negative determination has been made at step 304, processing transitions to step 310 without executing the processing of step 306B or step 308B described above.

As explained in detail above, in the present exemplary embodiment, the second communication device receives operations from the second input section, and the second transmission section of the second communication device also wirelessly transmits second specific information according to the operation received by the second input section. Accordingly, in the present exemplary embodiment, the first communication device uses the third reception section to receive the second specific information transmitted by the second transmission section.

Moreover, in the present exemplary embodiment, the first transmission section of the first communication device also transmits, to the information collection device, the second position information enabling identification of the position at which the second specific information was received by the third reception section, and the second reception section of the information collection device also receives the second position information transmitted by the first transmission section.

In the present exemplary embodiment, in cases in which the fourth condition to the sixth condition have been satisfied, the registration section of the information collection device increases the value of the degree of certainty information indicating the certainty of the position information, and registers the increased value in the storage section in association with that position information. The position information can therefore be effectively utilized as a result of enabling the reliability of the corresponding position information to be ascertained by referring to the degree of certainty information.

Although explanation has been given of a case in which the degree of certainty information is registered (updated) in the communication information DB without modifying the second terminal information in the present exemplary embodiment, there is no limitation thereto. For example, when the degree of certainty information is registered (updated), an average value of the timing information, the position information, or both, of the second terminal information and the information corresponding to the first terminal information to be erased at this time may be computed, and the information corresponding to the second terminal information may be updated to this average value.

Although explanation has been given regarding a case in which the degree of certainty information is derived using the three conditions of the fourth condition to the sixth condition in the present exemplary embodiment, there is no limitation thereto. For example, one of these conditions alone, or a combination of two of these conditions may be used to derive the degree of certainty information.

Fourth Exemplary Embodiment

Figure 29:
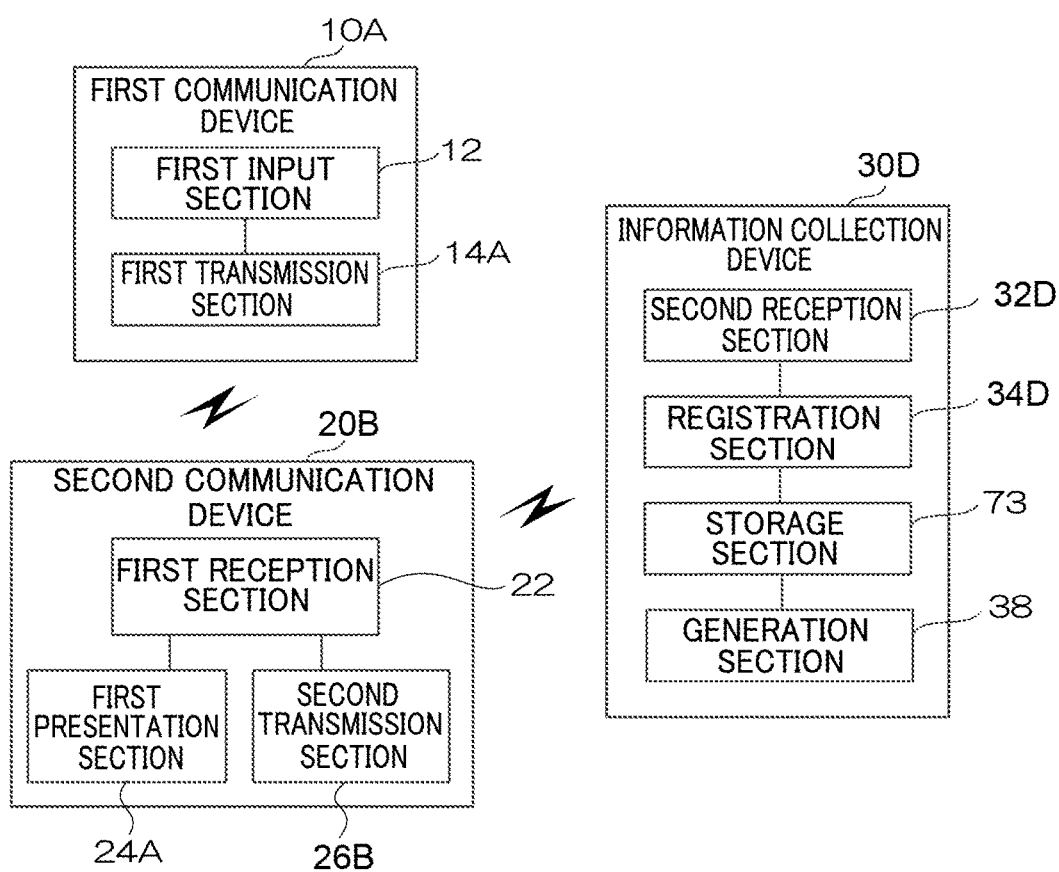
FIG. 29 is a functional block diagram of a first communication device, a second communication device, and an information collection device according to a fourth exemplary embodiment.

Next, explanation follows regarding a fourth exemplary embodiment of technology disclosed herein. FIG. 29 illustrates a first communication device 10A, a second communication device 20B, and an information collection device 30D according to the present exemplary embodiment. Configuration elements in FIG. 29 similar those of the respective devices illustrated in FIG. 1 and FIG. 14 are allocated the same reference numerals as in FIG. 1 and FIG. 14, and explanation thereof is omitted.

As illustrated in FIG. 29, the information collection device 30D according to the fourth exemplary embodiment differs from the information collection device 30A in that a second reception section 32D for performing reception processing different from that of the second reception section 32A is employed instead of the second reception section 32A. Moreover, the information collection device 30D according to the fourth exemplary embodiment differs from the information collection device 30A in that a registration section 34D for performing registration processing different from that of the registration section 34A is employed instead of the registration section 34A.

Figure 30:
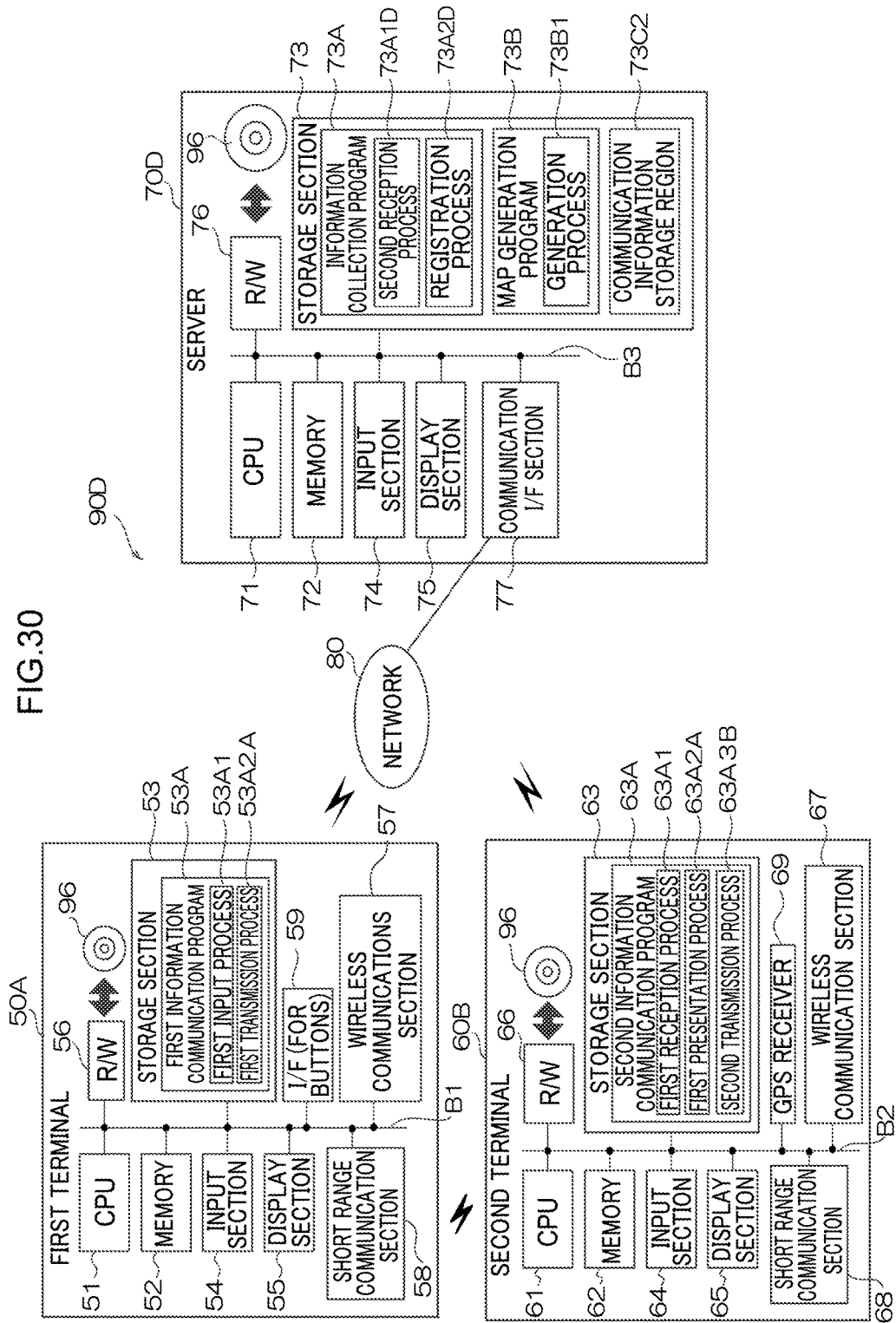
FIG. 30 is a block diagram illustrating a schematic configuration of a computer system according to the fourth exemplary embodiment.

The first communication device 10A, the second communication device 20B, and the information collection device 30D may be respectively implemented by a first terminal 50A, a second terminal 60B, and a server 70D included in a computer system 90D illustrated in FIG. 30. Explanation follows regarding configuration of the first terminal 50A, the second terminal 60B, and the server 70D according to the fourth exemplary embodiment, with reference to FIG. 30. Configuration elements in FIG. 30 that are similar to those of the computer system 90A of FIG. 2 and the computer system 90B of FIG. 15 are allocated the same reference numerals as in FIG. 2 and FIG. 15, and explanation thereof is omitted.

As illustrated in FIG. 30, the server 70D according to the present exemplary embodiment differs from the server 70A in that the second reception process 73A1A of the information collection program 73A is configured as a second reception process 73A1D for performing reception processing different from that of the second reception process 73A1A. Moreover, the server 70D according to the present exemplary embodiment differs from the server 70A in that the registration process 73A2A of the information collection program 73A is configured as a registration process 73A2D for performing registration processing different from that of the registration process 73A2A. The CPU 71 operates as the second reception section 32D illustrated in FIG. 29 by executing the second reception process 73A1D. The CPU 71 also operates as the registration section 34D illustrated in FIG. 29 by executing the registration process 73A2D. The server 70D, which executes the information collection program 73A, thereby functions as the information collection device 30D.

Moreover, a communication information storage region 73C2 is provided in the storage section 73 of the server 70D instead of the communication information storage region 73C1. The CPU 71 generates the communication information DB according to the present exemplary embodiment by expanding data stored in the communication information storage region 73C2 into the memory 72. The communication information DB according to the fourth exemplary embodiment is similar to the communication information DB according to the second exemplary embodiment illustrated in FIG. 16, and explanation thereof is therefore omitted.

Figure 31:
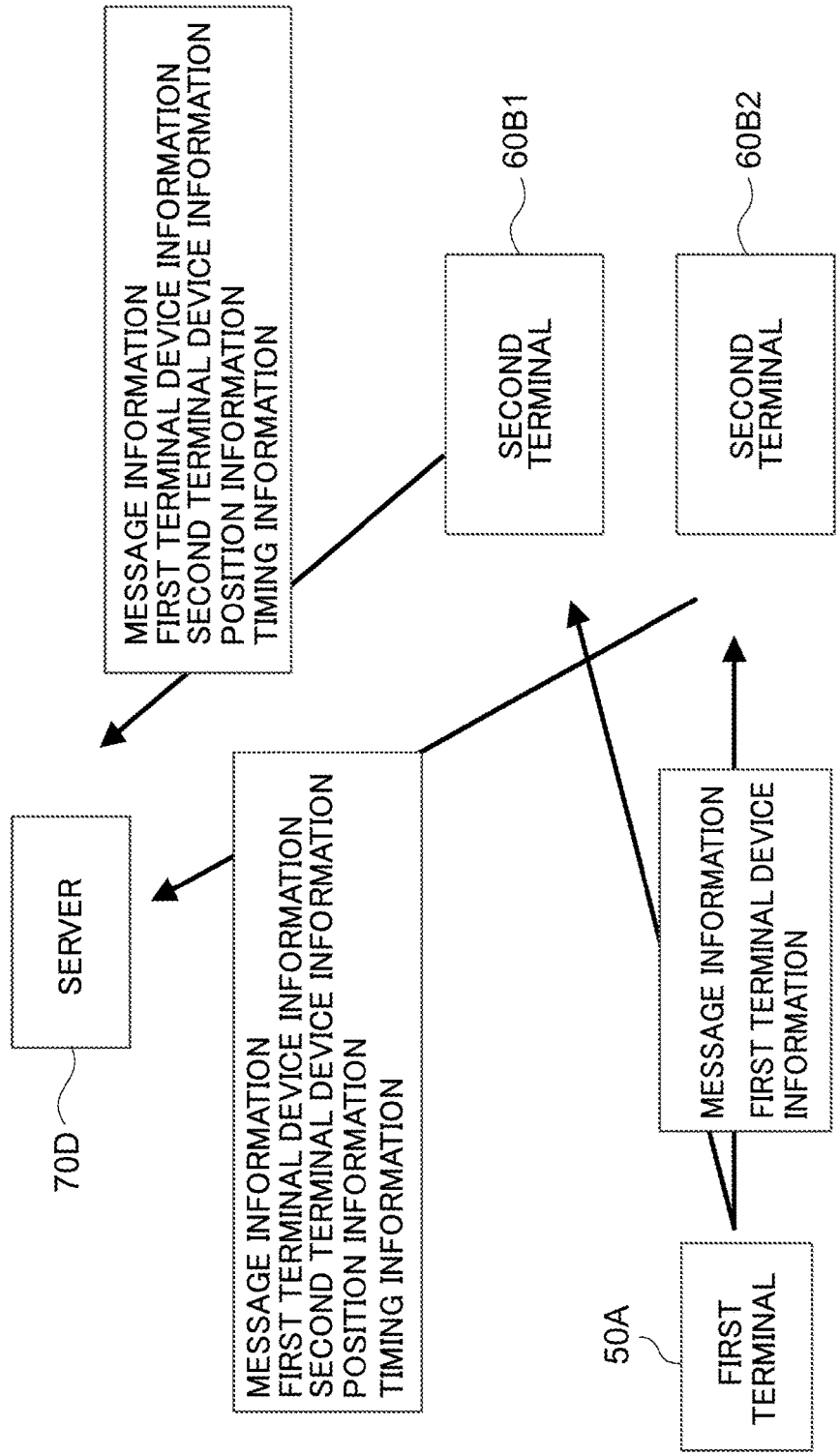
FIG. 31 is a schematic diagram explaining a chronological flow of information transmitted/received between respective devices of a computer system according to the fourth exemplary embodiment.

Next, explanation follows regarding operation of the present exemplary embodiment. First, explanation follows regarding a chronological flow of information transmitted/received between the respective devices out of the first terminal 50A, the second terminal 60B, and the server 70D according to the present exemplary embodiment, with reference to FIG. 31.

In the present exemplary embodiment, a case is envisaged in which plural respective similarly configured terminals (two in the present exemplary embodiment), namely, a second terminal 60B1 and a second terminal 60B2, serve as the second terminal 60B and are separately provided to different target automobiles, and the respective target automobiles are travelling behind the target bicycle 92.

The first terminal 50A provided to the target bicycle 92 transmits, to the second terminal 60B and the second terminal 60B2 provided to the two respective target automobiles following behind, any message information out of the right turn information, the left turn information, or the appreciation information, together with the first terminal device information, according to operations by the first user.

When the second terminal 60B1 and the second terminal 60B2 provided to the respective target automobiles have received the message information and the first terminal device information from the first terminal 50A, the second terminal 60B1 and the second terminal 60B2 transmit the second second-terminal transmission information to the server 70D.

Accordingly, from out of the information, excluding the message information, received from the second terminal 60B1 and the second terminal 60B2 respectively, the server 70D stores (registers) information and the category information indicating the category of the message information, in the storage region corresponding to the communication information DB (see also FIG. 16).

Here, based on information received from the second terminal 60B1 and the second terminal 60B2, the server 70D according to the present exemplary embodiment derives the degree of certainty information indicating the certainty of the information, and this is described in detail later. Then, the server 70D stores (registers) the derived degree of certainty information in the communication information DB in association with the information received from the second terminal 60B1 and the second terminal 60B2.

Next, more specific explanation follows regarding processing executed by the server 70D. The first information communication processing executed by the first terminal 50A according to the present exemplary embodiment is similar to that of the first exemplary embodiment, and explanation thereof is therefore omitted. Moreover, the second information communication processing executed by the second terminal 60B1 and the second terminal 60B2 according to the present exemplary embodiment is similar to that of the second exemplary embodiment, and explanation thereof is therefore omitted.

Figure 32:
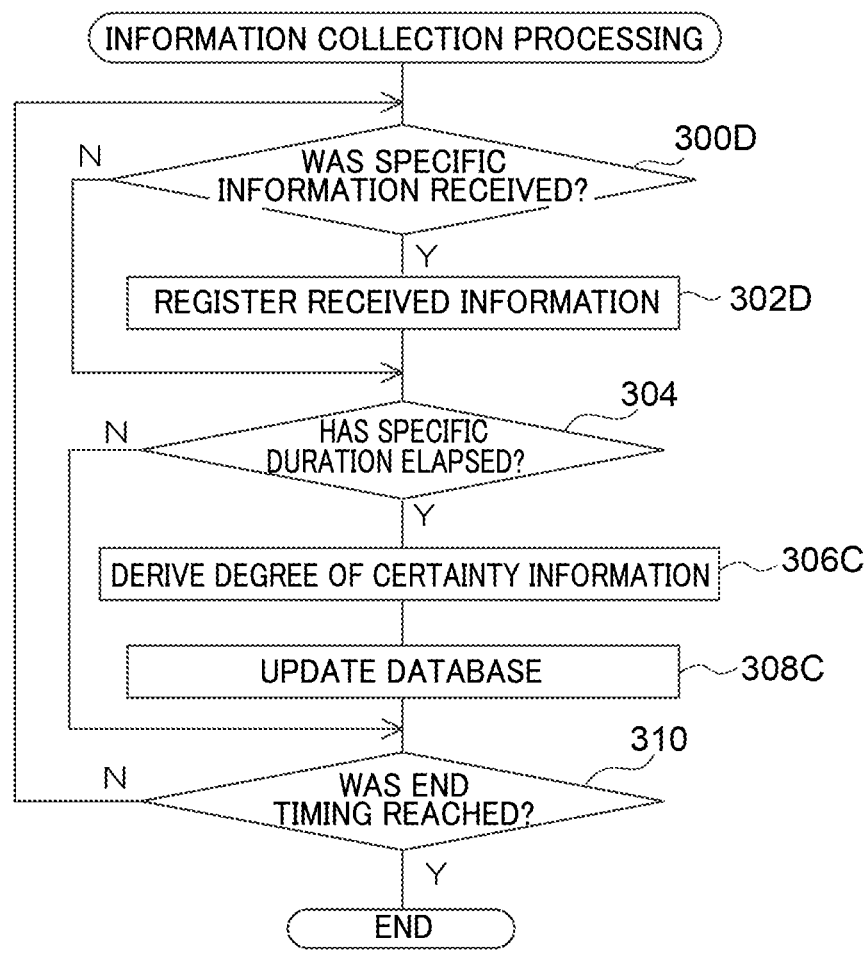
FIG. 32 is a flowchart illustrating an example of information collection processing according to the fourth exemplary embodiment.

The administrator of the server 70D performs information collection processing illustrated in FIG. 32 by executing the information collection program 73A using the server 70D at a specific timing. Steps in FIG. 32 that perform processing similar to that of steps in FIG. 11 are allocated the same step numbers as in FIG. 11, and explanation thereof is omitted.

As illustrated in FIG. 32, the information collection processing according to the present exemplary embodiment differs from the information collection processing according to the first exemplary embodiment in that step 300D is employed instead of the processing of step 300A. The information collection processing according to the present exemplary embodiment also differs from the information collection processing according to the first exemplary embodiment in that step 302D is employed instead of the processing of step 302A. The information collection processing according to the present exemplary embodiment also differs from the information collection processing according to the first exemplary embodiment in that the processing of step 304, step 306C, and step 308C is added between the processing of step 302D and the processing of step 310.

At step 300D of the information collection processing according to the present exemplary embodiment, the second reception section 32D determines whether or not the second second-terminal transmission information has been received from the second terminal 60B1 or the second terminal 60B2. Here, processing transitions to step 304, described below, in cases in which negative determination has been made, or otherwise processing transitions to step 302D in cases in which affirmative determination has been made.

At step 302D, the registration section 34D stores (registers) the information, excluding the message information, received from the second terminal 60B1 or the second terminal 60B2, and information indicating the category of the message information, in the communication information DB.

In the information collection processing according to the present exemplary embodiment, the information registered by the processing of step 302D is classified into two types of information: second terminal information based on information received from the second terminal 60B1, or second terminal information based on information received from the second terminal 60B2. In such cases, the second terminal device information of the second terminal information based on information received from the second terminal 60B1 is allocated to the second terminal 60B1, and the second terminal device information of the second terminal information based on the information received from the second terminal 60B2 is allocated to the second terminal 60B2.

At step 304, the registration section 34D determines whether or not a specific duration (3 hours in the present exemplary embodiment) has elapsed since execution of the present information collection processing started, and processing transitions to step 306C in cases in which affirmative determination has been made.

At step 306C, the registration section 34D derives the degree of certainty information as described below.

The registration section 34D first extracts, from out of the information registered in the communication information DB, combinations of second terminal information that share first terminal device information but do not share second terminal device information. Next, the registration section 34D identifies, from out of the extracted combinations of second terminal information, combinations that fulfill a seventh condition of the distance between positions indicated by each item of included position information being within a specific distance. In the present exemplary embodiment, a distance envisaged to be the maximum inter-vehicle distance between the two target automobiles (3 m in the present exemplary embodiment) is employed as the specific distance; however, there is no limitation thereto.

Moreover, the registration section 34D identifies combinations, from out of the identified combinations of second terminal information, that fulfill an eighth condition of each item of included category information indicating that the message information has the same category. Moreover, the registration section 34D identifies, from out of the identified combinations of second terminal information, combinations that fulfill a ninth condition that the duration between the timings indicated by each item of included timing information is within a specific duration. Then, the registration section 34D sets the number of items of second terminal information included in the identified combinations as the degree of certainty information of the second terminal information in those combinations. In the present exemplary embodiment, a duration envisaged to be the maximum duration for which the server 70D receives corresponding message information from plural second terminals 60B that have received message information received from the same first terminal 50A (0.5 seconds in the present exemplary embodiment) is employed as the specific duration. However, there is no limitation thereto.

At the next step 308C, the registration section 34D stores (registers) the identified degree of certainty information in the communication information DB in association with one of the items of second terminal information for the combinations that fulfill each condition out of the seventh condition to the ninth condition. Moreover, the registration section 34D erases the remaining second terminal information combinations from the communication information DB. When this is performed, degree of certainty information is sometimes already registered for the second terminal information for which degree of certainty information is to be registered. In such cases, the value of the derived degree of certainty information is added to the registered degree of certainty information is stored (updated) as new degree of certainty information in the communication information DB.

Otherwise, in cases in which negative determination has been made at step 304, processing transitions to step 310 without executing the processing of step 306C or step 308C above.

As explained in detail above, in the present exemplary embodiment, the registration section of the information collection device registers a value of the degree of certainty information, which is higher the greater the number items of second terminal information that satisfy the seventh condition to the ninth condition, in the storage section in association with the position information. The position information can therefore be effectively utilized as a result of enabling the reliability of the corresponding position information to be ascertained by referring to the degree of certainty information.

Although explanation has been given regarding a case in which the degree of certainty information is registered (updated) in the communication information DB without modifying the second terminal information in the present exemplary embodiment, there is no limitation thereto. For example, when the degree of certainty information is registered (updated), an average value of the timing information, the position information, or both, of the second terminal information, and the corresponding information of the second terminal information to be erased at this time, may be computed, and corresponding information of the second terminal information may be updated to this average value.

Although explanation has been given regarding a case in which the degree of certainty information is derived using the three conditions of the seventh condition to the ninth condition in the present exemplary embodiment, there is no limitation thereto. For example, one of these conditions alone, or a combination of two of these conditions may be used to derive the degree of certainty information.

Fifth Exemplary Embodiment

Figure 33:
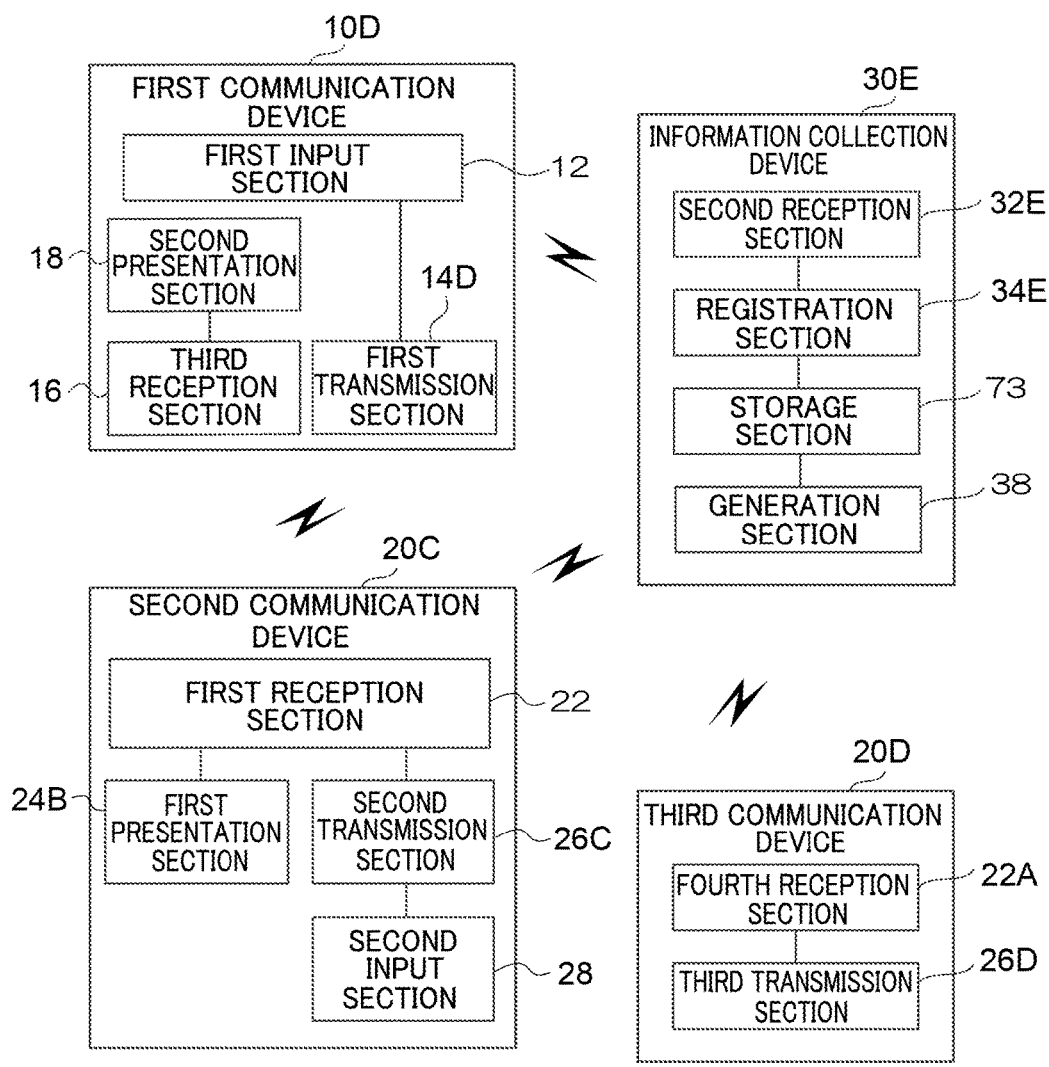
FIG. 33 is a functional block diagram illustrating a schematic configuration of a first communication device, a second communication device, a third communication device, and an information collection device according to a fifth exemplary embodiment.

Next, explanation follows regarding a fifth exemplary embodiment of technology disclosed herein. FIG. 33 illustrates a first communication device 10D, a second communication device 20C, a third communication device 20D, and an information collection device 30E according to the present exemplary embodiment. Configuration elements in FIG. 33 similar those of the respective devices illustrated in FIG. 21 are allocated the same reference numerals as in FIG. 21, and explanation thereof is omitted.

As illustrated in FIG. 33, the first communication device 10D according to the fifth exemplary embodiment differs from the first communication device 10C according to the third exemplary embodiment in that a first transmission section 14D for performing transmission processing different from the first transmission section 14C is employed instead of the first transmission section 14C. Moreover, the fifth exemplary embodiment differs from the third exemplary embodiment in that a third communication device 20D is additionally provided. Moreover, the information collection device 30E according to the fifth exemplary embodiment differs from the information collection device 30C according to the third exemplary embodiment in that a second reception section 32E for performing reception processing different from that of the second reception section 32C is employed instead of the second reception section 32C. Moreover, the information collection device 30E according to the fifth exemplary embodiment differs from the information collection device 30C according to the third exemplary embodiment in that a registration section 34E that performs registration processing different from that of the registration section 34C is employed instead of the registration section 34C.

The third communication device 20D according to the present exemplary embodiment is provided to a third vehicle different from the second vehicle, and is provided with a fourth reception section 22A and a third transmission section 26D as illustrated in FIG. 33. The fourth reception section 22A receives message information transmitted by the first transmission section 14D of the first communication device 10D. Moreover, the fourth reception section 22A receives response information transmitted to the first communication device 10D by the second transmission section 26C of the second communication device 20C. Moreover, the third transmission section 26D wirelessly transmits position information, enabling identification of the position at which the message information and the response information were received by the fourth reception section 22A, to a device (an information collection device 30E in the present exemplary embodiment) different from the first communication device 10D.

Note that although information indicating a latitude and longitude representing the position at which the message information was received is employed as the position information in the third communication device 20D according to the present exemplary embodiment, there is no limitation thereto. For example, in addition to the latitude and longitude representing the position, altitude information may also be employed as the position information. Moreover, a region targeted for information collection by the information collection device 30E may be divided into a matrix of rectangular regions having a specific size, and the position of each divided region may be represented as two items of information of a row and a column corresponding to that matrix, and these two items of information may be employed as the position information. It is envisaged that an automobile (referred to as a "second target automobile" hereafter) serves as the third vehicle to which the third communication device 20D is provided in the present exemplary embodiment; however, there is no limitation thereto. For example, the third communication device 20D may be provided to a two-wheeled vehicle such as a bicycle or a motorcycle.

In the present exemplary embodiment, a smartphone is employed as the third communication device 20D; however, there is no limitation thereto. For example, other than a smartphone, a cellular telephone, and other than a cellular telephone, a portable information terminal (PDA) such as a tablet PC, may be employed as the third communication device 20D.

Figure 34:
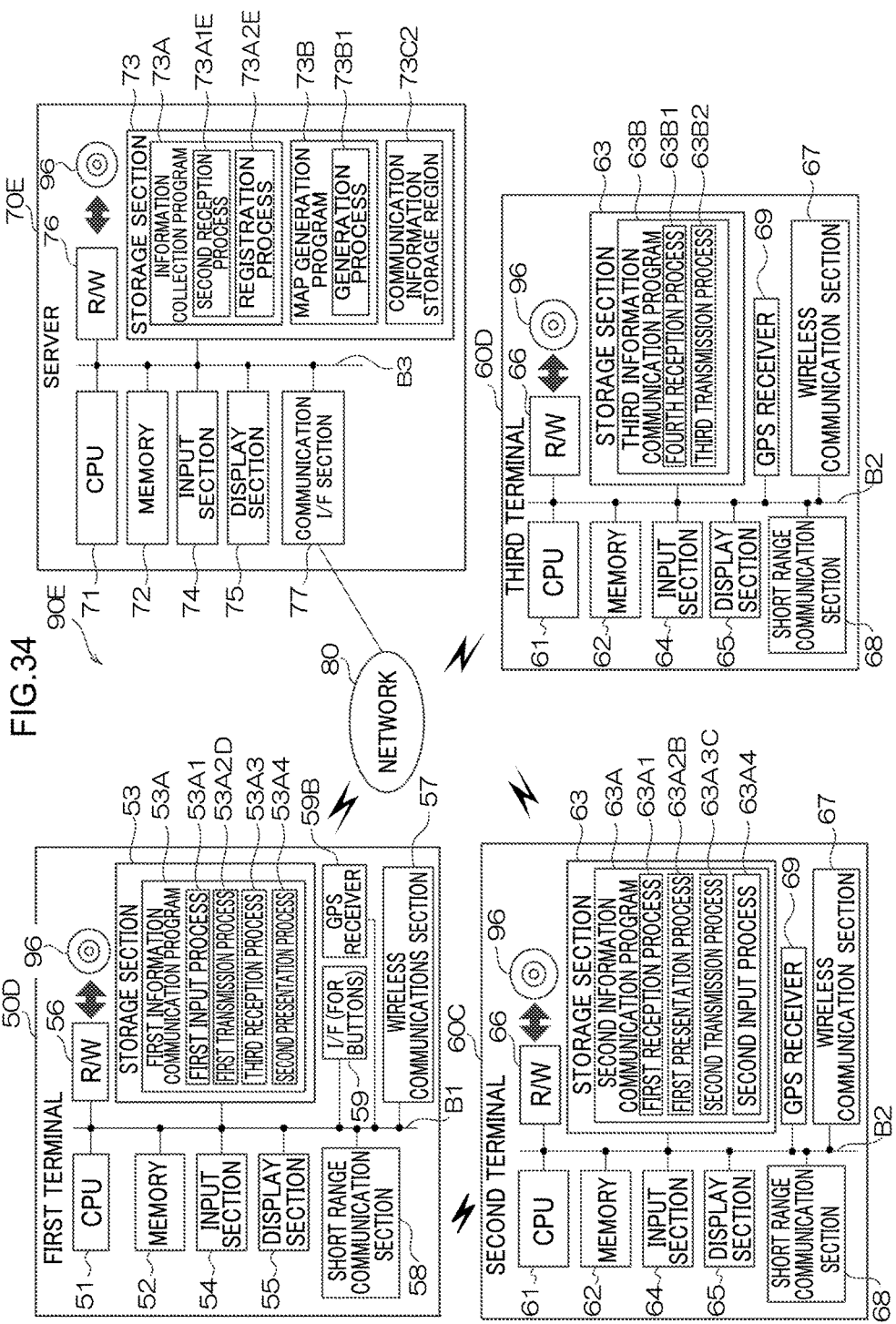
FIG. 34 is a block diagram illustrating a schematic configuration of a computer system according to the fifth exemplary embodiment.

The first communication device 10D, the second communication device 20C, the third communication device 20D, and the information collection device 30E may be respectively implemented by a first terminal 50D, the second terminal 60C, a third terminal 60D, and a server 70E included in a computer system 90E illustrated in FIG. 34. Explanation follows regarding a configuration of the first terminal 50D, the second terminal 60C, the third terminal 60D, and the server 70E according to the fifth exemplary embodiment, with reference to FIG. 34. Configuration elements in FIG. 34 similar to those of the computer system 90C of FIG. 22 are allocated the same reference numerals as in FIG. 22, and explanation thereof is omitted.

As illustrated in FIG. 34, the first terminal 50D according to the present exemplary embodiment differs from the first terminal 50C in that the first transmission process 53A2C of the first information communication program 53A is configured as a first transmission process 53A2D for performing transmission processing different from that of the first transmission process 53A2C. The CPU 51 operates as the first transmission section 14D illustrated in FIG. 33 by executing the first transmission process 53A2D. The first terminal 50D, which executes the first information communication program 53A, thereby functions as the first communication device 10D.

The third terminal 60D according to the present exemplary embodiment differs from the second terminal 60C in that a third information communication program 63B for causing the third terminal 60D to function as the third communication device 20D is stored in the storage section 63 instead of the second information communication program 63A. A recording medium 96 written with the third information communication program 63B is set in the medium reading/writing device 66, and the medium reading/writing device 66 stores the third information communication program 63B in the storage section 63 by reading the third information communication program 63B from the recording medium 96. The CPU 61 reads the third information communication program 63B from the storage section 63, expands the third information communication program 63B into the memory 62, and sequentially executes the processes included in the third information communication program 63B.

The third information communication program 63B includes a fourth reception process 63B1 and a third transmission process 63B2. The CPU 61 operates as the fourth reception section 22A illustrated in FIG. 33 by executing the fourth reception process 63B1. The CPU 61 also operates as the third transmission section 26D illustrated in FIG. 33 by executing the third transmission process 63B2. The third terminal 60D, which executes the third information communication program 63l, thereby functions as the third communication device 20D.

The server 70E according to the present exemplary embodiment differs from the server 70C in that the second reception process 73A1C of the information collection program 73A is configured as a second reception process 73A1E for performing reception processing different from that of the second reception process 73A1C. The server 70E according to the present exemplary embodiment differs from the server 70C in that the registration process 73A2C of the information collection program 73A is configured as a registration process 73A2E for performing registration processing different from that of the registration process 73A2C. The CPU 71 operates as the second reception section 32E illustrated in FIG. 33 by executing the second reception process 73A1E. The CPU 71 operates as the registration section 34E illustrated in FIG. 33 by executing the registration process 73A2E. The server 70E, which executes the information collection program 73A, thereby functions as the information collection device 30E.

Figure 35:
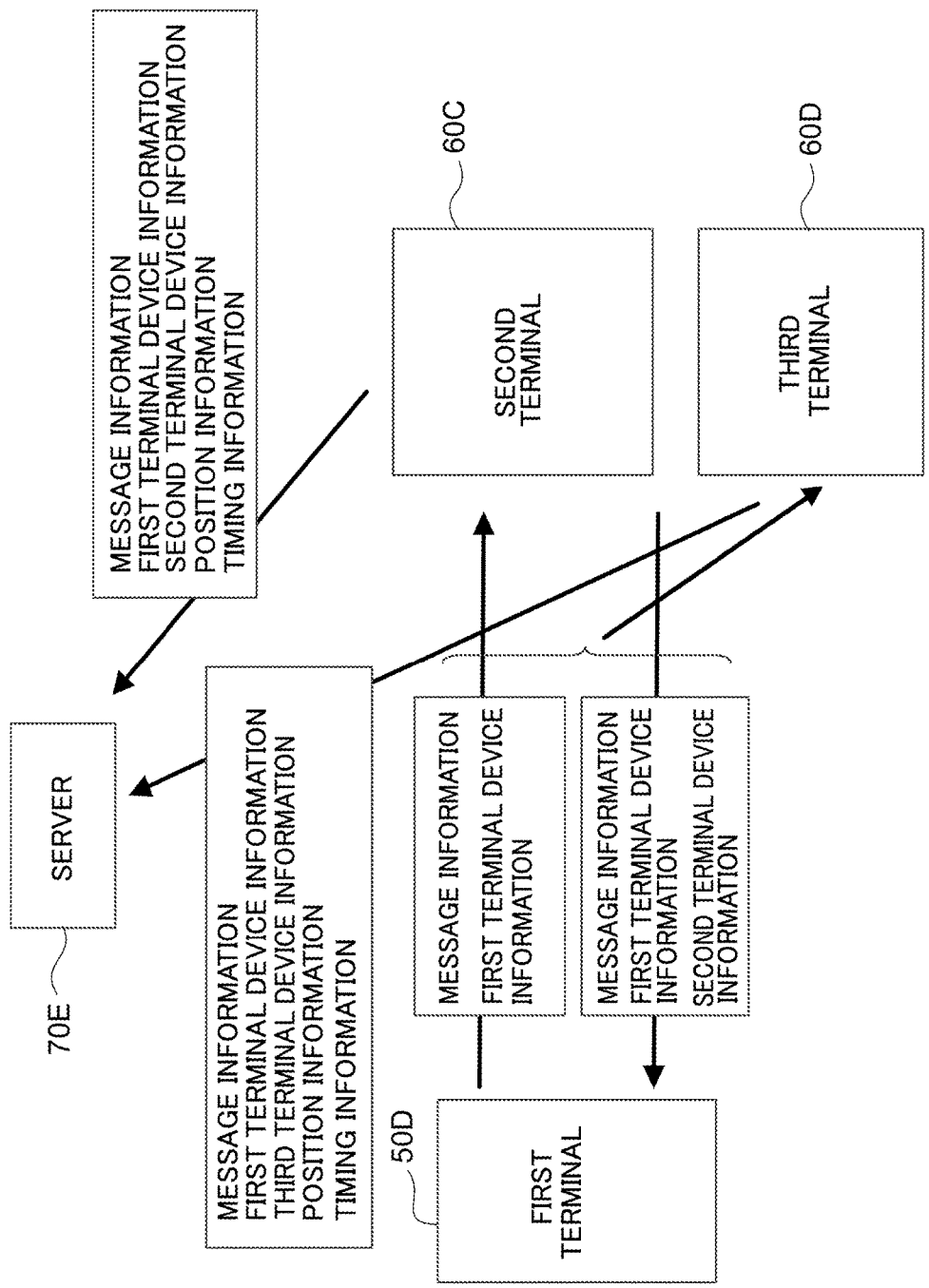
FIG. 35 is a schematic diagram explaining a chronological flow of information transmitted/received between respective devices of a computer system according to the fifth exemplary embodiment.

Next, explanation follows regarding operation of the present exemplary embodiment. First, explanation follows regarding a chronological flow of information transmitted/received between the respective devices out of the first terminal 50D, the second terminal 60C, the third terminal 60D, and the server 70E according to the present exemplary embodiment, with reference to FIG. 35.

In the present exemplary embodiment, a case is envisaged in which two automobiles, namely, the target automobile and a second target automobile, are travelling behind the target bicycle 92 provided with the first terminal 50D. When this is performed, the target automobile and the second target automobile may be travelling side-by-side, or may be travelling in single file. However, there is no limitation thereto, and, for example, the second target automobile may be stationary.

The first terminal 50D provided to the target bicycle 92 transmits, to the second terminal 60C provided to the target automobile travelling behind, any message information out of the right turn information, the left turn information, or the appreciation information, together with the first terminal device information, according to operations by the first user. When this is performed, since the transmission of information to the second terminal 60C is performed by short range wireless communication using BLE, the third terminal 60D also receives similar information to the second terminal 60C when the second target automobile is present within the communicable range of the short range wireless communication.

The second terminal 60C provided to the target automobile transmits the second second-terminal transmission information to the server 70E in cases in which the message information and the first terminal device information are received from the first terminal 50D. Moreover, the second terminal 60C transmits the response information to the first terminal 50D in cases in which the message information has been input by the second user according to the message information received from the first terminal 50D. When this is performed, since transmission of the response information to the first terminal 50D is performed by short range wireless communication using BLE, the third terminal 60D also receives similar information to the first terminal 50D when the second target automobile is present within the communicable range of the short range wireless communication.

Accordingly, the third terminal 60D transmits the specific message information, the first terminal device information, third terminal device information pre-allocated to the device itself, the position information, and the timing information to the server 70E when the third terminal 60D receives the above information exchanged between the first terminal 50D and the second terminal 60C. In the present exemplary embodiment, "I saw information" that is information expressing that the exchange of message information between the first terminal 50D and the second terminal 60C has been confirmed by the third terminal 60D, which is a third party, is employed as the message information transmitted from the third terminal 60D to the server 70E when this is performed. Hereafter, message information, first terminal device information, third terminal device information, position information, and timing information transmitted to the server 70E by the third terminal 60D are referred to as "first third-terminal transmission information".

Accordingly the server 70E stores (registers) the information out of the second second-terminal transmission information received from the second terminal 60C, excluding the message information, and the category information indicating the category of the message information, in the storage region corresponding to the communication information DB. Moreover, the server 70E stores (registers) the information out of the first third-terminal transmission information received from the third terminal 60D, excluding the message information, and the category information indicating the category of the message information, in the storage region corresponding to the communication information DB.

Here, based on given information received from the second terminal 60C and the third terminal 60O, the server 70E according to the present exemplary embodiment derives the degree of certainty information indicating the certainty of the information received from the second terminal 60C, and this is described in detail later. Then, the server 70E stores (registers) the derived degree of certainty information in the communication information DB in association with the information received from the corresponding second terminal 60C.

Next, specific explanation follows regarding processing executed by the respective devices out of the first terminal 50D, the second terminal 60C, the third terminal 60D, and the server 70E. The first information communication processing executed by the first terminal 50D differs from the first information communication processing according to the third exemplary embodiment illustrated in FIG. 24 only in that the processing of step 118 of the first information communication processing is not executed, and explanation thereof is therefore omitted. Moreover, the second information communication processing executed by the second terminal 60C is similar to the second information communication processing according to the third exemplary embodiment illustrated in FIG. 26, and explanation thereof is therefore omitted.

Figure 36:
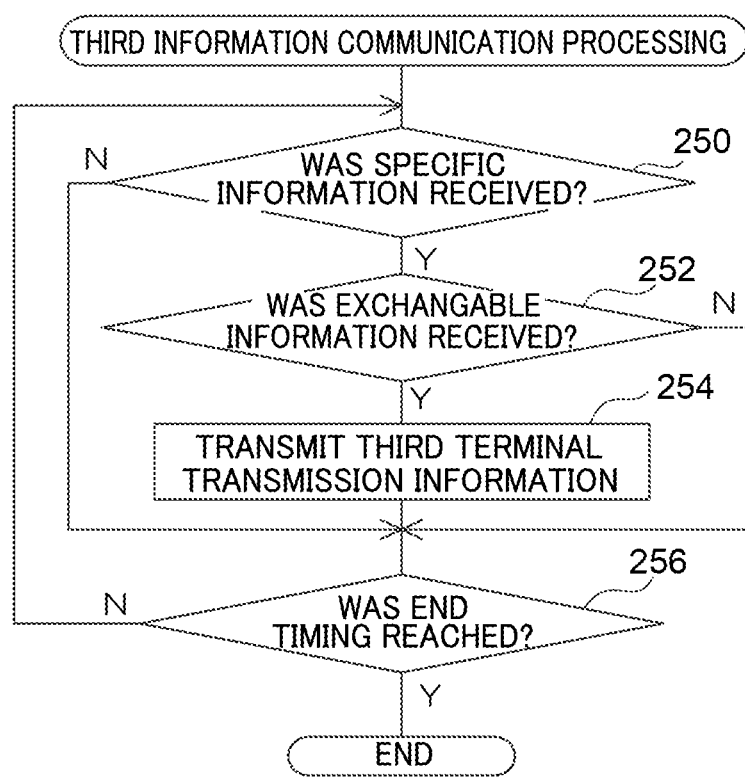
FIG. 36 is a flowchart illustrating an example of third information communication processing according to the fifth exemplary embodiment.

A third user onboard the second target automobile is onboard the second target automobile, and performs the third information communication processing illustrated in FIG. 36 by executing the third information communication program 63B using the third terminal 601). Explanation follows regarding the third information communication processing according to the present exemplary embodiment.

At step 250 of the third information communication processing, the fourth reception section 22A determines whether or not the two types of message information have been received within a specific duration, and processing transitions to step 256, described later, in cases in which negative determination has been made, or otherwise, processing transitions to step 252 in cases in which affirmative determination has been made. In the present exemplary embodiment, a duration envisaged to be the maximum duration for which messages are exchanged between the first terminal 50D and the second terminal 60C (5 seconds in the present exemplary embodiment) is employed as the specific duration. However, there is no limitation thereto.

At step 252, the third transmission section 26D determines whether or not the two types of received message information is a combination of message information exchangeable between the first terminal 50D and the second terminal 60C, and processing transitions to step 254 in cases in which affirmative determination has been made. At step 254, the third transmission section 26D transmits the first third-terminal transmission information to the server 70E using the wireless communication section 67, and processing then transitions to step 256. Processing transitions to step 256 without executing the processing of step 254 in cases in which negative determination has been made at step 252.

At step 256, the fourth reception section 22A determines whether or not a timing predetermined as a timing at which to end the present third information communication processing has been reached, and processing returns to step 250 in cases in which a negative determination has been made, or otherwise the present third information communication processing ends at that point in time in cases in which affirmative determination has been made. In the third information communication processing according to the present exemplary embodiment, a timing at which the user inputs instructions instructing the present third information communication processing to end is employed as the predetermined timing; however, there is no limitation thereto.

Figure 37:
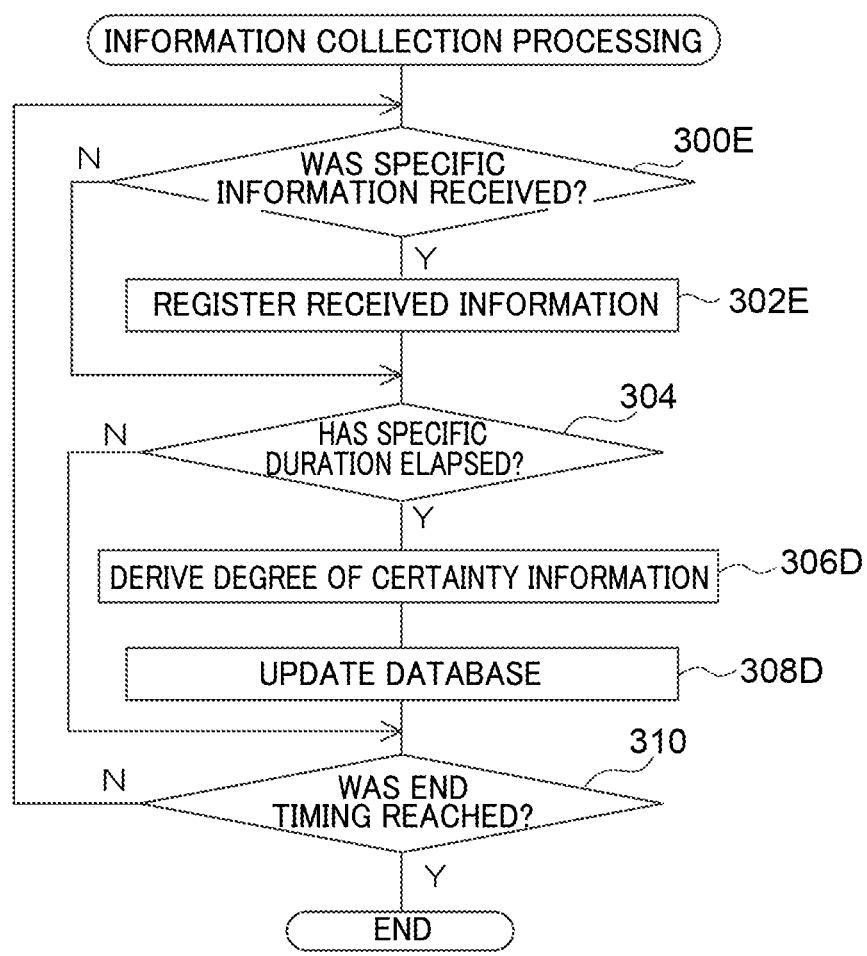
FIG. 37 is a flowchart illustrating an example of information collection processing according to the fifth exemplary embodiment.

The administrator of the server 70E performs the information collection processing illustrated in FIG. 37 by executing the information collection program 73A using the server 70E at a specific timing. Steps in FIG. 37 that perform processing similar to those in FIG. 28 are allocated the same step numbers as in FIG. 28, and explanation thereof is omitted.

As illustrated in FIG. 37, the information collection processing according to the present exemplary embodiment differs from the information collection processing according to the third exemplary embodiment in that step 300E is employed instead of the processing of step 300C. The information collection processing according to the present exemplary embodiment also differs from the information collection processing according to the third exemplary embodiment in that step 302E is employed instead of the processing of step 302C. The information collection processing according to the present exemplary embodiment also differs from the information collection processing according to the third exemplary embodiment in that the step 306D is employed instead of the processing of step 306B, and step 308D is employed instead of the processing of step 308B.

At step 300E of the information collection processing according to the present exemplary embodiment, the second reception section 32E determines whether or not the second second-terminal transmission information has been received from the second terminal 60C or the first third-terminal transmission information has been received from the third terminal 60D. Here, processing transitions to step 304, described later, in cases in which negative determination has been made, or otherwise processing transitions to step 302E in cases in which affirmative determination has been made.

At step 302E, the registration section 34E stores (registers) information that is the received information with the message information excluded, and the information indicating the category of the message information, in the communication information DB.

In the information collection processing according to the present exemplary embodiment, the information registered by the processing of step 302E is classified into two types of information: second terminal information based on information received from the second terminal 60C, or third terminal information based on information received from the third terminal 60D. In such cases, the second terminal device information of the second terminal information based on the information received from the second terminal 60C is allocated to the second terminal 60C, and the third terminal device information of the third terminal information based on the information received from the third terminal 60D is allocated to the third terminal 60D. Here, the third terminal device information is registered as the second terminal device information in the communication information DB for convenience of explanation in the present exemplary embodiment.

At step 304, the registration section 34E determines whether or not a specific duration (3 hours in the present exemplary embodiment) has elapsed since execution of the current information collection processing started, and processing transitions to step 306D in cases in which affirmative determination has been made.

At step 306D, the registration section 34E derives degree of certainty information as described below.

The registration section 34E first extracts, from out of the information registered in the communication information DB, information that shares the same first terminal device information but does not share the same second terminal device information, and thereby extracts combinations of second terminal information and third terminal information. Next, the registration section 34E identifies, from out of the extracted combinations, combinations that fulfill a tenth condition that the distance between positions indicated by each item of included position information is within a specific distance. In the present exemplary embodiment, a distance envisaged to be the maximum inter-vehicle distance between the target automobile and the second target automobile (3 m in the present exemplary embodiment) is employed as the specific distance; however, there is no limitation thereto.

Moreover, the registration section 34E identifies, from out of the identified combinations, combinations that fulfill an eleventh condition that the respective items of included category information indicates that the message information is I saw information and appreciation information. Moreover, the registration section 34E identifies, from out of the identified combinations, combinations that fulfill a twelfth condition that the duration between the timings indicated by each item of included timing information is within the specific duration. Then, the registration section 34E sets the number of items of third terminal information included in the identified combinations as the degree of certainty information for the second terminal information of that combination. In the present exemplary embodiment, a duration envisaged to be the maximum duration in which the server 70E receives corresponding information from the second terminal 60C and the third terminal 60D (5 seconds in the present exemplary embodiment) is employed as the specific duration. However, there is no limitation thereto.

At the next step 308D, the registration section 34E stores (registers) the identified degree of certainty information in the communication information DB in association with the corresponding second terminal information for the combinations that fulfill each condition of the tenth condition to the twelfth condition. Moreover, the registration section 34E erases the third terminal information included in the combinations from the communication information DB. When this is performed, degree of certainty information is sometimes already registered for the second terminal information for which degree of certainty information is to be registered. In such cases, the value of the derived degree of certainty information added to the registered degree of certainty information is stored (updated) as new degree of certainty information in the communication information DB.

Otherwise, processing transitions to step 310 without executing the processing of step 306D or step 308D above in cases in which negative determination has been made at step 304.

As explained in detail above, in the present exemplary embodiment, the second input section of the second communication device receives operations, and the second transmission section of the second communication device also wirelessly transmits second specific information according to the operations received by the second input section. In the present exemplary embodiment, the third reception section of the first communication device receives the second specific information transmitted by the second transmission section.

Here, in the present exemplary embodiment, the specific information transmitted using the first transmission section, and the second specific information transmitted using the second transmission section, in the third communication device provided to the third vehicle, are received by the fourth reception section. Moreover, in the present exemplary embodiment, the second position information enabling identification of the position at which the specific information and the second specific information were received by the fourth reception section is wirelessly transmitted to the information collection device by the third communication device using the third transmission section.

Moreover, in the present exemplary embodiment, the second reception section of the information collection device also receives the second position information transmitted by the third transmission section. Then, in the present exemplary embodiment, the registration section of the information collection device registers a value of the degree of certainty information, which is larger the greater the number of items of second position information satisfying the tenth condition to the twelfth condition, in the storage section in association with the position information.

The position information can therefore be effectively utilized as a result of enabling the reliability of the corresponding position information to be ascertained by referring to the degree of certainty information. Moreover, the precision of the reliability indicated by the degree of certainty information is high since the degree of certainty information is found using information from a third party.

Although explanation has been given of a case in which the degree of certainty information is registered (updated) in the communication information DB without modifying the second terminal information in the present exemplary embodiment, there is no limitation thereto. For example, when the degree of certainty information is registered (updated), an average value of the timing information, the position information, or both, of the second terminal information, and the information corresponding to the third terminal information to be erased at this time may be computed, and the information corresponding to the second terminal information may be updated to this average value.

Although explanation has been given regarding a case in which the degree of certainty information is derived using the three conditions of the tenth condition to the twelfth condition in the present exemplary embodiment, there is no limitation thereto. For example, one of these conditions alone, or a combination of two of these conditions may be used to derive the degree of certainty information.

Sixth Exemplary Embodiment

Figure 38:
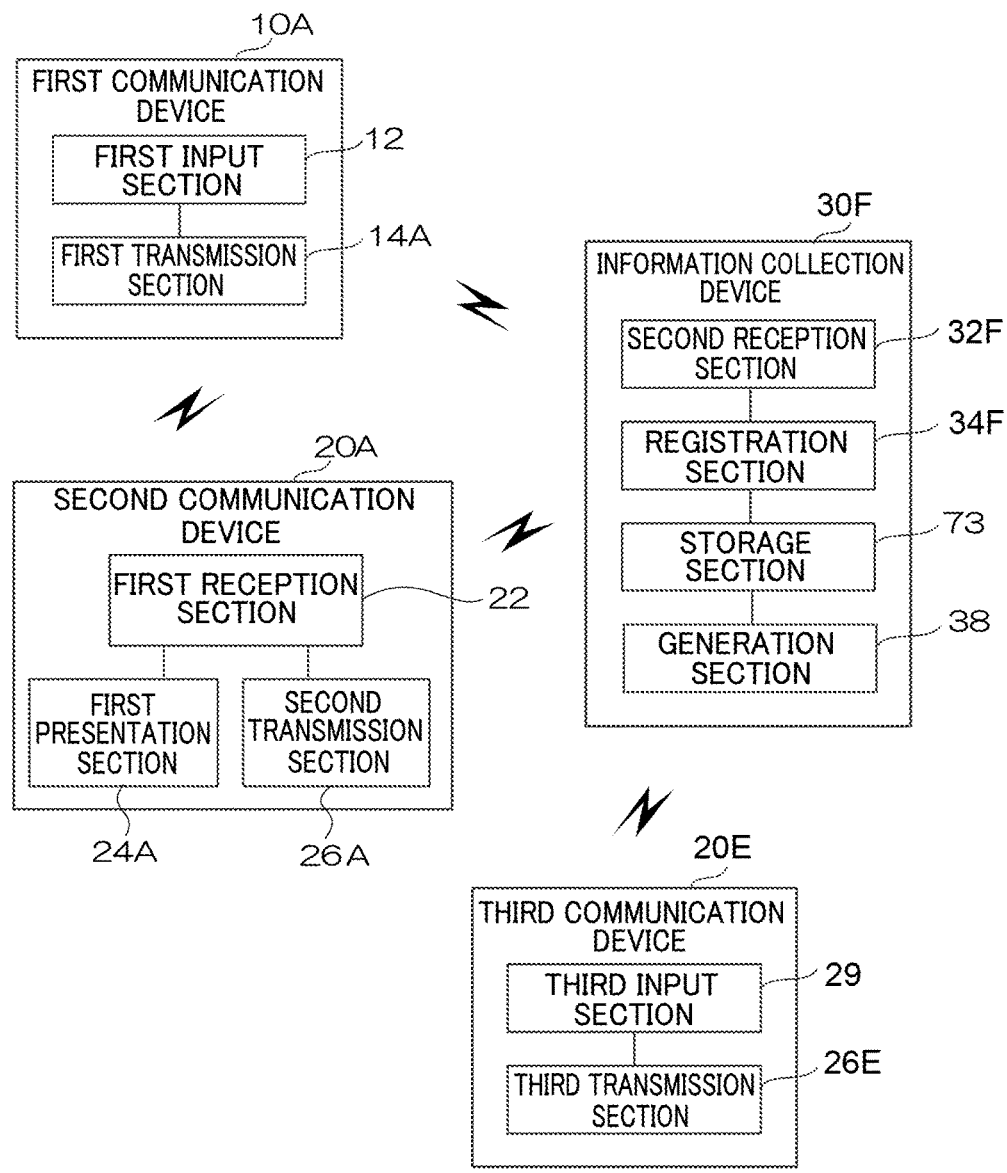
FIG. 38 is a functional block diagram of a first communication device, a second communication device, a third communication device, and an information collection device according to a sixth exemplary embodiment.

Next, explanation follows regarding a sixth exemplary embodiment of technology disclosed herein. FIG. 38 illustrates a first communication device 10A, a second communication device 20A, a third communication device 20E, and an information collection device 30F according to the present exemplary embodiment. Configuration elements in FIG. 38 similar to those of the respective devices illustrated in FIG. 1 are allocated the same reference numerals as in FIG. 1, and explanation thereof is omitted.

As illustrated in FIG. 38, the sixth exemplary embodiment differs from the first exemplary embodiment in that a third communication device 20E is additionally provided. Moreover, an information collection device 30F according to the sixth exemplary embodiment differs from the information collection device 30A according to the first exemplary embodiment in that a second reception section 32F for performing reception processing different from that of the second reception section 32A is provided instead of the second reception section 32A. Moreover, the information collection device 30F according to the sixth exemplary embodiment differs from the information collection device 30A according to the first exemplary embodiment in that a registration section 34F for performing registration processing different from that of the registration section 34A is employed instead of the registration section 34A.

The third communication device 20E according to the present exemplary embodiment is possessed by a pedestrian (referred to as a "fourth user" hereafter) who walks along a footpath of the road that the target bicycle 92 and the target automobile are travelling along. As illustrated in FIG. 38, the third communication device 20E according to the present exemplary embodiment includes a third input section 29 and a third transmission section 26E. The third input section 29 receives operations made by the fourth user. Moreover, the third transmission section 26E wirelessly transmits the specific message information, the position information enabling identification of the position at that point in time, and timing information indicating a timing of that point in time, to a device different from the first communication device 10A (an information collection device 30F in the present exemplary embodiment) in cases in which specific operations have been received by the third input section 29.

In the third communication device 20E according to the present exemplary embodiment, information indicating a latitude and longitude representing the position at that point in time is employed as the position information; however, there is no limitation thereto. For example, in addition to the latitude and longitude representing the position, altitude information may also be employed as the position information. Moreover, a region targeted for information collection by the information collection device 30F may be divided into a matrix of rectangular regions having a specific size, and the position of each divided region may be represented as two items of information of a row and a column corresponding to that matrix, and these two items of information may be employed as the position information. It is envisaged that a pedestrian is in possession of the third communication device 20E in the present exemplary embodiment; however, there is no limitation thereto. For example, a person onboard an automobile that is different from the target automobile may be in possession of the third communication device 20E. Moreover, a smartphone is employed as the third communication device 20E in the present exemplary embodiment; however, there is no limitation thereto. For example, other than a smartphone, a cellular telephone, and other than a cellular telephone, a portable information terminal (PDA) such as a tablet PC, may be employed as the third communication device 20E.

Figure 39:
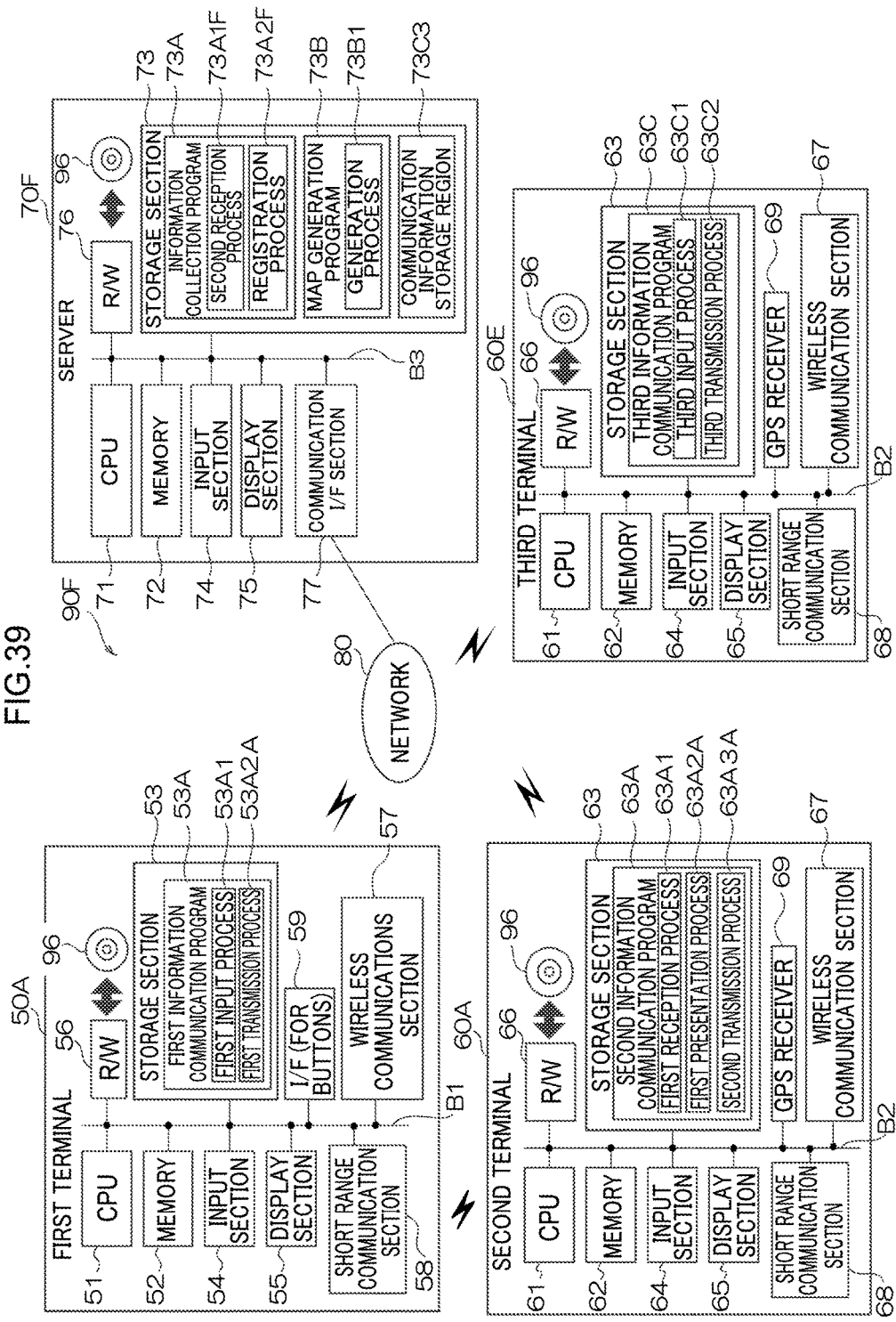
FIG. 39 is a block diagram illustrating a schematic configuration of a computer system according to the sixth exemplary embodiment.

The first communication device 10A, the second communication device 20A, the third communication device 20E, and the information collection device 30F may be respectively implemented by a first terminal 50A, a second terminal 60A, a third terminal 60E, and a server 70F included in a computer system 90F illustrated in FIG. 39. Explanation follows regarding configuration of the first terminal 50A, the second terminal 60A, the third terminal 60E, the server 70F according to the sixth exemplary embodiment with reference to FIG. 39. Configuration elements in FIG. 39 similar to those of the computer system 90A of FIG. 2 are allocated the same reference numerals as in FIG. 2, and explanation thereof is omitted.

As illustrated in FIG. 39, the third terminal 60E according to the present exemplary embodiment differs from the second terminal 60A in that a third information communication program 63C for causing the third terminal 60E to function as the third communication device 20E is stored in the storage section 63 instead of the second information communication program 63A. A recording medium 96 written with the third information communication program 63C is set in the medium reading/writing device 66, and the medium reading/writing device 66 stores the third information communication program 63C in the storage section 63 by reading the third information communication program 63C from the recording medium 96. The CPU 61 reads the third information communication program 63C from the storage section 63, expands the third information communication program 63C into the memory 62, and sequentially executes the processes included in the third information communication program 63C.

The third information communication program 63C includes a third input process 63C1 and a third transmission process 63C2. The CPU 61 operates as the third input section 29 illustrated in FIG. 38 by executing the third input process 63C1. The CPU 61 operates as the third transmission section 26E illustrated in FIG. 38 by executing the third transmission process 63C2. The third terminal 60E, which executes the third information communication program 63C, thereby functions as the third communication device 20E.

The server 70F according to the present exemplary embodiment differs from the server 70A in that the second reception process 73A1A of the information collection program 73A is configured as a second reception process 73A1F for performing reception processing different from that of the second reception process 73A1A. The server 70F according to the present exemplary embodiment differs from the server 70A in that the registration process 73A2A of the information collection program 73A is configured as a registration process 73A2F for performing registration processing different from that of the registration process 73A2A. The CPU 71 operates as the second reception section 32F illustrated in FIG. 38 by executing the second reception process 73A1F. The CPU 71 operates as the registration section 34F illustrated in FIG. 38 by executing the registration process 73A2F. The server 70F, which executes the information collection program 73A, thereby functions as the information collection device 30F.

A communication information storage region 73C3 is provided to the storage section 73 of the server 70F instead of the communication information storage region 73C1. The CPU 71 generates a communication information DB according to the present exemplary embodiment by expanding data stored in the communication information storage region 73C3 into the memory 72.

FIG. 40 illustrates a communication information DB according to the present exemplary embodiment. As illustrated in FIG. 40, the communication information DB according to the present exemplary embodiment differs from the communication information DB according to the second exemplary embodiment in that bystander count information is employed instead of the degree of certainty information (see also FIG. 16). The default value of the bystander count information is set to 0 (zero) in the communication information DB according to the present exemplary embodiment.

Figure 41:
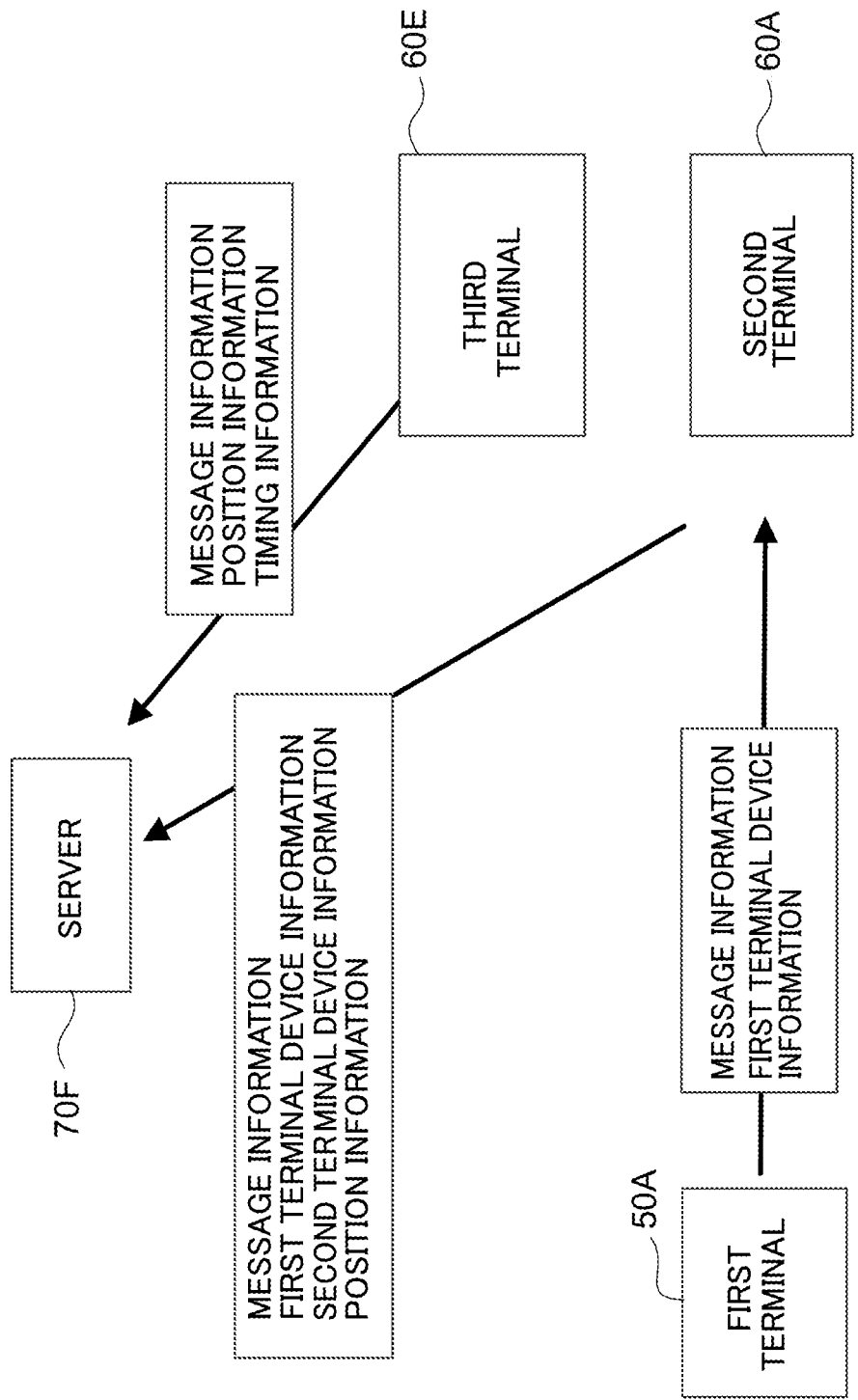
FIG. 41 is a schematic diagram explaining a chronological flow of information transmitted/received between respective devices of a computer system according to the sixth exemplary embodiment.

Next, explanation follows regarding operation of the present exemplary embodiment. First, explanation follows regarding a chronological flow of information transmitted/received between the respective devices out of the first terminal 50A, the second terminal 60A, the third terminal 60E, and the server 70F according to the present exemplary embodiment, with reference to FIG. 41.

In the present exemplary embodiment, a case is envisaged in which a target automobile is travelling behind the target bicycle 92, to which the first terminal 50A is provided, and the fourth user is walking along a footpath of the road along which the target bicycle 92 and the target automobile are travelling.

The first terminal 50A provided to the target bicycle 92 is similar to the first exemplary embodiment in that any message information out of the right turn information, the left turn information, or the appreciation information is transmitted, together with the first terminal device information, to the second terminal 60A provided to the target automobile following behind, according to operations by the first user.

Moreover, the second terminal 60A provided to the target automobile is similar to the first exemplary embodiment in that the first second-terminal transmission information is transmitted to the server 70F in cases in which the second terminal 60A provided to the target automobile has received the message information and the first terminal device information from the first terminal 50A.

In cases in which the fourth user has observed favorable communications between occupant of the target bicycle 92 and the occupant of the target automobile, the third terminal 60E transmits the specific message information, the position information, and the timing information to the server 70F according to operations by the fourth user. In the present exemplary embodiment, "I saw information", which is information expressing that the fourth user, who is a third party, observed favorable communications between the first terminal 50A and the second terminal 60A, is employed as the message information transmitted from the third terminal 60E to the server 70F when this is performed. Hereafter, the message information, the position information, and the timing information transmitted from the third terminal 60E to the server 70F when this is performed is referred to as "second third-terminal transmission information".

Accordingly, the server 70F stores (registers) the information, excluding the message information, out of the first second-terminal transmission information received from the second terminal 60A, and the category information indicating the category of the message information, in the storage region corresponding to the communication information DB. Moreover, the server 70F stores (registers) the information, excluding the message information, out of the second third-terminal transmission information received from the third terminal 60E and the category information indicating the category of the message information, in the storage region corresponding to the communication information DB.

Here, based on first second-terminal transmission information received from the second terminal 60A and second third-terminal transmission information received from the third terminal 60E, the server 70F according to the present exemplary embodiment derives the bystander count information as information indicating the certainty of the information received from the second terminal 60A, and this is described in detail later. Then, the server 70F stores (registers) the derived bystander count information in the communication information DB in association with the information received from the corresponding second terminal 60A.

Next, specific explanation follows regarding processing executed by the respective devices out of the first terminal 50A, the second terminal 60A, the third terminal 60E, and the server 70F. The first information communication processing executed by the first terminal 50A is similar to the first information communication processing according to the first exemplary embodiment illustrated in FIG. 6, and explanation thereof is therefore omitted. Moreover, the second information communication processing executed by the second terminal 60A is similar to the second information communication processing according to the first exemplary embodiment illustrated in FIG. 7, and explanation thereof is therefore omitted.

Figure 42:
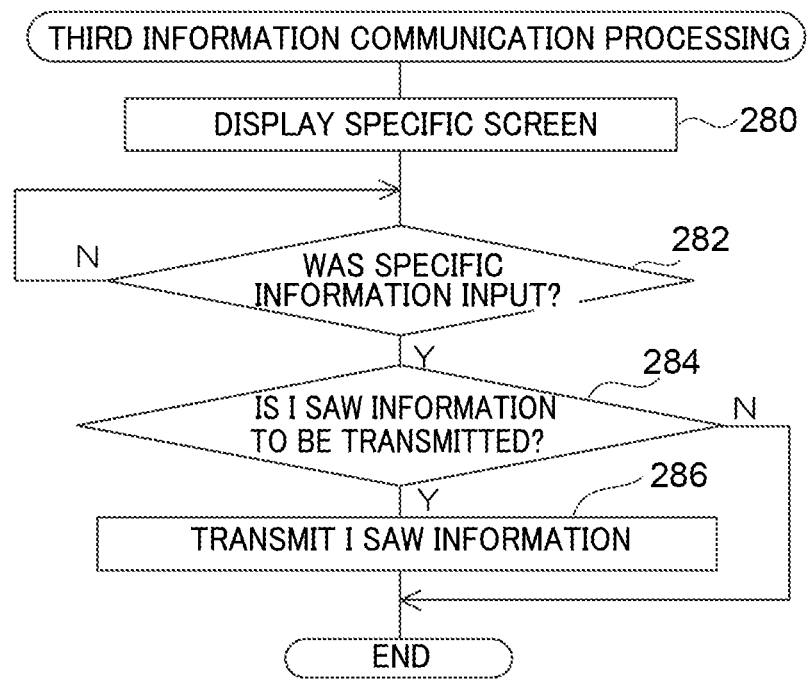
FIG. 42 is a flowchart illustrating an example of third information communication processing according to the sixth exemplary embodiment.

The fourth user performs third information communication processing illustrated in FIG. 42 while walking along the footpath by executing the third information communication program 63C using the third terminal 60E. Explanation follows regarding the third information communication processing according to the present exemplary embodiment.

At step 280 of the third information communication processing, the third input section 29 controls the display section 65 so as to display a predetermined transmission/reception screen, and at the next step 282, the third input section 29 stands by for input of the specific information.

Figure 43:
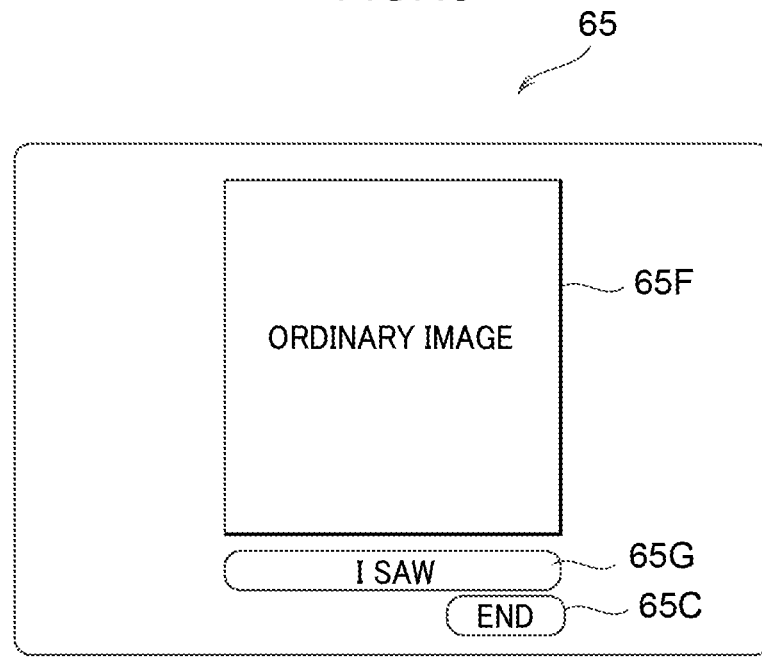
FIG. 43 is a schematic diagram illustrating an example of a transmission received screen according to the sixth exemplary embodiment.

FIG. 43 illustrates an example of a transmission/reception screen according to the present exemplary embodiment. As illustrated in FIG. 43, an ordinary image 65F is displayed, and an "I saw" button 65G and an "End" button 65C below the ordinary image 65F, are displayed on the transmission/reception screen according to the present exemplary embodiment. When these buttons are displayed by the display section 65, the fourth user stipulates the "I saw" button 65G with a fingertip when the second third-terminal transmission information is transmitted to the server 70F, and the fourth user stipulates the "End" button 65C with a fingertip when the present third information communication processing has ended. When the "I saw" button 65G or the "End" button 65C is specified, the processing of step 282 results in an affirmative determination, and processing transitions to step 284.

At step 284, the third transmission section 26E determines whether or not transmission of the second third-terminal transmission information has been instructed by determining whether or not the "I saw" button 65G has been specified, and processing transitions to step 286 in cases in which affirmative determination has been made. At step 286, the third transmission section 26E transmits the second third-terminal transmission information to the server 70F using the wireless communication section 67, and the current third information communication processing then ends. In cases in which negative determination has been made in the processing of step 284, the "End" button 65C is considered to have been specified by the fourth user, and the current third information communication processing ends without executing the processing of step 286.

Figure 44:
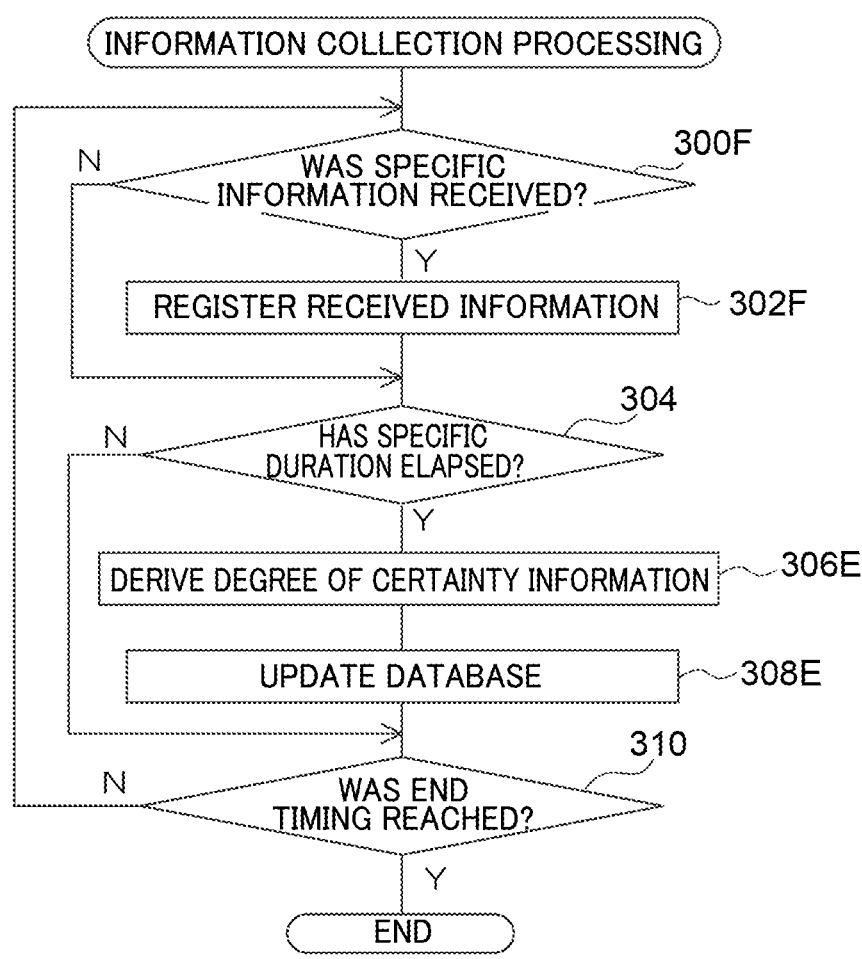
FIG. 44 is a flowchart illustrating an example of information collection processing according to the sixth exemplary embodiment.

The administrator of the server 70F performs information collection processing illustrated in FIG. 44 by executing the information collection program 73A using the server 70F at a specific timing. Steps in FIG. 44 that perform processing similar to that of steps in FIG. 11 are allocated the same step numbers as in FIG. 11, and explanation thereof is omitted.

As illustrated in FIG. 44, the information collection processing according to the present exemplary embodiment differs from the information collection processing according to the first exemplary embodiment in that step 300F is employed instead of the processing of step 300A. Moreover, the information collection processing according to the present exemplary embodiment differs from the information collection processing according to the first exemplary embodiment in that step 302F is employed instead of the processing of step 302A. Moreover, the information collection processing according to the present exemplary embodiment differs from the information collection processing according to the first exemplary embodiment in that the processing of step 304, step 306E, and step 308E is added between the processing of step 302F and the processing of step 310.

At step 300F of the information collection processing according to the present exemplary embodiment, the second reception section 32F determines whether or not the first second-terminal transmission information has been received from the second terminal 60A, or the second third-terminal transmission information has been received from the third terminal 60E. Here, processing transitions to step 304, described below, in cases in which negative determination has been made, or otherwise processing transitions to step 302F in cases in which affirmative determination has been made.

At step 302F, the registration section 34F stores (registers) the information received from the second terminal 60A or the third terminal 60E excluding the message information, and the information indicating the category of the message information, in the communication information DB.

In the information collection processing according to the present exemplary embodiment, the information registered in the communication information DB by the processing of step 302F is classified into two types of information: second terminal information based on information received from the second terminal 60A, or third terminal information based on information received from the third terminal 60E. In the example illustrated in FIG. 40, the information for which both the first terminal device information and the second terminal device information are registered as device information (the information that is chronologically first and second out of the information having the ID '1001') is the second terminal information. Moreover, information for which neither the first terminal device information nor the second terminal device information is registered (the information that is chronologically third out of the information having the ID '1001') is the third terminal information.

At step 304, the registration section 34F determines whether or not a specific duration (3 hours in the present exemplary embodiment) has elapsed since execution of the current information collection processing started, and processing transitions to step 306E in cases in which affirmative determination has been made.

At step 306E, the registration section 34F derives the bystander count information as described below.

The registration section 34F first extracts the second terminal information from out of the information registered in the communication information DB, and identifies third terminal information that fulfills a thirteenth condition of including position information indicating a position within a specific distance from the position indicated by the position information included in the second terminal information. In the present exemplary embodiment, a distance envisaged to be the maximum distance between the target automobile and a pedestrian (6 m in the present exemplary embodiment) is employed as the specific distance; however, there is no limitation thereto.

Next, the registration section 34F identifies, from out of the identified third terminal information, third terminal information that fulfills a fourteenth condition of including timing information indicating a timing that is within a specific duration from the timing indicated by the timing information included in the corresponding second terminal information. Then, the registration section 34F sets the number of identified items of third terminal information as the bystander count information of the corresponding second terminal information. In the present exemplary embodiment, a duration envisaged to be the maximum duration between a point in time at which the message information is received from the second terminal 60A, and a point in time at which the corresponding message information is received from the third terminal 60E (5 seconds in the present exemplary embodiment), by the server 70F is employed as the specific duration. However, there is no limitation thereto.

In the example illustrated in FIG. 40, as an example, for the second terminal information that is chronologically second out of the information having the ID '1001', the bystander count information of the second terminal information is derived as '1' when the thirteenth condition and the fourteenth condition described above are satisfied only by the third terminal information that is chronologically third.

At the next step 308E, the registration section 34F stores (registers) the derived bystander count information in the communication information DB in association with the corresponding second terminal information, and erases the corresponding third terminal information from the communication information DB. When this is performed, the bystander count information is sometimes already registered for the corresponding second terminal information. In such cases, the value of the derived bystander count information added to the registered bystander count information is stored (updated) as new bystander count information in the communication information DB.

Otherwise, in cases in which negative determination has been made at step 304, processing transitions to step 310 without executing the processing of step 306E or step 308E.

Note that the bystander count information registered in the communication information DB by the present information collection processing can be employed in the map generation processing (see FIG. 12) for, for example, generation of a site display map using only the second terminal information having bystander count information of 1 or more.

As explained in detail above, in the present exemplary embodiment, the second position information enabling identification of the position at the point in time at which an operation was received by the third input section, which receives the operation, is wirelessly transmitted to the information collection device by the third communication device provided to the third vehicle using the third transmission section.

Moreover, in the present exemplary embodiment, the second reception section of the information collection device also receives the second position information transmitted by the third transmission section. Then, in the present exemplary embodiment, the registration section of the information collection device registers a value of the degree of certainty information (the "bystander count information" in the present exemplary embodiment), which is larger the greater the number of items of second position information satisfying the thirteenth condition and the fourteenth condition, in the storage section in association with the position information.

The position information can therefore be effectively utilized as a result of enabling the reliability of the corresponding position information to be ascertained by referring to the degree of certainty information.

Although explanation has been given regarding a case in which the degree of certainty information is registered (updated) in the communication information DB without modifying the second terminal information in the present exemplary embodiment, there is no limitation thereto. For example, when the degree of certainty information is registered (updated), an average value of the timing information, the position information, or both, of the second terminal information, and the corresponding information of the third terminal information to be erased at this time, may be computed, and corresponding information of the second terminal information may be updated to this average value.

Moreover, although explanation has been given regarding a case in which the degree of certainty information is derived using the two conditions of the thirteenth condition and the fourteenth condition in the present exemplary embodiment, there is no limitation thereto. For example, the degree of certainty information may be derived using one of these conditions alone.

Although explanation has been given regarding cases in which technology disclosed herein is applied with only one target bicycle 92 is within a range over which short range wireless communication with the target automobile is possible (referred to as "within communicable range" hereafter) in each of the exemplary embodiments described above, there is no limitation thereto. For example, technology disclosed herein may be applied when plural target bicycles 92 are within communicable range. Explanation follows regarding various embodiments in cases in which there are two target bicycles 92 within communicable range. Hereafter, the alphabetic suffixes of the reference numerals of the first terminal provided to the target bicycle, the second terminal provided to the target automobile, and the server are omitted, such that these are referred to as the "first terminal 50", the "second terminal 60", and the "server 70".

First, explanation follows regarding a case in which, out of the two target bicycles, one of the target bicycles is travelling in front of the target automobile (referred to as the "first target bicycle" hereafter), and the other target bicycle is passing by the target automobile by chance (referred to as the "second target bicycle" hereafter). In cases in which the target automobile receives the message information transmitted from the second target automobile, the message information is sometimes erroneously transmitted to the server 70.

Figure 45:
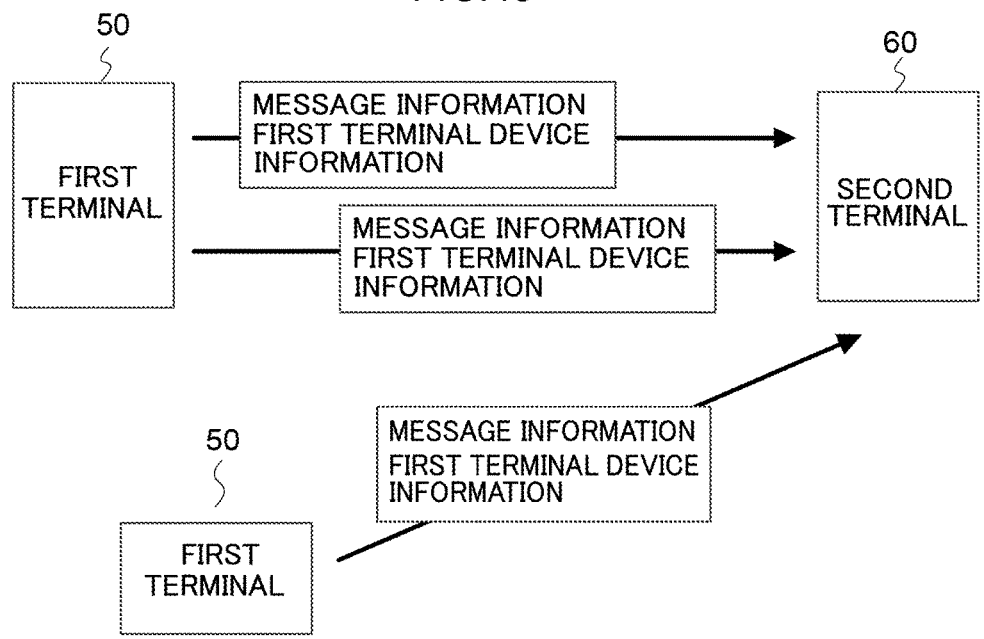
FIG. 45 is a schematic diagram explaining a chronological flow of information transmitted/received between respective devices of a computer system according to another exemplary embodiment.

As illustrated in FIG. 45 as an example addressing such a case, the first terminals 50 respectively provided to the first target bicycle and the second target bicycle transmit the same message information and first terminal device information plural times (two times in the example illustrated in FIG. 45) with a specific duration in between. Accordingly, the second terminal 60 determines that the information is valid information in cases in which the same message information and first terminal device information have been both received and transmitted the same number of times.

Namely, since the first target bicycle is travelling in front of the target automobile, the number of times that the target automobile can receive the information transmitted from the first target bicycle is the number of times that the information was transmitted, enabling the information to be determined to be valid information. However, since the second target bicycle moves away after passing by the target automobile, the target automobile can only receive the information transmitted from the second target bicycle fewer times than the information was transmitted (one in the example illustrated in FIG. 45), enabling determination that the information is invalid information.

Figure 46:
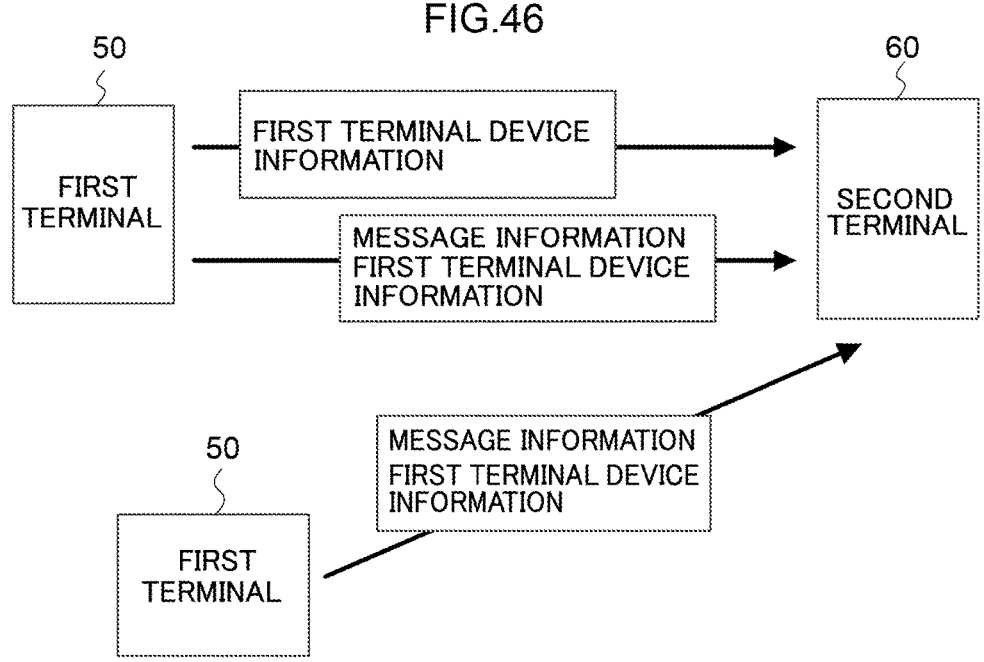
FIG. 46 is a schematic diagram explaining a chronological flow of information transmitted/received between respective devices of a computer system according to another exemplary embodiment.

In such a situation, configuration is preferably made such that the same message information or the like is transmitted plural times for one operation on the first terminal 50 by the first user, from the viewpoint of operability and convenience. Moreover, as illustrated in the example of FIG. 46, in a modified example of this exemplary embodiment, the portion of the information sent plural times from the first terminal 50 may be the first terminal device information alone. In such cases, the volume of information transmitted from the first terminal 50 can be reduced.

Next, explanation follows regarding a case in which, out of the two target bicycles, one of the target bicycles is a target bicycle travelling in front of the target automobile (referred to as the "third target bicycle" hereafter), and the other target bicycle is travelling behind the target automobile (referred to as the "fourth target bicycle" hereafter). In such cases, the second terminal 60 provided to the target automobile preferably performs display according to the message information transmitted from the respective first terminals 50 of the third target bicycle and the fourth target bicycle, from the viewpoint of convenience. Explanation follows regarding an exemplary embodiment in such a case.

Figure 47:
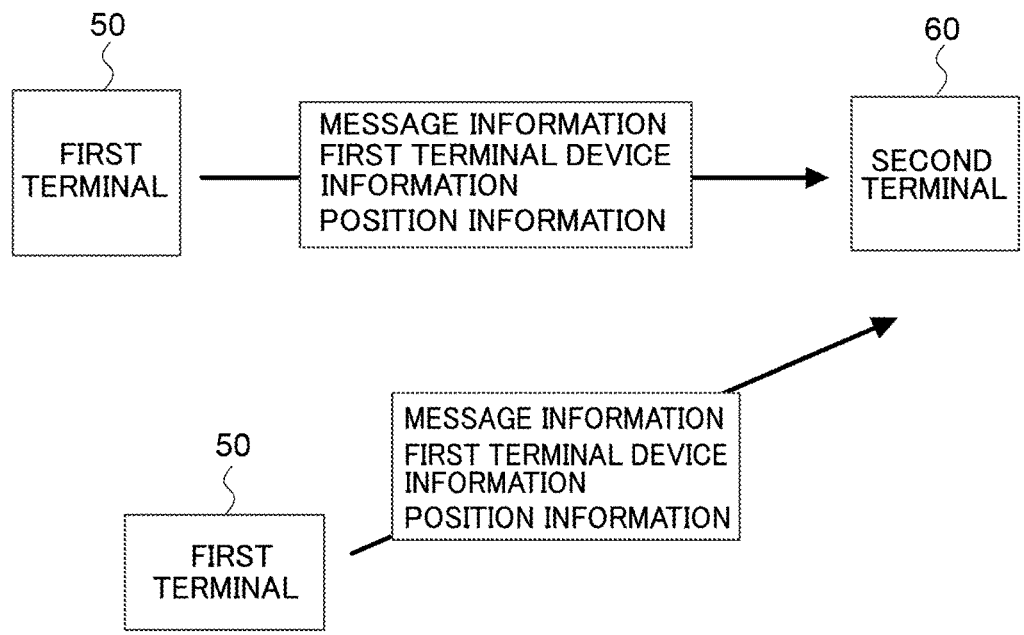
FIG. 47 is a schematic diagram explaining a chronological flow of information transmitted/received between respective devices of a computer system according to another exemplary embodiment.

As illustrated in FIG. 47 as an example of such a case, the employed first terminal 50 is capable of identifying the position of the device itself, right turn information or left turn information is transmitted from the first terminal 50 to the second terminal 60 as the message information, and the first terminal device information and the position information are also transmitted therewith. Accordingly, in the second terminal 60, based on the received information, a behavior presentation screen indicating the position relationships of the third target bicycle and the fourth target bicycle with the target automobile serving as a reference, and also indicating their subsequent behavior, is displayed by the display section 65.

Figure 48:
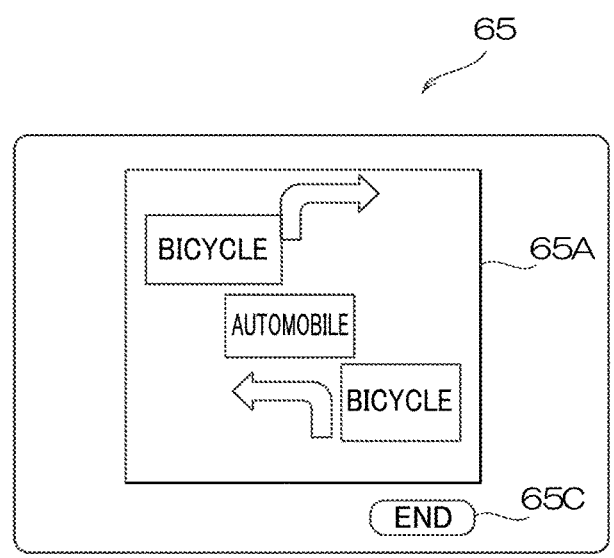
FIG. 48 is a schematic diagram illustrating an example of a behavior presentation screen according to another exemplary embodiment.

FIG. 48 illustrates an example of the behavior presentation screen. As illustrated in FIG. 48, an image (a plan view image in the example illustrated in FIG. 48) indicating the positions of the third target bicycle and the fourth target bicycle, with the position of the automobile serving as a reference, and the behavior of these target bicycles, are displayed on the behavior presentation screen. The second user onboard the target automobile can more appropriately drive, steer, and so on as a result of being able to ascertain the behavior of the fourth target bicycle travelling behind in addition to the behavior of the third target bicycle travelling ahead, by referring to the behavior presentation screen.

Although explanation has been given regarding a case in which the message information is exchanged directly between the first terminal and the second terminal in each of the exemplary embodiments above, there is no limitation thereto. For example, exchange of the message information between the first terminal and the second terminal may be performed via a server. The alphabetic suffixes of the reference numerals of the first terminal provided to the target bicycle, the second terminal provided to the target automobile, and the server are also omitted hereafter, such that they are referred to as the "first terminal 50", the "second terminal 60", and the "server 70".

Figure 49:
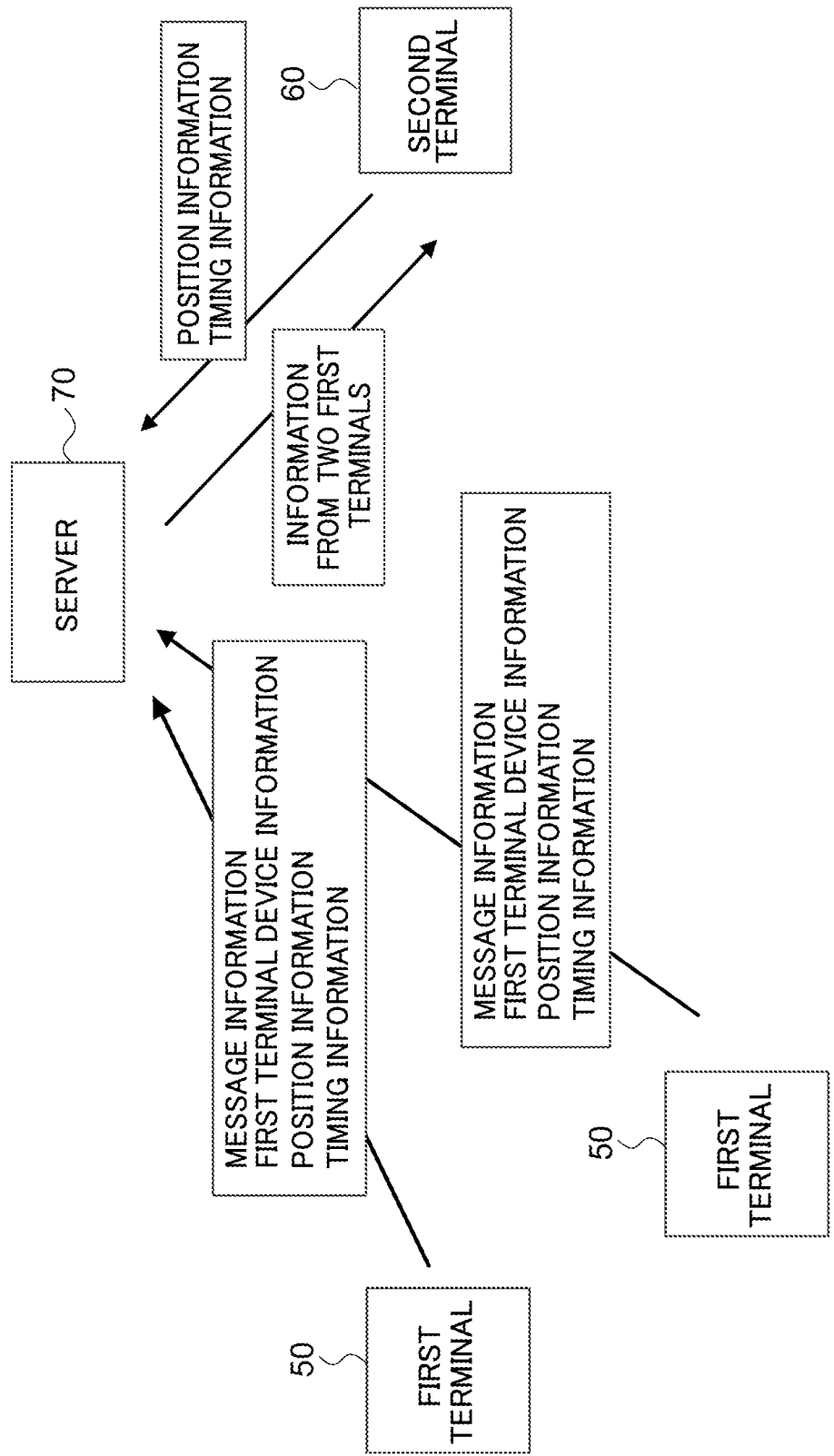
FIG. 49 is a schematic diagram explaining a chronological flow of information transmitted/received between respective devices of a computer system according to another exemplary embodiment.

First, explanation follows regarding an exemplary embodiment in a case in which there are two target bicycles, the first terminal 50 is capable of identifying the position of the device itself, and the message information transmitted from the first terminal 50 to the second terminal 60 is transmitted from the first terminal 50 to the second terminal 60 via the server 70, with reference to FIG. 49.

In such cases, when the first user performs an operation by which the message information is to be transmitted, the respective first terminals 50 provided to the target bicycles transmit the message information, the first terminal device information, the position information, and the timing information to the server 70 using the wireless communications section 57 in accordance with the operation. Accordingly, the server 70 registers the information received from the first terminal 50 in the communication information DB.

The second terminal 60 provided to the target automobile transmits, to the server 70 at a specific timing, position information indicating a position of an automobile, and timing information indicating the timing of that point in time, together with inquiry information indicating an inquiry for close information that is within a specific range from the position information and timing information indicated by the above information. The range employed as the specific range may be a range predetermined such that when the information is within this range, the information can be considered information transmitted from a vehicle capable of transmitting message information to the automobile. Moreover, a timing of every specific duration, this being a comparatively short duration (for example, one second), a timing at which the distance in the travelling direction of the automobile from a junction at which a left turn or a right turn is possible was within a specific distance (for example, 10 m), or the like, may be employed as the specific timing.

Accordingly, when the inquiry information is received, the server 70 searches for close information that is within the specific range from the position and timing indicated by the position information and timing information received from the communication information DB together with the information, and transmits the found information to the second terminal 60 using the communication I/F section 77. The second terminal 60 then uses the information received from the server 70 to display a behavior presentation screen illustrated as an example in FIG. 48 using the display section 65.

In this exemplary embodiment, there is no need to provide functionality for performing short range communication with the first terminal 50 and the second terminal 60, enabling technology disclosed herein to be implemented at lower cost than in the exemplary embodiments above.

Figure 50:
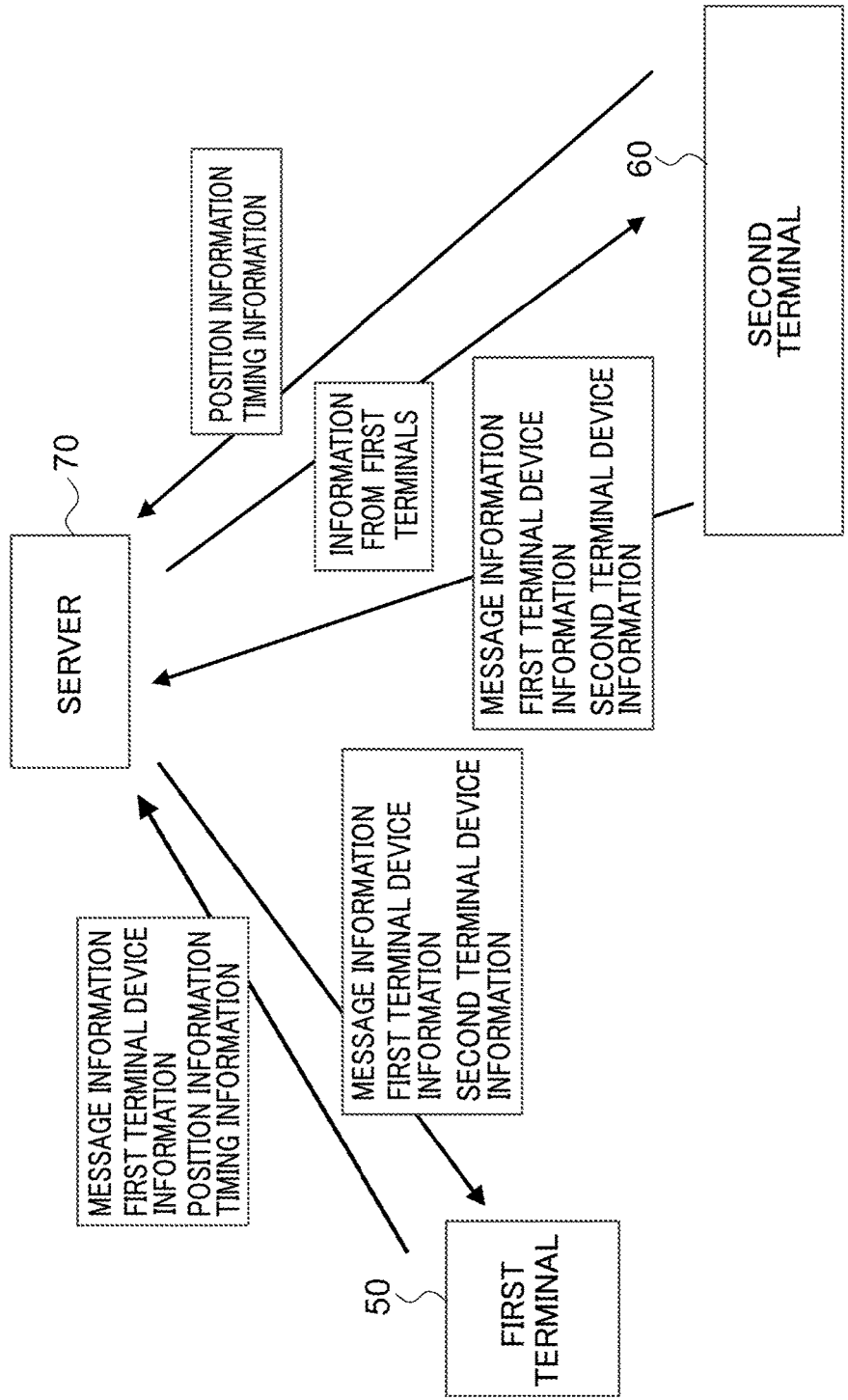
FIG. 50 is a schematic diagram explaining a chronological flow of information transmitted/received between respective devices of a computer system according to another exemplary embodiment.

Next, explanation follows regarding an exemplary embodiment in a case in which message information transmitted from the second terminal 60 to the first terminal 50 is also transmitted from the second terminal 60 to the first terminal 50 via the server 70, with reference to FIG. 50. To avoid over complication, explanation follows here regarding a case in which there is only one target bicycle.

Figure 51:
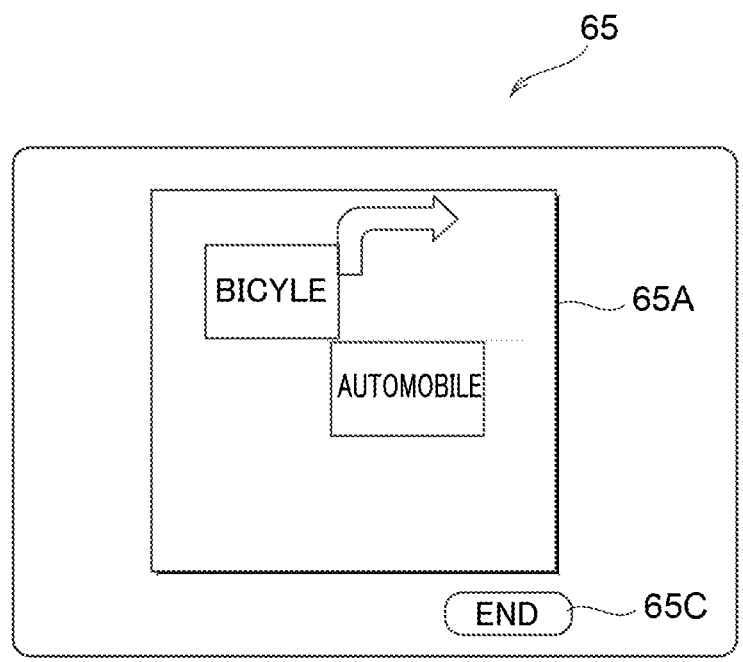
FIG. 51 is a schematic diagram illustrating an example of a behavior presentation screen according to another exemplary embodiment.

The explanation given with reference to FIG. 49 similarly applies to the portion of message information transmitted from the first terminal 50 to the second terminal 60 via the server 70 in this case. The behavior presentation screen displayed by the display section 65 of the second terminal 60 in this case is illustrated in FIG. 51 as an example.

When message information indicating that message information from the first terminal 50 has been confirmed is transmitted from the second terminal 60 to the first terminal 50, the second terminal 60 transmits the message information, the received first terminal device information, and second terminal device information of the device itself to the server 70 using the wireless communication section 67.

When the server 70 receives the message information, the first terminal device information, and the second terminal device information from the second terminal 60, the server 70 transmits this received information to the first terminal 50. In response, the first terminal 50 uses the received information to execute processing that, for example, displays a response display screen illustrated in FIG. 25 as an example using the display section.

Although explanation has been given regarding cases in which various information is transmitted to surrounding vehicles using non-directional communications when performing short range wireless communication in each of the exemplary embodiments above, there is no limitation thereto. For example, various information may be transmitted toward a vehicle targeted for transmission of information using a member that restricts the transmission direction of the various information when performing short range wireless communication.

Although explanation has been given regarding cases in which a site display map is generated as an example of a usable form of the information collected in the communication information DB in each of the exemplary embodiments above, there is no limitation thereto. For example, causing the collected position information to be reflected in a car navigation system enables application to accident prevention, since locations where positions indicated by the position information are concentrated can be identified as locations where vehicles are easily congested. Moreover, application to urban development is also possible since installation positions of traffic signals can be effectively decided by using the collected position information.

Figure 52:
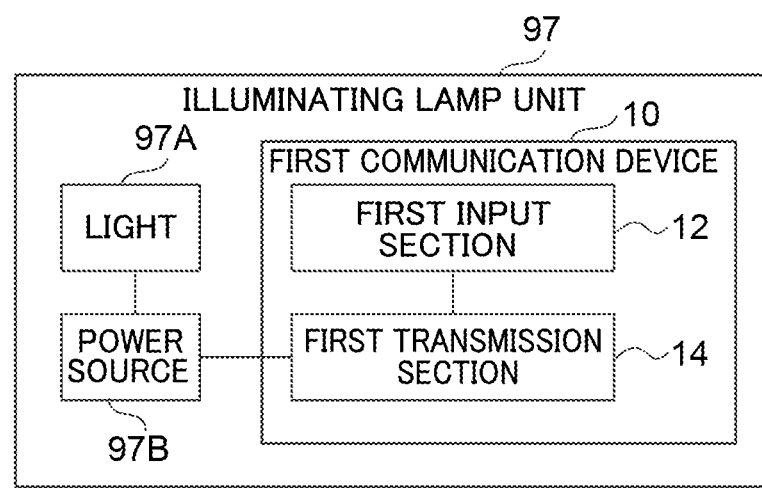
FIG. 52 is a block diagram illustrating an example of a configuration of an illuminating lamp unit and a first communication device according to another exemplary embodiment.
Figure 53:
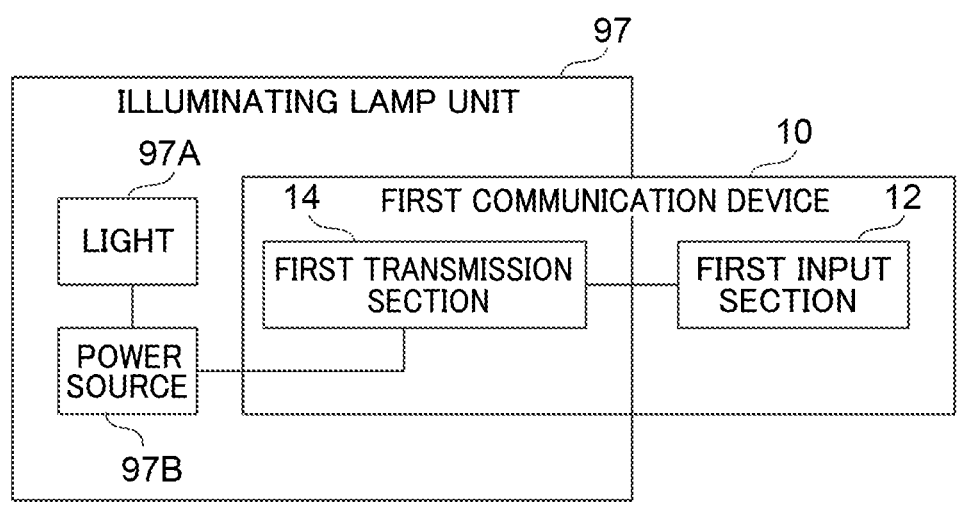
FIG. 53 is a block diagram illustrating another example of a configuration of an illuminating lamp unit and a first communication device according to another exemplary embodiment.

Although explanation has been given regarding cases in which the first communication device 10 is configured as a smartphone in each of the exemplary embodiments above, there is no limitation thereto. For example, the first communication device 10 may be built into the illuminating lamp unit 97 as illustrated as an example in FIG. 52, or the first transmission section 14 of the first communication device 10 alone may be built into an illuminating lamp unit as illustrated as an example in FIG. 53. In such cases, the various information can be transmitted using power from a power source 971 for illuminating a light 97A, which is built into the illuminating lamp unit 97.

Moreover, although explanation has been given regarding cases in which the site display map is displayed by the server in each of the exemplary embodiments above, there is no limitation thereto. For example, the site display map may be displayed by the first terminal or the second terminal. In such cases, the cost of building the computer system can be reduced compared to the exemplary embodiments above since the server does not need the display section 75.

Although explanation has been given regarding cases in which a separate first communication device and second communication device are employed in each of the exemplary embodiments above, there is no limitation thereto. For example, the first communication device and the second communication device may be configured as a single unit. A communication device provided with all out of the first input section 12 and the first transmission section 14A of the first communication device 10A, and the first reception section 22 and the second transmission section 26A of the second communication device 20A, which are illustrated in FIG. 1, is an example of a configuration of such a case. In such cases, technology disclosed herein can be implemented at lower cost using a single communication device.

Although explanation has been given regarding embodiments in which the first information communication program 53A, the second information communication program 63A, the information collection program 73A, and the map generation program 73B are read into the storage section from the recording medium 96 via the medium reading/writing device in each of the exemplary embodiments above, there is no limitation thereto. For example, these programs may be pre-stored (installed) on the storage section, or may be downloaded to the storage section from an external device over the network 80.

When a person and another person who are onboard respective vehicles out of plural vehicles communicate with each other on a road that plural vehicles can travel along, or in the region of a parking lot or the like, collecting position information enabling identification of the positions of the respective vehicles is highly useful. For example, reflecting the collected position information to a car navigation system enables application to accident prevention, since locations where positions indicated by the position information are concentrated can be identified as locations where vehicles are easily congested. Moreover, in cases in which the communications are exchanges related to concessions made on roads, application to urban development is also possible since, for example, installation positions of traffic signals can be effectively decided by using the collected position information.

However, in technology that collects position information enabling identification of positions of vehicles when communication has been performed, there is an issue in that collection of highly reliable position information is not necessarily possible. For example, in practice, false position information for performed communication may sometimes be collected despite no communication being performed.

The above issue is not solved in related technology since the performance of communications is not considered in relation to the issue.

One aspect of technology disclosed herein enables position information enabling the identification of a position at which inter-vehicle communication was performed to be collected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An information collection system comprising:
    a first communication device provided at a first vehicle comprising:
        a processor configured to execute a process, the process including:
            receiving operations by a first input section; and
            wirelessly transmitting, by a first transmission section, specific information associated with the operation received by the first input section; and
    a second communication device provided at a second vehicle comprising:
        a processor configured to execute a process, the process including:
            receiving, by a first reception section, the specific information transmitted by the first transmission section;
            obtaining position information that enables identification of a position of the second communication device at which the second communication device received the specific information; and
            wirelessly transmitting the position information in association with the specific information, to a device that is different from the first communication device by a second transmission section.

2. The information collection system of claim 1, wherein the specific information includes information expressing gratitude.

3. The information collection system of claim 1, wherein:
    the first vehicle is a bicycle; and
    the first transmission section is an in-built illuminating lamp unit installed to the first vehicle.

4. The information collection system of claim 1, further comprising:
    an information collection device comprising:
        a processor configured to execute a process, the process including:
            receiving, by a second reception section, the position information transmitted by the second transmission section; and
            registering the position information received by the second reception section in a storage section.

5. The information collection system of claim 4, wherein the process of the information collection device further comprises generating image data representing a position on a map identified by the position information registered in the storage section.

6. The information collection system of claim 4, wherein:
    the process of the second communication device further comprises:
        receiving an operation by a second input section; and
        wirelessly transmitting, by the second transmission section, second specific information according to the operation received by the second input section;
    the process of the first communication device further comprises:
        receiving, by a third reception section, the second specific information transmitted by the second transmission section; and
        transmitting to the information collection device, by the first transmission section, the second position information enabling identification of the position at which the second position information was received by the third reception section; and
    the process of the information collection device further comprises:
        receiving, by the second reception section, the second position information transmitted by the first transmission section; and
        in cases in which the distance between positions indicated by the respective information of the position information and the second position information received by the second reception section is within a specific range, increasing a value of degree of certainty information representing certainty of the position information, and registering the increased value of the degree of certainty information in the storage section in association with the position information.

7. The information collection system of claim 6, wherein the process of the first communication device further comprises presenting the second specific information received by the third reception section.

8. The information collection system of claim 4, wherein the process of the information collection device further comprises:
    receiving, by the second reception section, the position information transmitted by the second transmission section of the second communication device from out of a plurality of the second communication devices, and increasing a value of degree of certainty information indicating the certainty of the position information more the greater the number of positions for which the distance between positions indicated by a plurality of the received position information is within a specific range, and registering the increased value of degree of certainty information in the storage section in association with the position information.

9. The information collection system of claim 4, wherein the process of the second communication device further comprises:
receiving an operation by a second input section; and
wirelessly transmitting, by the second transmission section, second specific information according to the operation received by the second input section; and
the process of the first communication device further comprises:
receiving, by a third reception section, the second specific information transmitted by the second transmission section; and wherein
the information collection system further comprises a third communication device, provided at a third vehicle, comprising:
a processor configured to execute a process, the process including:
receiving, by a fourth reception section, the specific information transmitted by the first transmission section, and the second specific information transmitted by the second transmission section; and
wirelessly transmitting, to the information collection device by a third transmission section, second position information enabling identification of a position at which the specific information and the second specific information were received by the fourth reception section; and
the process of the information collection device further comprises:
receiving, by a second reception section, the second position information transmitted by the third transmission section; and
increasing a value of degree of certainty information indicating the certainty of the position information more the greater the number of second position information indicating a position within a specific range of distance from the position indicated by the position information received by the second reception section, and registering the increased value of the degree of certainty information in the storage section in association with the position information.

10. The information collection system of claim 4, further comprising:
a third communication device provided at a third vehicle comprising:
a processor configured to execute a process, the process including:
receiving an operation by a third input section; and
wirelessly transmitting, to the information collection device by a third transmission section, second position information enabling identification of a position at a point in time at which the operation was received by the third input section, wherein:
the process of the information collection device further comprises:
receiving, by the second reception section, the second position information transmitted by the third transmission section; and
increasing a value of degree of certainty information indicating the certainty of the position information more the greater the number of the second position information indicating a position within a specific range of distance from the position indicated by the position information received by the second reception section, and registering the increased value of the degree of certainty information in the storage section in association with the position information.

11. The information collection system of claim 1, wherein:
the process of the first communication device further comprises by the first transmission section to wirelessly transmit second position information enabling identification of the position from which the specific information was transmitted; and
the process of the information collection device further comprises:
receiving, by the second reception section, the second position information transmitted by the first transmission section; and
in cases in which the distance between positions represented by respective information of the position information and the second position information received by the second reception section is within a specific distance, increasing a value of degree of certainty information representing certainty of the position information, and registering the increased value of the degree of certainty information in the storage section in association with the position information.

12. The information collection system of claim 11, wherein, in the process of the information collection device, in cases in which the distance is within a specific range, and a difference between timings is within a specific range for reception of respective information of position information indicating two positions that are the subject of the distance, the value of the degree of certainty information is increased, and the increased value of degree of certainty information is registered in the storage section.

13. The information collection system of claim 1, wherein the process of the second communication device further comprises presenting the specific information received by the first reception section.

14. The first communication device of the information collection system of claim 1, wherein the first vehicle is a bicycle.

15. The first communication device of claim 14, wherein the transmission section is built into an illuminating lamp unit of the bicycle.

16. The first communication device of claim 14, wherein the specific information includes information expressing gratitude.

17. The information collection system of claim 1, wherein the information collection system is configured to:
receive from the first vehicle or the second vehicle a position of the first vehicle or a position of the second vehicle when message information corresponding to behavior of the second vehicle has been wirelessly transmitted from the first vehicle by the first communication device in the first vehicle; and
generate image data illustrating the received position on a map.

18. A communication device comprising:
a processor configured to execute a process, the process including:
receiving an operation by an input section;

wirelessly transmitting, by a first transmission section, specific information associated with the operation received by the input section to a second communication device;

receiving, by a first reception section, the specific information transmitted by the transmission section of the second communication device;

obtaining position information that enables identification of a position of the communication device at which the communication device received the specific information; and wirelessly transmitting, by a second transmission section, the position information in association with the specific information to a device that is different from the second communication device.

* * * * *